(12) United States Patent
Hawkins et al.

(10) Patent No.: US 12,350,675 B2
(45) Date of Patent: Jul. 8, 2025

(54) SYSTEMS AND METHODS FOR DRYING REAGENTS IN MULTIWELL PLATES

(71) Applicant: Truvian Sciences, Inc., San Diego, CA (US)

(72) Inventors: Jeffrey A. Hawkins, San Diego, CA (US); Mark Scheble, San Diego, CA (US); Mohammad Sotoudeh, San Diego, CA (US); Brian Fernandez, San Diego, CA (US)

(73) Assignee: Truvian Sciences, Inc., San Diego, CA (US)

( * ) Notice: Subject to any disclaimer, the term of this patent is extended or adjusted under 35 U.S.C. 154(b) by 0 days.

(21) Appl. No.: 18/615,924

(22) Filed: Mar. 25, 2024

(65) Prior Publication Data

US 2024/0226899 A1 Jul. 11, 2024

Related U.S. Application Data

(63) Continuation of application No. 18/506,818, filed on Nov. 10, 2023.

(Continued)

(51) Int. Cl.
*G01N 1/40* (2006.01)
*B01L 3/00* (2006.01)

(52) U.S. Cl.
CPC ..... *B01L 3/50853* (2013.01); *B01L 2200/025* (2013.01); *B01L 2200/12* (2013.01);
(Continued)

(58) Field of Classification Search
CPC ......... G01N 1/4022; G01N 2001/4027; G01N 2035/00346; G01N 2035/00445;
(Continued)

(56) References Cited

U.S. PATENT DOCUMENTS 5,888,592 A * 3/1999 Biallas .................. B01L 99/00
118/643
D936,856 S 11/2021 Hawkins et al.
(Continued)

FOREIGN PATENT DOCUMENTS

CN 211926319 U 11/2020
GB 2387642 A * 10/2003 .............. F26B 15/18
(Continued)

OTHER PUBLICATIONS

Bond et al., "Drop-to-Drop Variations in the Cellular Components of Fingerprick Blood," Am. J. Clin. Pathol. 144, pp. 885-894 (2015).
(Continued)

*Primary Examiner* — Jill A Warden
*Assistant Examiner* — Dwayne K Handy
(74) *Attorney, Agent, or Firm* — Snell & Wilmer, L.L.P.; April Wurster

(57) ABSTRACT

Disclosed herein is a device for multianalyte detection, and systems and methods for drying reagents in wells in the device in a manner that preserves functional performance. Specifically, disclosed is a system for drying reagents in the wells of a multiwell plate. The multiwell plate is sprayed with air from nozzles positioned above the multiwell plate. Air is exhausted evenly below the multiwell plate. This allows for the rapid, consistent drying of large volumes of liquid in the well of a multiwell plate.

19 Claims, 22 Drawing Sheets

Related U.S. Application Data

(60) Provisional application No. 63/425,633, filed on Nov. 15, 2022.

(52) U.S. Cl.
CPC ... *B01L 2200/16* (2013.01); *B01L 2300/0803* (2013.01); *B01L 2300/0858* (2013.01)

(58) Field of Classification Search
CPC . G01N 2035/0437; F26B 15/00; F26B 15/12; F26B 15/14; F26B 2015/003; F26B 2015/006
See application file for complete search history.

(56) References Cited

U.S. PATENT DOCUMENTS

| | | | |
|---|---|---|---|
| D954,295 S | 6/2022 | Hawkins et al. | |
| D959,019 S | 7/2022 | Hawkins et al. | |
| D960,386 S | 8/2022 | Hawkins et al. | |
| D968,643 S | 11/2022 | Hawkins et al. | |
| 11,638,918 B2 | 5/2023 | Kleinemolen et al. | |
| 2004/0057244 A1* | 3/2004 | Amano | F21S 43/315 362/298 |
| 2009/0186357 A1 | 7/2009 | Mauk et al. | |
| 2009/0298116 A1* | 12/2009 | Fang | B01L 3/5085 430/320 |
| 2015/0293097 A1 | 10/2015 | Godec et al. | |
| 2017/0080416 A1* | 3/2017 | Panetz | B01L 3/50853 |
| 2018/0154353 A1 | 6/2018 | Glezer et al. | |
| 2020/0064254 A1 | 2/2020 | Vanderklein et al. | |
| 2022/0401959 A1 | 12/2022 | Emerson et al. | |
| 2024/0157367 A1 | 5/2024 | Hawkins et al. | |

FOREIGN PATENT DOCUMENTS

| | | |
|---|---|---|
| JP | 2013223441 A | 10/2013 |
| WO | 1999037819 A2 | 7/1999 |
| WO | 2017165630 A1 | 9/2017 |
| WO | 2020176607 A1 | 9/2020 |
| WO | 2020227643 A1 | 11/2020 |
| WO | 2021236675 A1 | 11/2021 |
| WO | 2021236683 A1 | 11/2021 |
| WO | 2022066741 A2 | 3/2022 |
| WO | 2022076844 A1 | 4/2022 |
| WO | 2022271948 A1 | 12/2022 |

OTHER PUBLICATIONS

Hawkins, "Rethinking the Clinical Laboratory Test Value Chain: Using New Technologies and New Approaches to Lower Costs, Speed Time-to-Answer, and Contribute to Improved Patient Outcomes," Truvian Slide Deck pp. 1-19 (Apr. 27, 2021).

Invitation to Pay Additional Fees and, Where Applicable, Protest Fee for PCT/US2023/079429 dated Jan. 24, 2024.

Theranos' Elizabeth Holmes Speaks at AACC Meeting. "Theranos Science & Technology: The Miniaturization of Laboratory Testing," American Association for Clinical Chemistry [Video] [Screen captures from video retrieved on the Internet at URL: https://www.mpo-mag.com/contents/view_videos/2016-08-02/theranos-elizabeth-holmes-speaks-at-aacc-meeting/] pp. 1-6 (Aug. 2, 2016).

EP: Extended Search Report in European Application No. 23209351.8, dated Jul. 18, 2024 (12 pages).

WO: International Search Report and Written Opinion for PCT/US2023/079429 dated Apr. 12, 2024; 16 pages.

* cited by examiner

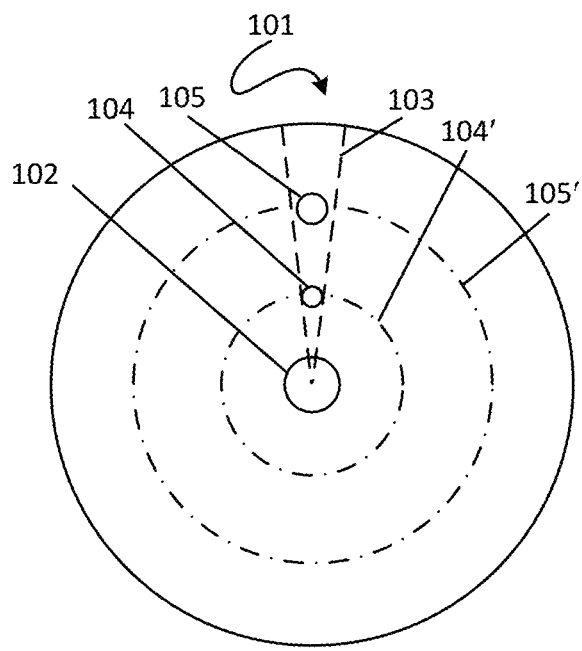
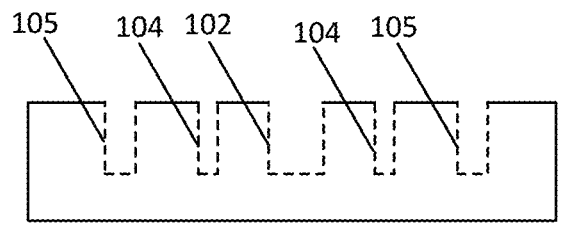
FIG. 1B:
SIDE VIEW
FIG. 1A:
TOP VIEW
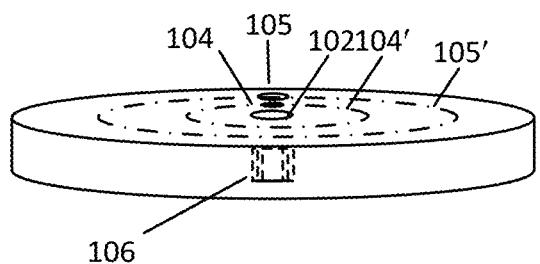
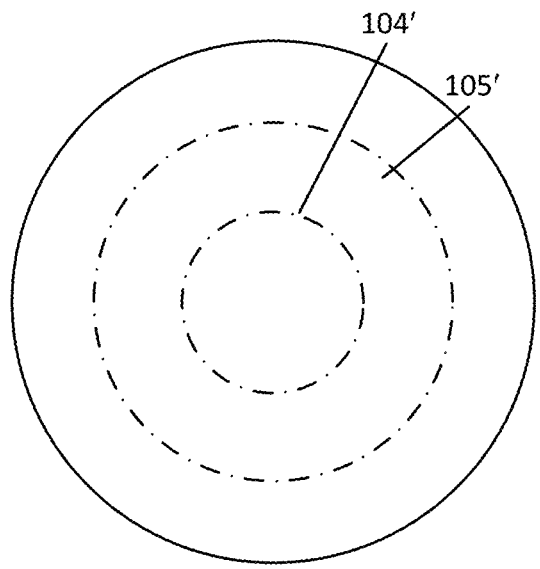
FIG. 1C:
PERSPECTIVE VIEW
FIG. 1D:
BOTTOM VIEW
FIG. 1

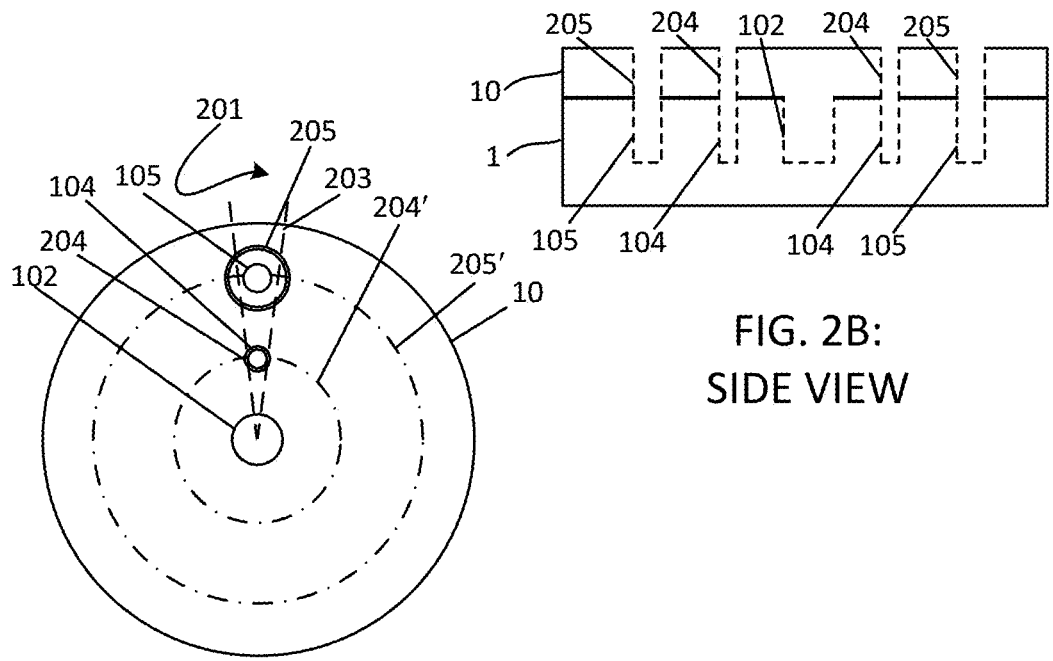
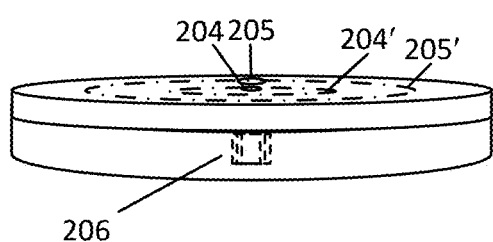
FIG. 2A:
TOP VIEW
FIG. 2B:
SIDE VIEW
FIG. 2C:
PERSPECTIVE VIEW
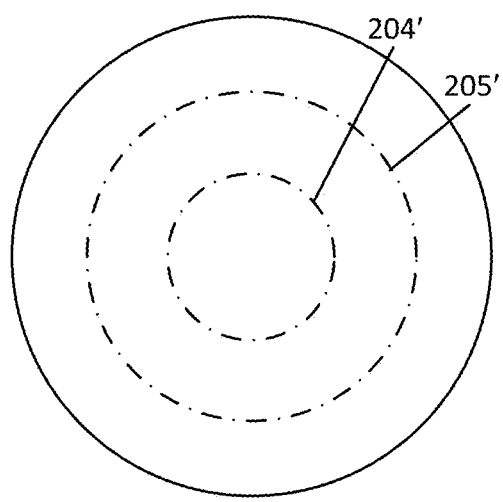
FIG. 2D:
BOTTOM VIEW
FIG. 2

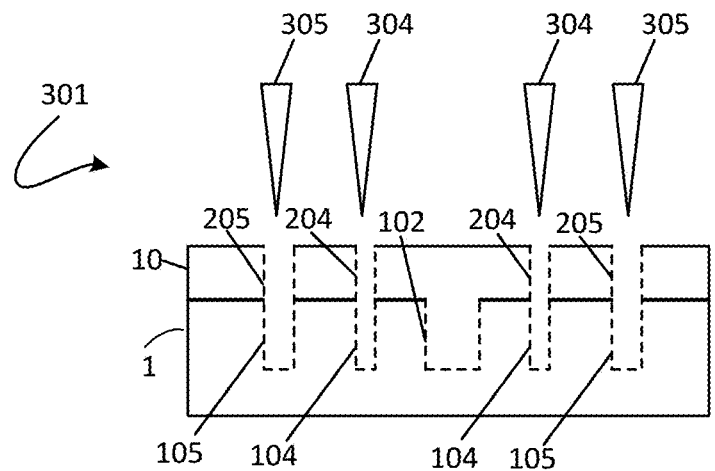
FIG. 3A:
SIDE VIEW
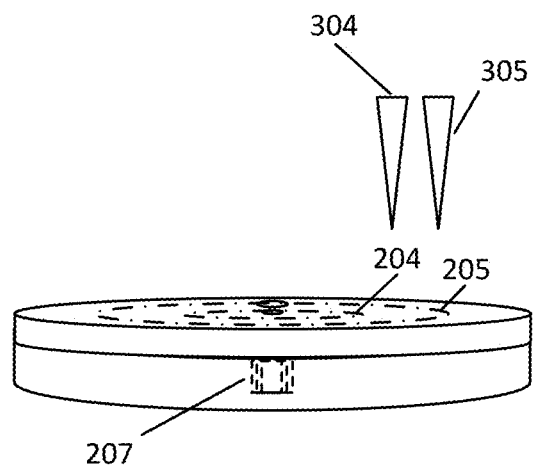
FIG. 3B:
PERSPECTIVE VIEW
FIG. 3

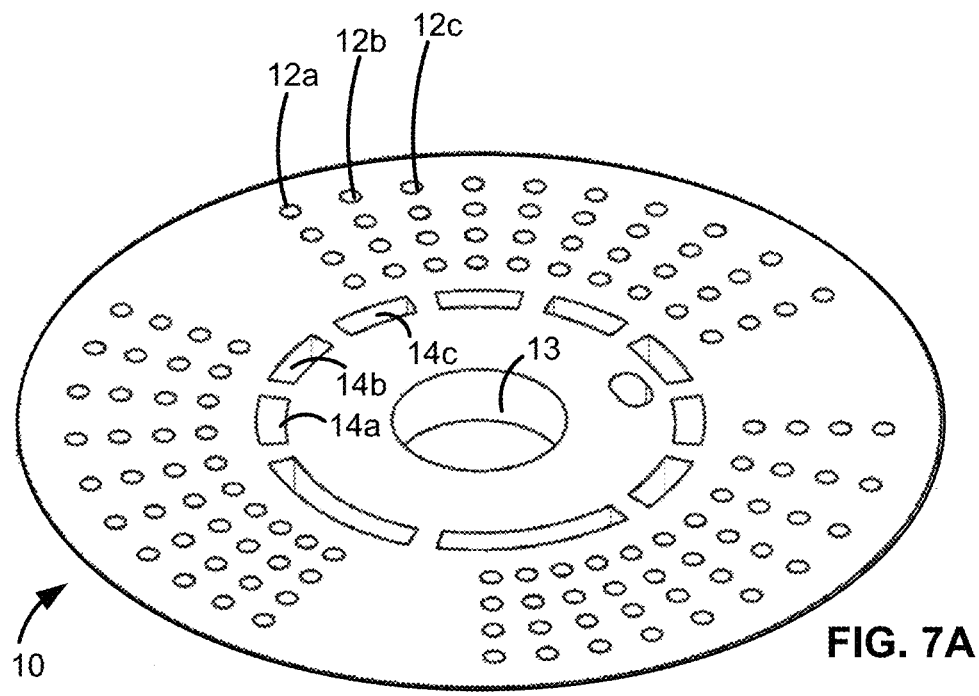
FIG. 7A
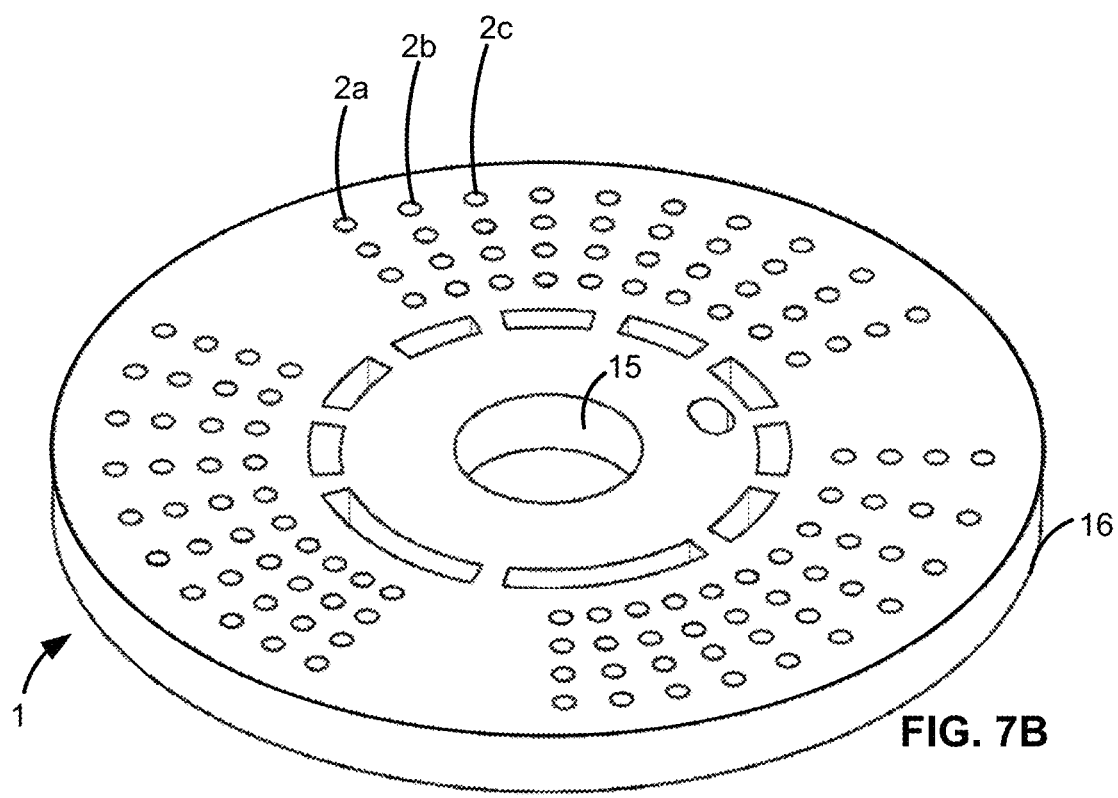
FIG. 7B
FIG. 7

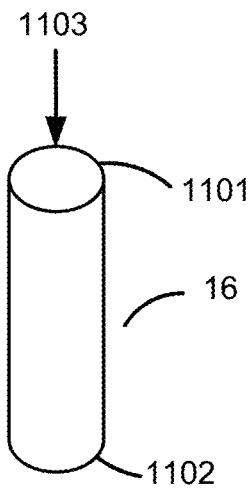
FIG. 11A
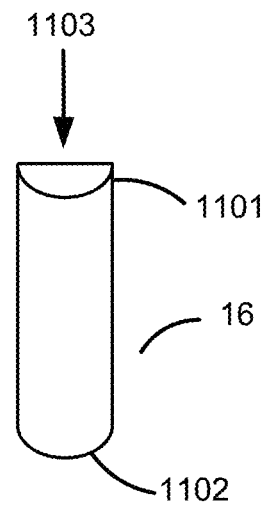
FIG. 11B
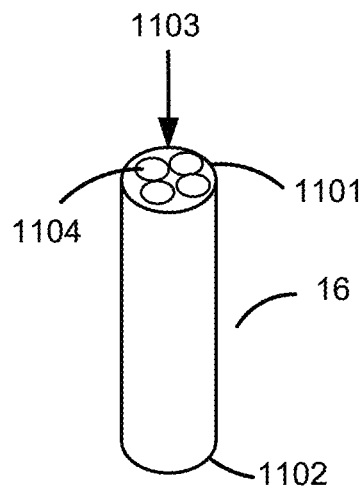
FIG. 11C
FIG. 11

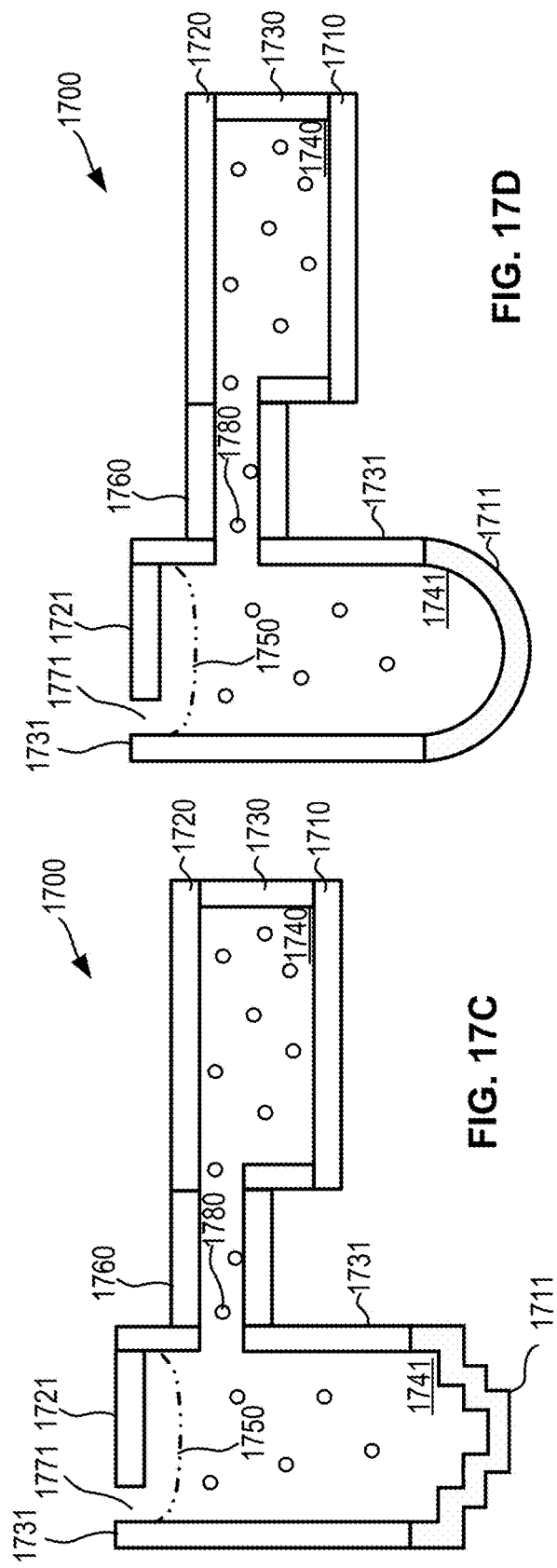
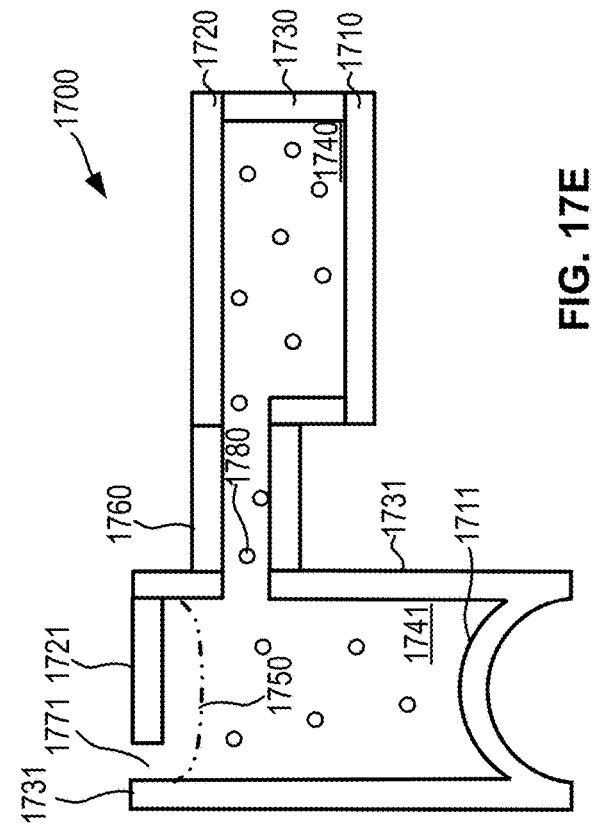
FIG. 17C
FIG. 17D
FIG. 17E

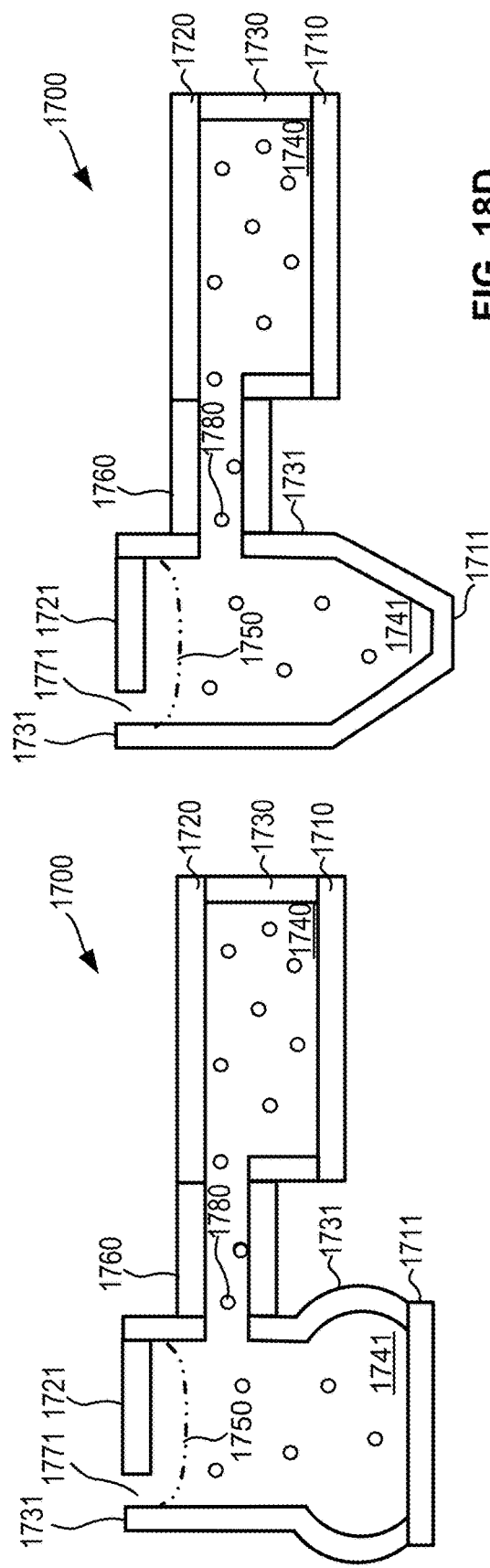
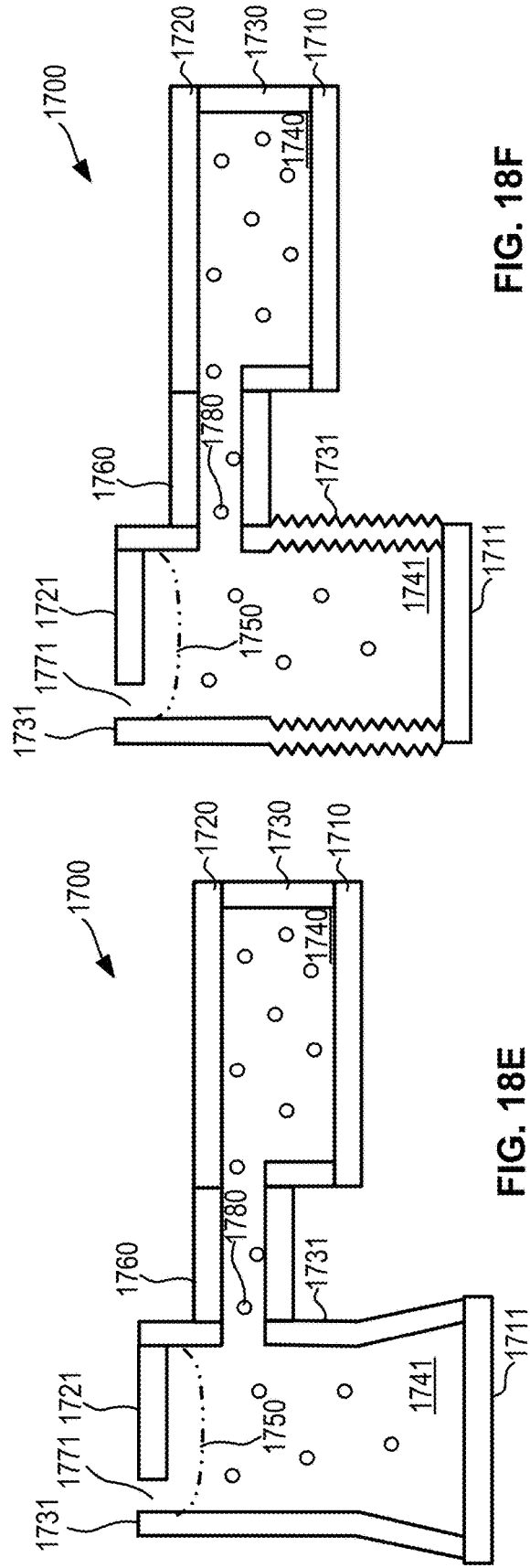
FIG. 18C
FIG. 18D
FIG. 18E
FIG. 18F

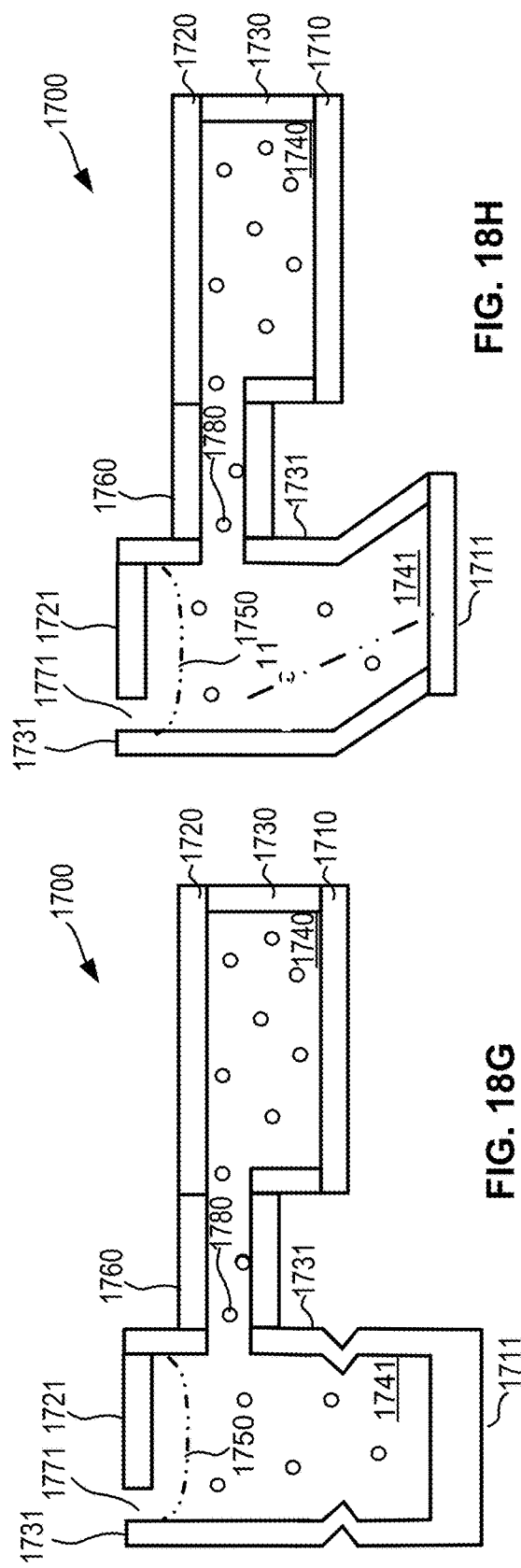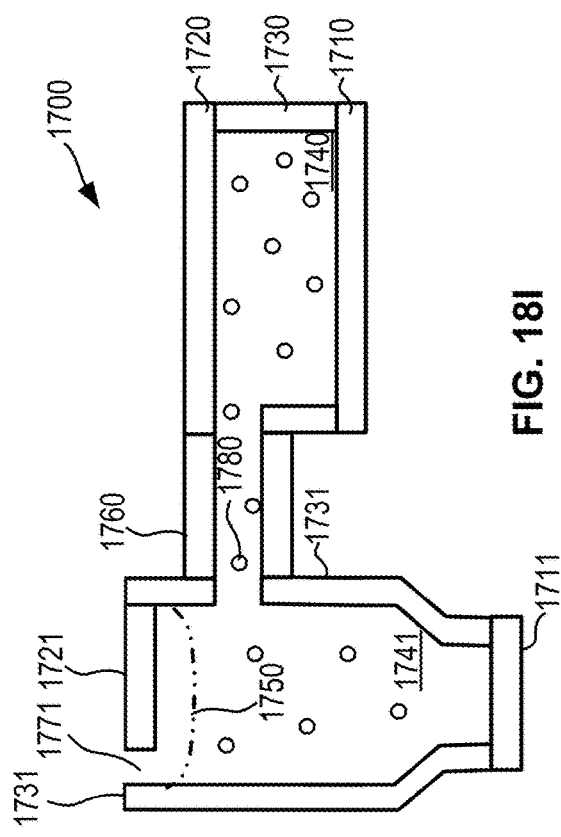

SYSTEMS AND METHODS FOR DRYING REAGENTS IN MULTIWELL PLATES

CROSS-REFERENCE TO RELATED APPLICATIONS

This application is a continuation application of U.S. application Ser. No. 18/506,818 filed Nov. 10, 2023, which claims the benefit under 35 USC § 119(e) to U.S. Application Ser. No. 63/425,633 filed Nov. 15, 2022, now expired. The disclosure of each of the prior applications is considered part of and is incorporated by reference in the disclosure of this application.

TECHNICAL FIELD

The present technology relates to cartridges for analyte detection and their manufacture.

BACKGROUND

Direct to consumer (DTC) diagnostics involve consumers (e.g., patients) directly accessing healthcare or wellness-related diagnostic tests and test results, without the need for a doctor's prescription. During the COVID-19 pandemic, the diagnostic industry expanded rapidly as a result of growing consumer interest in detecting personal healthcare-related information.

A key to the success of DTC diagnostics is the availability of robust technologies for testing a broad range of diagnostically meaningful analytes with accuracy, fast turnaround times, and at low-cost. While certain handheld or portable devices, such as blood glucose meters or test strips, e.g., for urine analysis, have been developed to facilitate personalized medical testing ("bedside testing" or "point-of-care testing (POCT)") by healthcare providers, there remains a need for technologies facilitating the reliable, rapid, and cost-effective analysis of multiple analytes, e.g., at a "point-of-customer-contact (POCC)" site, such as in a pharmacy or a general store. See, e.g., Bond M. M. et al. (2015) *Drop-to-Drop Variations in the Cellular Components of Fingerprick Blood*, Am. J. Clin. Pathol. 144, 885-894.

SUMMARY

The problem to be solved is drying large volumes of liquid/reagents (10-100 μL) at a fast rate without affecting their functionality when manufacturing cartridges for analyte detection. The problem is solved, in part, by drying at low temperatures using inert dry gas. It is important to dry reagents in a stable format so that they do not lose their functionality or performance.

Provided herein are systems, devices, and methods for drying reagents in a cartridge for analyte detection. The cartridge disclosed for analyte detection includes at least one well containing wet reagents. In some embodiments, the cartridge comprises a cover with holes aligned with the wells (and/or well inlet). During manufacture, reagents in the well are dried by spraying air down over the cartridge. During manufacture, reagents in the well are dried by exhausting air out of the dry tunnel unevenly in a way that creates even exhaust in the drying chamber. Thus, dying is controlled by pushing air in and pulling air out of the drying chamber.

Traditional Manufacture of a Multiwell Plate

Manufacturing multiwell plates comprising reagents for performing multianalyte detection is difficult for two reasons: (1) the manufacturing time must be short to keep the cost of manufacture low; and (2) the manufacturing technique must ensure that the reagents for performing multianalyte detection are not compromised by the manufacturing process. The reagents used, for example, in an immunoassay are different from those used in a chemistry assay, and the method of manufacture cannot compromise the reagents for either.

1. Active Drying

Prior attempts by Applicant to dry multiwell plates by flowing air directly down (vertically) over the wells to dry the reagents in the wells caused splashing of reagents. Directly spraying air onto/into the well is too turbulent.

2. Passive Drying

Air can be flowed horizontally over the wells (laminar flow over the wells). Laminar air flow does not work well because dry times are too long, or the reagents don't fully dry. Laminar air flow is not turbulent enough to cause drying.

To speed drying times, traditionally, multiwell plates are manufactured by increasing gas flow. Increasing gas flow can be accomplished in a couple of ways: (1) Increase air flow through an air knife; or (2) increase the number of air knives/blowers. An air knife is a pressurized air plenum with a uniform continuous gap through which pressurized air exits in a laminar flow pattern. The exiting air velocity as it leaves the machine creates an impact air velocity directly on the surface of the product, which shears away moisture or dirt without making physical contact.

Alternatively, the manufacturing belt speed can be slowed, which lengthens the gas flow exposure. But slowing the belt speed slows down the throughput of the system and limits manufacturing capacity.

Alternatively, multiwell plates can finish drying in a desiccator and/or dry room. With this approach, materials need to be staged under nitrogen until they are ready to be packed.

Sometimes reagents are dried down by spinning the multiwell plate. However, if, as here, the multiwell plate comprises reagents for performing multianalyte detection via immunoassay, the beads in the immunoassay are damaged by spinning.

Thus, there remains a need to dry reagents quickly in a multiwell plate because active drying doesn't work (causes splashing), and passive drying takes too long.

Traditional Manufacture of a Multiwell Plate with a Cover

When covers are provided to prevent turbulent drying, the cover can prevent the drying of reagents in the wells because air cannot be flowed into the wells to dry the reagents. In such situations, the multiwell plate must be dried in a dry room or by desiccating the air during manufacture to speed up manufacturing. In such cases, drying reagents in wells can take longer than 90 minutes. Such long drying times increase the cost of manufacturing multiwell plates, potentially making the resulting detection assay cost prohibitive to customers.

A Multiwell Plate Comprising a Cover with Holes Over the Wells

In one aspect, provided herein is a multiwell plate comprising reagents for performing multianalyte detection. In one aspect, provided herein is a multiwell plate comprising (1) reagents for performing multianalyte detection and (2) a cover. In one aspect, provided herein is a detection cartridge comprising reagents for performing analyte detection. In one aspect, provided herein is a detection cartridge comprising (1) reagents for performing multianalyte detection and (2) a cover. In one aspect, provided herein is a detection cartridge comprising (1) reagents for performing multianalyte detection in a reaction vessel and (2) a cover with at least one hole wherein at least one hole is arranged above the reaction vessel.

In one aspect, provided herein, is a multiwell plate comprising (1) a plurality of wells, (2) reagents for performing analyte detection in the wells and (3) a cover, the cover having an array of holes aligned over the wells. In some embodiments, the wells have an assay chamber surface 1721. In some embodiments, the assay chamber surface 1721 is not present. In some embodiments, where the well has an assay chamber surface 1721, the cover and blowers are aligned with the well inlet 1771. In one aspect, provided herein is a multiwell plate comprising (1) a plurality of wells, (2) reagents for performing analyte detection in the wells, and (3) a cover, the cover having an array of holes aligned directly over the wells. In one aspect, provided herein is a multiwell plate comprising (1) a plurality of wells, (2) reagents for performing analyte detection in the wells and (3) a cover, the cover having an array of holes aligned indirectly over the wells. In one aspect, provided herein is a multiwell plate comprising (1) a plurality of wells, (2) reagents for performing analyte detection in the wells, and (3) a cover, the cover having an array of holes partially aligned over the wells. In some embodiments, the analyte detection is multianalyte detection.

Without being bound to a particular theory, it is hypothesized that a multiwell plate comprising wells and a cover with open areas over the wells is advantageous because (1) it prevents air from directly hitting the liquid in the well, causing splashing; (2) it produces a turbulent but diffuse airflow in the well. Without being bound to a particular theory, it is understood that sometimes, the airflow passes through the hole in the cover into the well and sometimes it does not.

Manufacture of Multiwell Plates by Blowing Air to Dry Reagents

Disclosed is a method of manufacturing a multiwell plate comprising reagents for performing multianalyte detection without using lyophilization or freeze drying.

In some embodiments, the multiwell plate is manufactured by spraying air down onto the multiwell plate. In some embodiments, a single air sprayer is used, which showers air down over the entire surface of the multiwell plate, i.e., over all the wells. In some embodiments, a plurality of sprayers are used. In some embodiments, a single sprayer in the plurality of sprayers showers air down over the entire surface of a single multiwell plate, i.e., over all the wells. In some embodiments, the plurality of sprayers is in a grid pattern and the plurality of sprayers collectively blow air down over the entire surface of a multiwell plate, i.e., over all the wells. In some embodiments, a first sprayer in the plurality of sprayers is indexed over a first well.

Manufacture of Multiwell Plates by Exhausting Air to Dry Reagents

In some embodiments, the multiwell plate is manufactured by controlling the exhaust of air. In some embodiments, the multiwell plate is manufactured by controlling the exhaust of inert dry gas. In some embodiments, the multiwell plate is manufactured by controlling the exhaust of nitrogen, argon, helium or, or other inert dry gases. Air is sprayed down from above (either indexed over wells in a multiwell plate, from blowers arranged in a grid wherein each individual blower does not cover the multiwell plate, but collectively the blowers in the grid spray air down over the entire multiwell plate, or from blowers wherein each blower showers air down over the entire surface of the multiwell plate) and the air exhaust is controlled. The air exhaust is controlled by an exhaust flow control device. The exhaust flow control device has portions which are open and portions which are closed in order to control the exhaust of air. Areas closer to the exhaust vent are more closed compared to areas further away. In this way, the air flow in the air drying system is uniform and pockets of low air flow or high air flow do not develop.

BRIEF DESCRIPTION OF THE DRAWINGS

A more complete understanding of the invention, and the attendant advantages and features thereof, will be more readily understood by reference to the following detailed description when considered in conjunction with the accompanying drawings wherein:

FIG. 1 illustrates an exemplary multiwell plate 101. FIG. 1A is a top view of the exemplary multiwell plate. FIG. 1B is a side view of the exemplary multiwell plate. FIG. 1C is a perspective view of the exemplary multiwell plate. FIG. 1D is a bottom view of the exemplary multiwell plate.

FIG. 2 illustrates an exemplary multiwell plate 1 with a cover 10 (collectively 201). FIG. 2A is a top view of the exemplary multiwell plate and cover. FIG. 2B is a side view of the exemplary multiwell plate and cover. FIG. 2C is a perspective view of the exemplary multiwell plate and cover.

FIG. 2D is a bottom view of the exemplary multiwell plate and cover.

FIG. 3 illustrates an exemplary multiwell plate 10 with a cover 1 and representative air blowers 304 and 305 (collectively 301). FIG. 3A is a side view of the exemplary multiwell plate, cover, and blowers. FIG. 3B is a perspective view of the exemplary multiwell plate, cover, and blowers.

FIG. 7 illustrates a perspective view of an exemplary multiwell plate (FIG. 7B) and an exemplary cover (FIG. 7A) where the representative holes 12 *a-c* (circular shape), representative holes 14 *a-c* (rectangular shape), and representative wells 2 *a-c* are arranged in a circular pattern.

FIG. 11 illustrates an exemplary representative blower 16. FIG. 11A illustrates a representative air blower 16 with a circular/cylindrical shape. FIG. 11B illustrates a representative air blower 16 with a half-circular/cylindrical shape. FIG. 11C illustrates a representative air blower 16 with a plurality of orifices 1104 in the blower 16.

FIG. 12A illustrates a plurality of representative air blowers 1202 *a-c* of the same length attached to an attachment mechanism 1201. FIG. 12B illustrates a plurality of representative air blowers 1202 *a-c* of different lengths attached to an attachment mechanism 1201.

FIGS. 17A-17G schematically illustrate cross-sectional views of exemplary devices with wells attached to optically readable reservoirs, wherein the load well floor has various configurations.

FIGS. 18A-18I schematically illustrate cross-sectional views of exemplary devices with wells attached to optically readable reservoirs, wherein the load well walls have various configurations.

DETAILED DESCRIPTION

Figure 4:
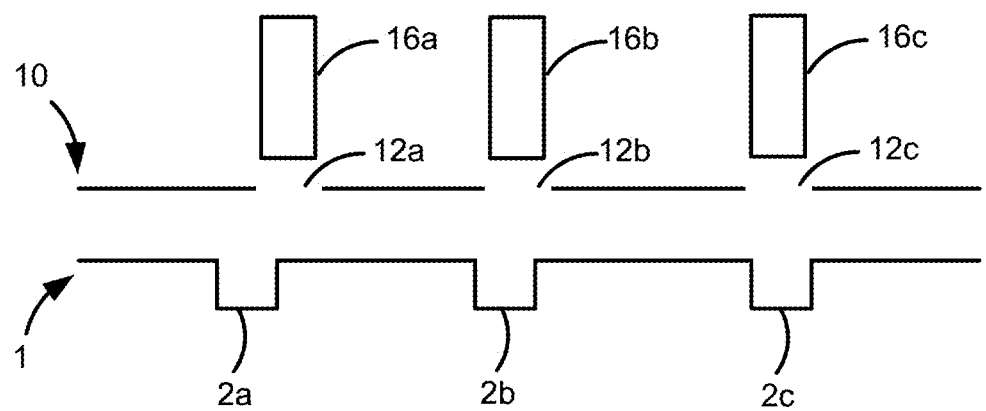
FIG. 4 illustrates a side view of an exemplary multiwell plate 1 with a cover 10 that includes representative holes 12 *a-c* in the cover above each representative well 2 *a-c* and representative blowers 16 *a-c* above the holes 12 *a-c* and wells 2 *a-c*. Representative holes 12 *a* and *b* and representative blowers 16 *a* and *b* are not directly aligned over representative wells 2 *a* and *b* (wherein representative wells 2 *a* and *b* are load wells or read wells or both, but are preferably load wells). Representative hole 12 *c* and representative blower 16 *c* are directly aligned over representative well 2 *c*. Only representative wells 2 *a-c*, holes 12 *a-c*, and blowers 16 *a-c* are shown in FIG. 4.

The following description of the present technology is merely intended to illustrate various embodiments of the invention. As such, the specific modifications discussed are not to be construed as limitations on the scope of the invention. It will be apparent to one skilled in the art that various equivalents, changes, and modifications may be made without departing from the scope of the invention, and it is understood that such equivalent embodiments are to be included herein.

Definitions

As used herein, the term "about" means encompassing plus or minus 10%. For example, about 90% refers to a range encompassing between 81% and 99% nucleotides. As used herein, the term "about" is synonymous with the term approximately.

Unless otherwise indicated or the context suggests otherwise, as used herein, "a" or "an" means "at least one" or "one or more."

The word "or" as used herein means any one member of a particular list and also includes any combination of members of that list.

The word "air knife" means a tool used to blow off liquid or debris from products.

The word "cover" is synonymous with "lid" or "cap" or "impedance device" or "top plate."

The word "processing instrument" as used herein means any instrument that enables visualization of detected analytes in a sample. Examples of suitable detection systems include systems that depend on detection of color, radioactivity, fluorescence, chemiluminescence or electrochemical signals.

"Laminar flow" refers to a phenomenon where air, gas, or a liquid flow in parallel layers and there is no mixing of layers. It is the opposite of turbulent flow, where the molecules are constantly mixing and moving in varied ways across a space.

"Array of blowers" means an ordered series or arrangement of blowers. "Array of blowers" includes blowers that are indexed over the wells and/or holes in the cover above the wells of the multiwell plate, formed into a grid pattern where each individual blower blows air onto a portion of the multiwell plate, and collectively, the array of blowers blows air down onto the entire multiwell plate (or multiple multiwell plates), or formed into an arrangement where each individual blower blows air down over the entire surface of a single multiwell plate in a shower.

The term "multiwell plate," also known as a microwell plate or multiwell plate, as used herein, refers a flat plate with multiple "wells" used as small test tubes. As used herein, when referring to a multiwell plate, the plate may have a cover or may not have a cover.

The term "traditional multiwell plate," as used herein, refers to a multiwell plate comprising only a single plurality of essentially identical wells. Traditional multiwell plates include, e.g., traditional 96-well, 384-well, or 1536-well plates. The wells of different traditional multiwell plates can have different properties, such as different optical properties, shapes, or different surface coatings. Different traditional multiwell plates can be optimized for different assay formats or different analytes. For example, traditional multiwell plates include plates wherein all wells have clear or translucent bottoms (e.g., Corning® 96 well plates, clear bottom; Corning® 96 well plates, UV-translucent; Greiner® Sensoplate™ glass bottom multiwell plates; Greiner polypropylene multiwell plates, including black, clear, green, red, yellow), all wells have opaque bottoms (e.g., Corning® 96 well plates, opaque (white or black)), all wells have non-binding (e.g., non-protein or nucleotide-binding) surfaces (e.g., Corning® 96 well or 384 well plates, non-binding surface, Corning® Costar® ultra-low attachment multiwell plate), all wells have high-binding (e.g., high protein or nucleotide-binding) surfaces (e.g., Nunc-Immuno™ or MaxiSorp™ 96 well or 384 well plates; Greiner® high and medium-binding 96 well, 384 well, or 1536 well plates, Corning® Sulfhydryl-BIND™, Universal-BIND™, Carbo-BIND™, or DNA-BIND™ surface 96 well plates), all wells have filter bottoms (Corning® filter plates; glass fiber or PVDF membrane), all wells have coatings to promote cell attachment or cell proliferation (e.g., Corning® osteo assay surface 96 well plates; Corning® CellBIND® 384 well plates), all wells are sterile (e.g., Corning® osteo assay surface 96 well plates; Corning® CellBIND® 384 well plates), all wells have round bottoms (e.g., Corning® 384 well polypropylene plates), or all wells have flat bottoms (e.g., Greiner® high and medium binding 96 well, 384 well, or 1536 well plates with clear, black or white bottoms).

As used herein, the term "wells" refers to wells for performing an analytical assay. In this context, the term "wells" is used synonymously with "assay wells." The term "well" includes well-like structures, such as troughs, used to store bulk reagents, such as assay buffers, or samples on a well.

The disclosure is based, in part, on the realization that the field of DTC diagnostics can benefit from an assay platform that allows for reliable, low-cost testing of a very small volume of a consumer's biological sample (e.g., a blood sample of 25-100 l). A desirable assay platform can, e.g., conduct a parallel and robust analysis of multiple analytes, e.g., analytes in a multianalyte set. A multianalyte set can, for example, be related to the consumer's health or general wellness. A multianalyte set can include, e.g., one or more analytes of different analyte classes, such as small molecule analytes (e.g., <500 Da; cholesterol, glucose), large molecule analytes (e.g., >10 kDa; cytokines, hemoglobin, DNA), or a cell (e.g., a bacterial or eukaryotic cell; mammalian cell; red blood cell or leukocyte). But, manufacturing DTC diagnostics comprising one or more analytes of different analyte classes can be difficult and time-consuming.

Multiwell Plate Comprising a Cover, the Cover Comprising Holes Arranged Over the Wells In one aspect, provided herein is a cartridge comprising a reaction vessel and a cover, the cover having holes in it arranged over the reaction vessel. In some embodiments, the reaction vessel comprises two portions, a load portion and a read portion. In some embodiments, the cover comprise two portions, a cover load portion and a cover read portion. In some embodiments, the cover load portion is a hole and the cover read portion is a hole. In some embodiments, the cover load portion is a hole and the cover read portion is not a hole. In some embodiments, the cover load portion is a hole and the cover read portion is a surface.

In one aspect, provided herein is a multiwell plate comprising a cover, the cover having holes arranged over the wells in the multiwell plate. In one aspect, provided herein is a multiwell plate comprising a cover, the cover having holes arranged over the load wells and the read wells in the multiwell plate. The location, size, and shape of the holes may be varied according to the reagents in the well, the location, size, or shape of the well, or the assay to be performed. Determining the location, size, and shape of the holes is within the skill of an artisan based on the drying needs. FIG. 1 shows an exemplary multiwell plate. The circular multiwell plate 101 comprises a cylindrical central well 102 (e.g., for storing an assay buffer or a diluent). Two representative cylindrical wells, 104 and 105, are shown in a 15-degree section 103 of the multiwell plate 101. Representative wells 104 and 105 differ, at least with respect to their diameters. Representative wells 104 and 105 are representative wells of two different pluralities of wells that are arranged in concentric circles 104' and 105', which are centered around the central well of the multiwell plate. Only representative wells 104 and 105 are shown in FIG. 1 and the remaining wells of each of the two different pluralities of wells are indicated by concentric circles 104' and 105'. The plurality of wells represented by well 105 are positioned on the peripheral circle of wells (105') on multiwell plate 101 (i.e., on the outermost circle of wells). The plurality of wells represented by well 104 are positioned on an inner circle 104' of wells on multiwell plate 101 (i.e., a circle of wells positioned between the peripheral circle of wells 105' and the central well 102). Each of the two pluralities of wells represented by wells 104 and 105 on multiwell plate 101 comprises 24 wells (i.e., one well per 15-degree section of the circular plate). The diameter of representative well 105 is greater than the diameter of representative well 104. In some embodiments, the diameter of well 105 is 15 mm. FIG. 1A is a top view of the exemplary multiwell plate. FIG. 1B is a side view of the exemplary multiwell plate. FIG. 1C is a perspective view of the exemplary multiwell plate. FIG. 1D is a bottom view of the exemplary multiwell plate.

In one aspect, provided herein is a cover for a multiwell plate. In one aspect, provided herein is a cover for a multiwell plate, the cover having holes in it. FIG. 2 illustrates an exemplary multiwell plate 1 with a cover 10, the cover having a plurality of holes arranged over the plurality of wells in the multiwell plate, and at least one well with liquid reagents (collectively 201, referred throughout as a "covered multiwell plate"). The cover 10 may or may not cover the entire multiwell plate. Two representative holes in the cover, 204 and 205, are shown in a 15-degree section 203 of the multiwell plate. Representative holes 204 and 205 differ, at least with respect to their diameters. Cover holes 204 and 205 are aligned over representative wells 104 and 105, respectively (or in some cases a well inlet or a load well inlet). Cover holes 204 and 205 are larger than wells 104 and 105, respectively. Holes 204 and 205 are representative holes of two different pluralities of cover holes that are arranged in concentric circles 204' and 205', which are centered around the central well of the multiwell plate. Only representative holes 204 and 205 are shown in FIG. 2 and the remaining holes of each of the two different pluralities of holes are indicated by concentric circles 204' and 205'. The plurality of holes represented by hole 205 are positioned on the peripheral circle of cover holes (205') on the cover 10 (i.e., on the outermost circle of holes). The plurality of cover holes represented by hole 204 are positioned on an inner circle 204' of holes on the cover 10 (i.e., a circle of holes positioned between the peripheral circle of holes 205' and the central well 102). Each of the two pluralities of holes represented by cover holes 204 and 205 on the cover 10 comprises 24 holes (i.e., one hole per 15-degree section of the cover). As shown, the diameter of representative cover hole 205 is greater than the diameter of representative hole 204. But, the diameter of representative cover hole 205 can be the same or smaller than the diameter of representative hole 204. In some embodiments, the diameter of hole 205 is 15 mm. FIG. 2A is a top view of the exemplary covered multiwell plate. FIG. 2B is a side view of the exemplary covered multiwell plate. FIG. 2C is a perspective view of the exemplary covered multiwell plate. FIG. 2D is a bottom view of the exemplary covered multiwell plate.

In one aspect, provided herein is an exemplary multiwell plate 1 with a cover 10, the cover having a plurality of holes arranged over the plurality of wells in the multiwell plate and a plurality of blowers are arranged over the cover holes/wells (collectively referred throughout as an "manufacturing system"). In some embodiments, the plurality of wells in the multiwell plate comprise load wells and read wells. In some embodiments, the blowers are only arranged over the plurality of load wells in the multiwell plate and not the plurality of read wells. In some embodiments, the blowers are arranged over the plurality of load wells in the multiwell plate and the plurality of read wells.

FIG. 3 illustrates an exemplary multiwell plate 1 with a cover 10 and representative air blowers 304 and 305 (collectively 301). Two representative air blowers, 304 and 305, are shown above the multiwell plate. Air blowers 304 and 305 are aligned over wells 104 and 105 and over cover holes 204 and 205, respectively. In some embodiments, the wells 104 and 105 are load wells. In some embodiments, air blowers are aligned over load well inlets and over cover load holes. Air blowers 304 and 305 are representative air blowers of two different pluralities of air blowers that are arranged above concentric circles 204' and 205', which are centered around the central well of the multiwell plate. Only representative air blowers 304 and 305 are shown in FIGS. 3A and 3B. The plurality of air blowers represented by air blower 305 are positioned above the peripheral circle of holes (205) in the cover 10 (i.e., on the outermost circle of holes). The plurality of air blowers represented by air blower 304 are positioned above an inner circle 204 of holes in the cover 10 (i.e., a circle of holes positioned between the peripheral circle of holes 205' and the central well 102). Each of the two pluralities of air blowers represented by air blowers 304 and 305 comprises 24 air blowers (i.e., one air blowers per 15 degree section of the circular plate). FIG. 3A is a side view of the exemplary manufacturing system. FIG. 3B is a perspective view of the exemplary manufacturing system.

Location of the Holes

Figure 5:
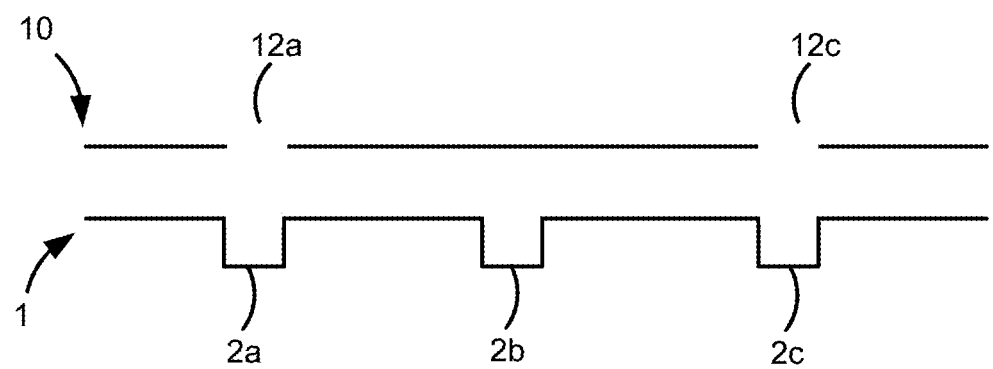
FIG. 5 illustrates a side view of an exemplary multiwell plate 1 with a cover 10 that does not include a one-to-one correspondence between the representative holes in the cover and the representative wells in the multiwell plate. Only representative wells 2 *a-c* and holes 12 *a* and 12 *c* are shown in FIG. 5.

In some embodiments, there is a one-to-one relationship between the location of the wells in the multiwell plate and the location of the holes in the top plate. See FIG. 7, showing a cover 10 (FIG. 7A) with representative holes 12 a-c over a multiwell plate 1 with representative wells 2 a-c (FIG. 7B). In some embodiments, there is not a one-to-one relationship between the location of the wells in the multiwell plate and the location of the holes in the cover, i.e., some wells do not have a hole in the cover above them (See FIG. 5 showing a cover 10 with representative holes 12 a and c, over a multiwell plate 1 with representative wells 2 a-c, representative well 2 b is covered; i.e. does not have a hole above it); or the location of the hole in the cover is not directly aligned over the well (and/or well inlet) (See FIG. 4 showing a cover 10 with representative holes 12 a-c, over a multiwell plate 1 with representative wells 2 a-c wherein holes 12 a and b are not directly aligned over the wells 2 a and b. Holes 12 a and b have a different percentage of alignment with the holes 2a and 2b respectively). In some embodiments, there is a one-to-one relationship between the location of the load wells in the multiwell plate and the location of the load holes in the top plate. In some embodiments, there is a one-to-one relationship between the location of the read wells in the multiwell plate and the location of the read holes in the top plate. In some embodiments, there is a one-to-one relationship between the location of the load and read wells in the multiwell plate and the location of the load and read holes in the top plate. In some embodiments, there is not a one-to-one relationship between the location of the load and read wells in the multiwell plate and the location of the load and read holes in the top plate. In some embodiments, there is no hole in the top plate above the read well, instead the top plate is made of a transparent material so that it does not interfere with optical detection.

In some embodiments, the location of the holes in the cover mirrors the location of the wells in the multiwell plate. In some embodiments, the location of the load holes in the cover mirrors the location of the load wells in the multiwell plate. In some embodiments, the location of the read holes in the cover mirrors the location of the read wells in the multiwell plate. In some embodiments, the location of the load and read holes in the cover mirrors the location of the load and read wells in the multiwell plate. For example, if the wells are arranged in a circular pattern, the holes in the cover are also arranged in a circular pattern. See FIG. 7 A-B showing a cover 10 with representative holes 12 a-c arranged in a circular pattern over a multiwell plate 1 having representative wells 2 a-c arranged in a circular pattern. If the wells are arranged in a square grid pattern, the holes in the cover are arranged in a square grid pattern. If the wells are arranged in a triangular grid pattern, the holes in the cover are arranged in a triangular grid pattern. If the wells are arranged in concentric circles around the center of the multiwell plate, the holes in the cover are arranged in concentric circles around the center of the multiwell plate. If the wells are arranged in a spokes-like arrangement, the holes in the cover are arranged in a spokes-like arrangement. If the wells are arranged on two or more concentric circles on the multiwell plate, the holes in the cover are arranged on two or more concentric circles on the multiwell plate. In some embodiments, the cover for a multiwell plate comprises an array of holes arranged in a circular pattern, in a square grid pattern, in a triangular grid pattern, in concentric circles around the center of the multiwell plate, or in a spokes-like arrangement.

In some embodiments, the cover for a multiwell plate comprises an array of holes wherein each hole in the array is not perfectly aligned with the well (and/or well inlet) in the multiwell plate. In some embodiments, the cover for a multiwell plate comprises an array of load holes wherein each load hole in the array is not perfectly aligned with the load well in the multiwell plate. In some embodiments, the cover for a multiwell plate comprises an array of read holes wherein each read hole in the array is not perfectly aligned with the read well in the multiwell plate. In some embodiments, the cover for a multiwell plate comprises an array of load and read holes wherein each load and read hole in the array is not perfectly aligned with the load and read well in the multiwell plate. In some embodiments, the cover for a multiwell plate comprises an array of holes wherein each hole in the array of holes is 95% aligned with the plurality of wells in the multiwell plate. In some embodiments, the cover for a multiwell plate comprises an array of holes wherein each hole in the array of holes is 90% 85%, 80%, 75%, 70%, 65%, 60%, 55%, 50%, 45%, 40%, 35%, 30%, 25%, 20%, 15%, 10%, 5%, or 0% aligned with the plurality of wells in the multiwell plate. In some embodiments, the cover for a multiwell plate comprises an array of holes wherein each hole in the array of holes is 5%-20% aligned with the plurality of wells in the multiwell plate. In some embodiments, the cover for a multiwell plate comprises an array of holes wherein each hole in the array of holes is 20%-60% aligned with the plurality of wells in the multiwell plate. In some embodiments, the cover for a multiwell plate comprises an array of holes wherein each hole in the array of holes is 60%-95% aligned with the plurality of wells in the multiwell plate. In some embodiments, the cover for a multiwell plate comprises an array of holes wherein a first portion of holes in the array of holes is aligned with a well in the multiwell plate and a second portion of holes in the array of holes is not aligned with a well in the multiwell plate. In some embodiments, the cover for a multiwell plate comprises an array of holes wherein a first portion of holes in the array of holes is 100% aligned with a well in the multiwell plate and a second portion of holes in the array of holes is 5-95% aligned with a well in the multiwell plate.

In some embodiments, the cover for a multiwell plate comprises an array of holes wherein 95% of the holes in the array of holes are aligned with the plurality of wells in the multiwell plate and the rest of the holes are not aligned wherein holes referes to load holes and/or read holes and wells refers to load wells and/or read wells. In some embodiments, the cover for a multiwell plate comprises an array of holes wherein 90%, 85%, 80%, 75%, 70%, 65%, 60%, 55%, 50%, 45%, 40%, 35%, 30%, 25%, 20%, 15%, 10%, 5%, or 0% of the holes in the array of holes are aligned with the plurality of wells in the multiwell plate and the rest of the holes are not aligned. In some embodiments, the cover for a multiwell plate comprises an array of holes wherein 5%-20% of the holes in the array of holes are aligned with the plurality of wells in the multiwell plate and the rest of the holes are not aligned. In some embodiments, the cover for a multiwell plate comprises an array of holes wherein 20%-60% of the holes in the array of holes are aligned with the plurality of wells in the multiwell plate and the rest of the holes are not aligned. In some embodiments, the cover for a multiwell plate comprises an array of holes wherein 60%-95% of the holes in the array of holes are aligned with the plurality of wells in the multiwell plate and the rest of the holes are not aligned. In some embodiments, the cover for a multiwell plate comprises an array of holes wherein 60%-95% of the holes in the array of holes are 100% aligned with a well in the multiwell plate and 1-50% of the holes are 5-95% aligned with a well (and/or well inlet) in the multiwell plate.

In some embodiments, each hole in the top plate comprises two open portions a first open portion that is designed to cover a read well in a multiwell plate and a second open portion that is designed to cover the read well in a multiwell plate. In some embodiments, each hole in the top plate comprises one open portion a first open portion that is designed to cover a load well and a second closed portion that is designed to cover the read well, i.e., there is not an open space in the cover above the read well in a multiwell plate. In some embodiments, the open portion that is designed to cover the load well is called the cover load hole. In some embodiments, the open portion that is designed to cover the read well is called the cover read hole. In embodiments describing a hole or a cover hole encompass both the cover load hole and/or cover read hole.

Size of the Multiwell Plate Cover Holes

As discussed, the cover for a multiwell plate comprises an array of holes wherein each hole in the array of holes has a dimension that allows the liquid in the wells of a multiwell plate to dry quickly during manufacturing. The size and shape of the holes in the cover for a multiwell plate will vary depending on the dimensions of the well, which may vary in height, width, length, radius, diameter, content or volume of the well.

Figure 6:
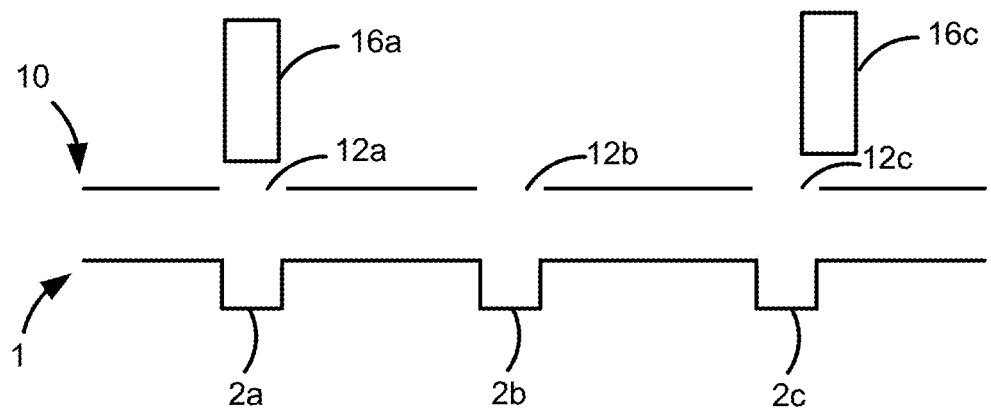
FIG. 6 illustrates a side view of an exemplary multiwell plate 10 with a cover 1, where cover hole 12*b* and well 2*b* don't have an associated blower. Only representative wells 2 *a-c*, holes 12 *a-c*, and blowers 16 *a-c* are shown in FIG. 6.
Figure 8:
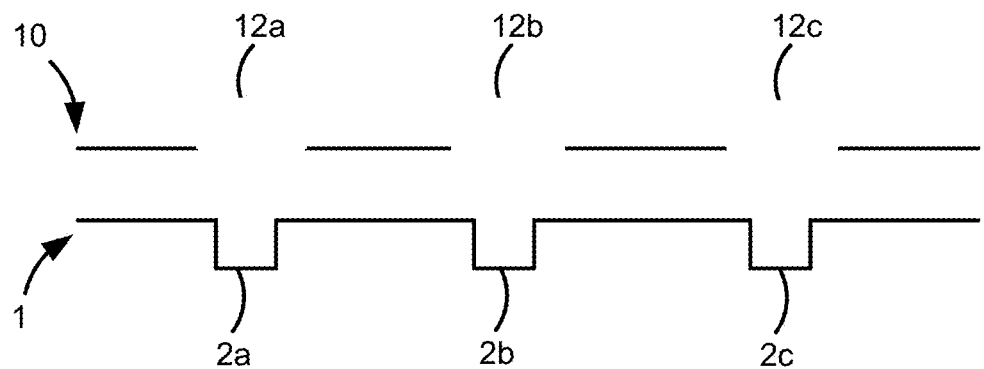
FIG. 8 illustrates a side view of an exemplary multiwell plate 1 with a cover 10 where the representative holes 12 *a-c* in the cover are larger in diameter than the representative wells 2 *a-c* in the multiwell plate. Only representative wells 2 *a-c* and holes 12 *a-c* are shown in FIG. 8.
Figure 9:
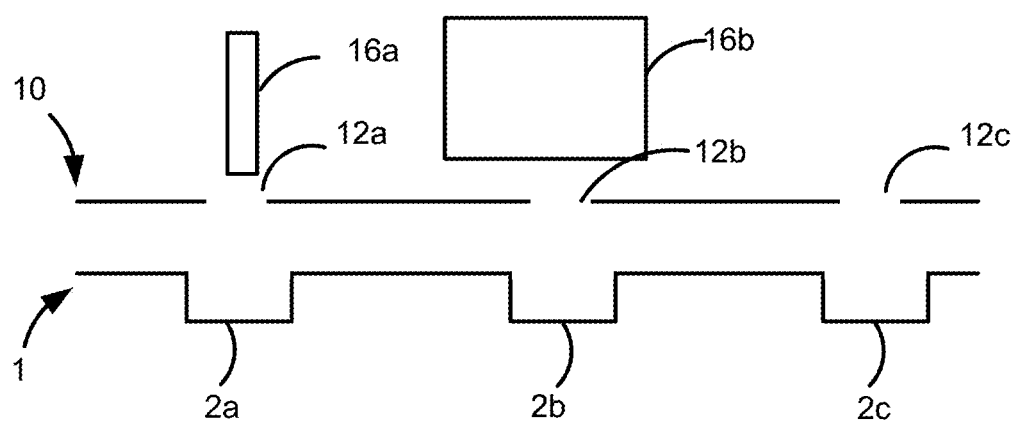
FIG. 9 illustrates a side view of an exemplary cover 10 where the representative holes 12 *a-c* in the cover are smaller in diameter than the representative wells 2 *a-c* in the multiwell plate 1. The representative blowers 12 *a* and *b* have a different diameter than the representative holes 12 *a* and *b* in the cover and the representative wells 12 *a* and *b*. Only representative wells 2 *a-c*, holes 12 *a-c*, and blowers 16 *a-b* are shown in FIG. 9.

In some embodiments, the cover for a multiwell plate comprises an array of holes wherein each hole has the same diameter as the well it covers, whether the cover is designed to cover is a load well or a read well. See, for example, FIG. 6 showing the holes in the cover 12 a-c are the same size (diameter) as the representative wells 2 a-c in the multiwell plate 1. In some embodiments, the cover for a multiwell plate comprises an array of holes wherein each hole in the cover has a larger diameter than the well it covers. See, for example, FIG. 8 showing the representative holes in the cover 12 a-c have a larger diameter than the representative wells 2 a-c in the multiwell plate 1. In some embodiments, the cover for a multiwell plate comprises an array of holes wherein each hole has a smaller diameter than the well it covers. See, for example, FIG. 9 showing the representative holes in the cover 12 a-c have a smaller diameter than the representative wells 2 a-c in the multiwell plate 1.

In some embodiments, the cover for a multiwell plate comprises an array of holes wherein a first portion of the holes in the array of holes has a larger diameter than the well it is designed to cover and a second portion of holes in the array of holes has a smaller diameter than the well it is designed to cover whether the cover is designed to cover is a load well or a read well. In some embodiments, the cover for a multiwell plate comprises an array of holes wherein a first portion of the holes in the array of holes has a larger diameter than the well it is designed to cover and a second portion of holes in the array of holes has a diameter that matches the diameter of the well it is designed to cover. In some embodiments, the cover for a multiwell plate comprises an array of holes wherein a first portion of the holes in the array of holes has a smaller diameter than the well it is designed to cover and a second portion of holes in the array of holes has a diameter that matches the diameter of the well it is designed to cover. In some embodiments, the cover for a multiwell plate comprises an array of holes wherein a first portion of the holes in the array of holes has a larger diameter than the well it is designed to cover, a second portion of holes in the array of holes has a smaller diameter than the well it is designed to cover; and a third portion of holes in the array of holes has a diameter that matches the diameter of the well it is designed to cover.

In some embodiments, the cover for a multiwell plate comprises an array of holes wherein a first portion of the holes in the array of holes has a larger shape and size than the well it is designed to cover and a second portion of holes in the array of holes has a smaller shape and size than the well it is designed to cover whether the cover is designed to cover is a load well or a read well. In some embodiments, the cover for a multiwell plate comprises an array of holes wherein a first portion of the holes in the array of holes has a larger shape and size than the well it is designed to cover and a second portion of holes in the array of holes has a shape and size that matches the shape and size of the well it is designed to cover. In some embodiments, the cover for a multiwell plate comprises an array of holes wherein a first portion of the holes in the array of holes has a smaller shape and size than the well it is designed to cover and a second portion of holes in the array of holes has a shape and size that matches the shape and size of the well it is designed to cover. In some embodiments, the cover for a multiwell plate comprises an array of holes wherein a first portion of the holes in the array of holes has a larger shape and size than the well it is designed to cover, a second portion of holes in the array of holes has a smaller shape and size than the well it is designed to cover; and a third portion of holes in the array of holes has a shape and size that matches the shape and size of the well it is designed to cover.

In some embodiments, the cover for a multiwell plate comprises an array of holes wherein each hole in the array of holes comprises a first diameter, and each multiwell plate comprises a plurality of wells and the plurality of wells comprises a second diameter. In some embodiments, the first diameter and the second diameter are the same. In some embodiments, the first diameter is larger than the second diameter. In some embodiments, the first diameter is smaller than the second diameter. Regardless of the size of the multiwell plate's well, the cover and the hole in the cover must be configured to allow air to enter the well in a turbulent but diffuse way.

In some embodiments, the cover for a multiwell plate comprises an array of holes with different diameters. In some embodiments, the cover for a multiwell plate comprises an array of holes wherein a first portion of the holes in the array of holes has a larger diameter than a second portion of holes in the array of holes. In some embodiments, the cover for a multiwell plate comprises an array of holes wherein a first portion of the holes in the array of holes has a smaller diameter than a second portion of the holes in the array of holes. In some embodiments, the cover for a multiwell plate comprises an array of holes wherein a first portion of the holes in the array of holes has a first diameter and a second portion of the holes in the array of holes has a second diameter, wherein the first diameter and second diameter are different.

In some embodiments, the cover for a multiwell plate comprises an array of holes wherein each hole in the array of holes has a diameter of between about 5.0 mm and about 7.0 mm. In some embodiments, the cover for a multiwell plate comprises an array of holes wherein each hole in the array of holes has a diameter of between about 2.0 mm and about 7.0 mm. In some embodiments, the cover for a multiwell plate comprises an array of holes wherein each hole in the array of holes has a diameter of between about 4.0 mm and about 8.0 mm or about 1.0 mm and about 8.0 mm.

Shape of the Multiwell Plate Cover Holes

As depicted in FIG. 7A, the cover holes (load hole or read hole) can have different shapes. For example, in FIG. 7A, 12 *a-c* are circular holes and 14 *a-c* are rectangular holes. In some embodiments, the cover for a multiwell plate comprises an array of holes wherein the holes are circular, rectangular, or triangular. Regardless of the shape of the well, the cover and the hole in the cover must be configured to allow air to enter the well in a turbulent but diffuse way.

Figure 10A:
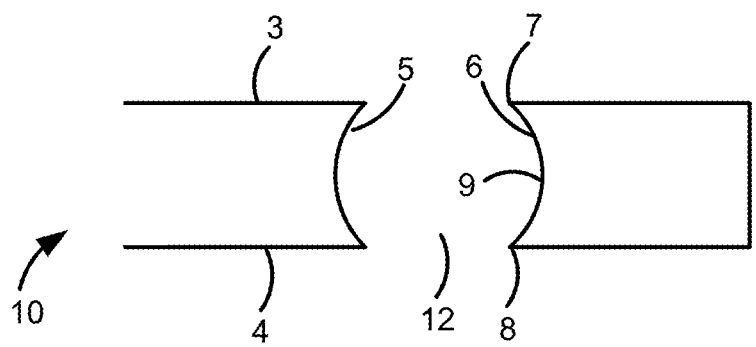
FIG. 10A illustrates a side view of an exemplary cover 10 where the exemplary hole 12 in the cover is cylindrical.
Figure 10B:
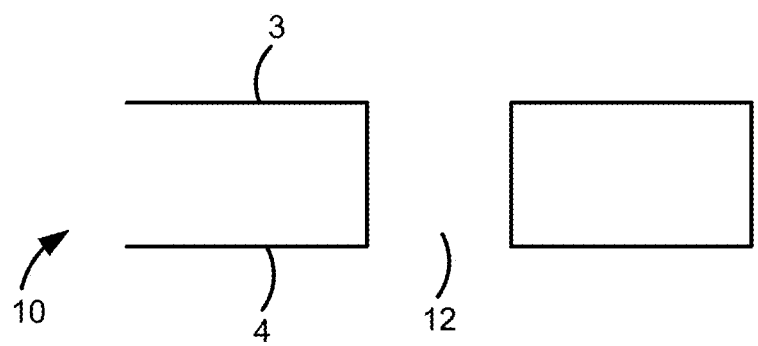
FIG. 10B illustrates a side view of an exemplary cover 10 where the exemplary hole 12 in the cover is rectangular.
Figure 10C:
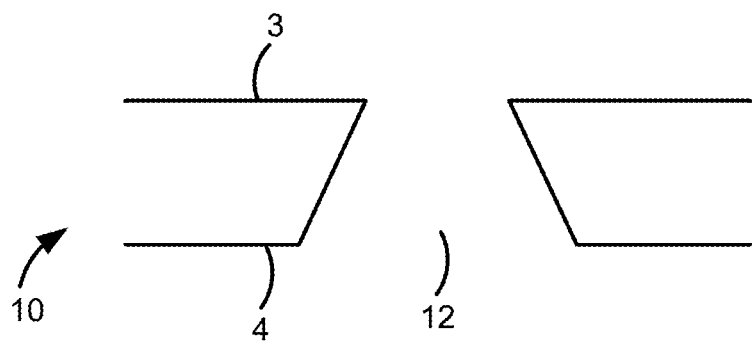
FIG. 10C illustrates a side view of an exemplary cover 10 where the exemplary hole 12 in the cover is a triangular prism.
Figure 10D:
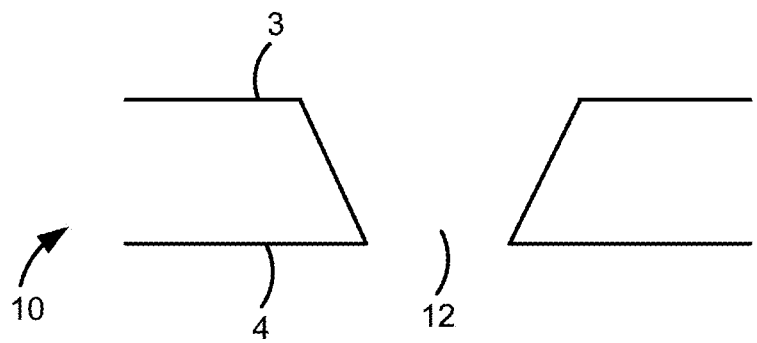
FIG. 10D illustrates a side view of an exemplary cover 10 where the exemplary hole 12 in the cover is a cone.
Figure 10E:
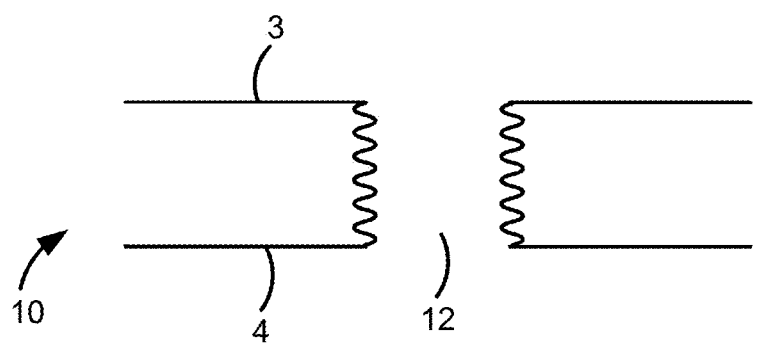
FIG. 10E illustrates a side view of an exemplary cover 10 where the exemplary hole 12 in the cover is threaded.
Figure 10F:
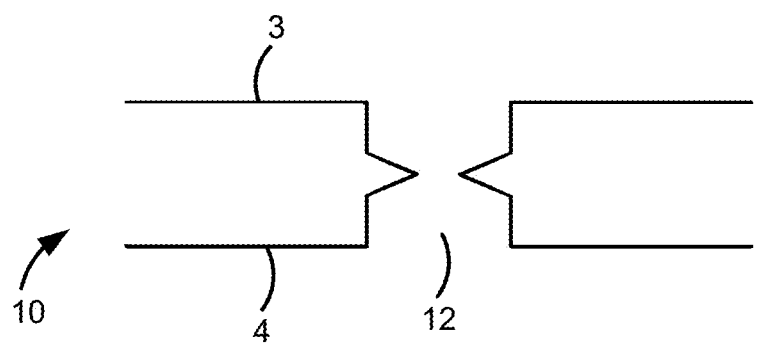
FIG. 10F illustrates a side view of an exemplary cover 10 where the exemplary hole 12 in the cover comprises a diameter halfway through the well that is smaller than a diameter at the top of the well and a diameter at the bottom of the well.

In some embodiments, the cover for a multiwell plate comprises a top side, a bottom side, and a hole formed between the top side and the bottom side. See FIG. 10A showing a cover for a multiwell plate 10 comprising a top side 3, a bottom side 4 and a hole 12 formed between the top side 3 and the bottom side 4. The hole has a first side 5 and a second side 6. The hole has a first end 7, a second end 8 and a middle portion 9. The hole 12 may have the shape of a cylindrical (FIG. 10A, showing the hole as concave in, but it may also be concave out), a rectangle (FIG. 10B, see representative hole 12), triangular prism (FIG. 10C, see representative hole 12), or a cone (FIG. 10D, see representative hole 12). The hole 12 may have a cross-section that is tapered (FIGS. 10C and 10D). The hole 12 may have a cross-section that is threaded (FIG. 10E, see representative hole 12). The hole 12 may have a cross-section that comprises a diameter halfway through the well that is smaller than the diameter at the top of the well and the diameter at the bottom of the well (FIG. 10F, see representative hole 12).

Figure 10G:
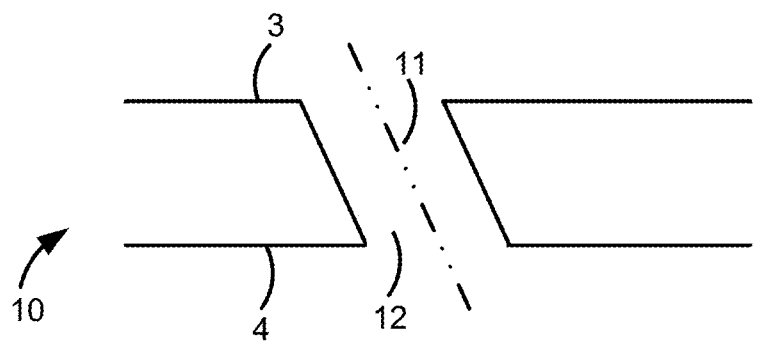
FIG. 10G illustrates a side view of an exemplary cover 10 where the exemplary hole 12 in the cover comprises an axis wherein the axis of each hole is not perpendicular to a surface of the multiwell plate.

In some embodiments, the cover for a multiwell plate comprises an array of holes wherein each hole in the array of holes comprises an axis 11, wherein the axis 11 of each hole is not perpendicular to the surface of the multiwell plate (FIG. 10G, see representative hole 12). In some embodiments, a first portion of the holes in the array of holes has a first axis, wherein the first axis is not perpendicular to the surface of the multiwell plate, and a second portion of the holes in the array of holes has a second axis, wherein the second axis is perpendicular to the surface of the multiwell plate. In some embodiments, the cover for a multiwell plate comprises a top surface and a bottom surface and an array of holes wherein each hole in the array of holes comprises an axis, wherein the axis of each hole is not perpendicular to the surface of the top surface. In some embodiments, a first portion of the holes in the array of holes has a first axis wherein the first axis is not perpendicular to the top surface of the cover, and a second portion of the holes in the array of holes has a second axis wherein the second axis is perpendicular to the top surface of the cover.

Figure 10H:
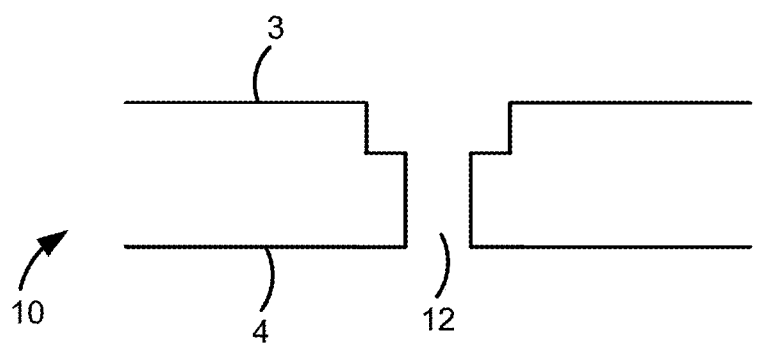
FIG. 10H illustrates a side view of an exemplary cover 10 where the exemplary hole 12 in the cover is counterbored.

In some embodiments, the cover for a multiwell plate comprises an array of holes wherein at least one hole in the array of holes is counterbored (FIG. 10H, see representative hole 12). In some embodiments, the cover for a multiwell plate comprises an array of holes wherein a first portion of the holes in the array of holes is counterbored and a second portion of the holes in the array of holes is not counterbored.

Figure 10I:
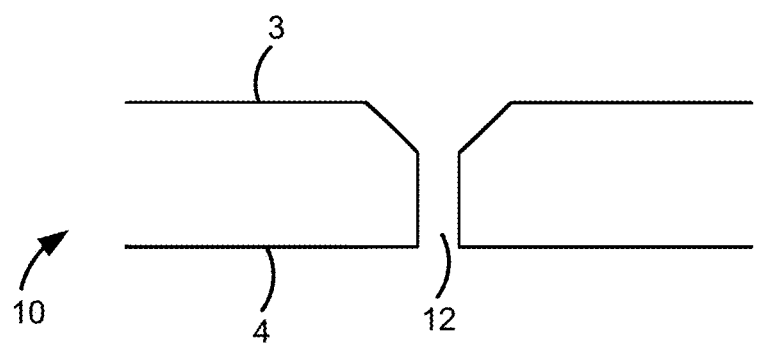
FIG. 10I illustrates a side view of an exemplary cover 10 where the exemplary hole 12 in the cover is countersunk.

In some embodiments, the cover for a multiwell plate comprises an array of holes wherein at least one hole in the array of holes is countersunk (FIG. 10I, see representative hole 12). In some embodiments, the cover for a multiwell plate comprises an array of holes wherein a first portion of the holes in the array of holes is countersunk and a second portion of the holes in the array of holes is not countersunk.

In some embodiments, the cover for a multiwell plate comprises an array of holes wherein a first portion of the holes in the array of holes has a first shape and a second portion of the holes in the array of holes has a second shape wherein the first shape and the second shape are different. In some embodiments, the cover for a multiwell plate comprises an array of holes wherein a first portion of the holes in the array of holes comprises a cross-section that is tapered and a second portion of the holes in the array of holes comprises a cross-section that is not tapered.

In some embodiments, the cover for a multiwell plate comprises an array of holes wherein a first portion of holes in the array of holes comprises a first diameter and a first shape, and a second portion of holes in the array of holes comprises a second diameter and a second shape. In some embodiments, the first diameter and the second diameter are different. In some embodiments, the first shape and the second shape are different.

Shape of the Cover Compared to the Multiwell Plate

In some embodiments, the multiwell plate and the cover have the same shape. See, e.g., FIGS. 7A and 7B. In some embodiments, the multiwell plate and cover each have a different shape, which can be chosen from the group consisting of a circle, a rectangle, a square, or an octagon. In some embodiments, the multiwell plate has a first shape and the cover has the same first shape. In some embodiments, the multiwell plate has a circular shape and the cover also has a circular shape. In some embodiments, the multiwell plate has a rectangular shape and the cover also has a rectangular shape. In some embodiments, the multiwell plate has a first shape and the cover has a different second shape.

In some embodiments, the cover for a multiwell plate covers the entire multiwell plate. In some embodiments, the cover for a multiwell plate covers 95% of the multiwell plate. In some embodiments, the cover for a multiwell plate covers 90% 85%, 80%, 75%, 70%, 65%, 60%, 55%, 50%, 45%, 40%, 35%, 30%, 25%, 20%, 15%, 10%, 5%, of the multiwell plate. In some embodiments, the cover for a multiwell plate covers 5%-20% of the multiwell plate. In some embodiments, the cover for a multiwell plate covers 20%-60% of the multiwell plate. In some embodiments, the cover for a multiwell plate covers 60%-100% of the multiwell plate.

Fitting Together the Cover and the Multiwell Plate

In some embodiments, the cover for a multiwell plate and the multiwell plate are fitted together. In some embodiments, the cover for a multiwell plate and the multiwell plate are removably attached to each other. In some embodiments, the cover for a multiwell plate and the multiwell plate are detachably connected to each other via a fastening member such as a clamp, lap joints, or brackets on the perimeter of the cover and/or multiwell plate (see e.g., FIG. 1C at item 106 and FIG. 2C and FIG. 3B at item 206). In some embodiments, the cover for a multiwell plate and the multiwell plate are detachably coupled to each other in a locking manner via a fastening member such as a clamp, lap joints, or brackets on the perimeter of the cover and/or multiwell plate (See FIG. 1C at item 106 and FIG. 2C and FIG. 3B at item 206). In some embodiments, the cover for a multiwell plate and the multiwell plate are attached to each other in a non-locking manner via a fastening member such as a clamp, lap joints, or brackets on the perimeter of the cover and/or multiwell plate (not shown).

In some embodiments, the cover for a multiwell plate and the multiwell plate are fastened to each other such that hole 13 in the cover 10 slides into hole 15 in the multiwell plate 1 (See FIGS. 7A and 7B). In some embodiments, the cover for a multiwell plate and the multiwell plate are nested together via hole 13 in the cover 10 and hole 15 in multiwell plate 1 (See FIGS. 7A and B). In some embodiments, the cover for a multiwell plate and the multiwell plate are nested together via hole 13 in the cover 10 and hole 15 in multiwell plate 1 (See FIGS. 7A and B) and then detachably coupled to each other via clamps, lap joints or brackets. The clamps, lap joints or brackets can be in hole 13, or on the periphery of the device 16.

In some embodiments, the cover for a multiwell plate and the multiwell plate are fastened to each other by a collar or ring-shaped fastening element which fits around the perimeter of the cover for a multiwell plate and the multiwell plate. In some embodiments, the cover for a multiwell plate and the multiwell plate are fastened to each other by placing them into a carrier component that holds both portions in alignment. In some embodiments, the cover for a multiwell plate and the multiwell plate are fastened to each other by placing an adhesive on the bottom surface of the multiwell plate that holds the cover to the multiwell plate. In some embodiments, the cover for a multiwell plate and the multiwell plate are fastened to each other by a threading on the perimeter of the cover (not shown) that aligns with a threading on the perimeter (item 16 in FIG. 7B) of the multiwell plate. In some embodiments, the cover for a multiwell plate and the multiwell plate are fastened to each other by at least one protrusion (such as a pin, petal, or lug) on the perimeter of the cover (not shown) that aligns with at least one slot in the multiwell plate (not shown). In some embodiments, the cover for a multiwell plate and the multiwell plate are fastened to each other by at least one protrusion (such as a pin, petal, or lug) on the perimeter of the multiwell plate (not shown) that aligns with at least one slot in the cover (not shown). When the protrusion slides into the slot, the cover and multiwell plate are aligned.

In some embodiments, the cover for a multiwell plate and the multiwell plate are fastened to each other in such a way that during manufacturing there is movement such that at a first time point the holes in the cover are indexed (aligned) over the wells (and/or well inlet) and at a second time point the holes in the cover are not indexed (aligned) over the wells (and/or well inlet). Being indexed over a multiwell plate means the blower is aligned to blow air down over only a portion of the multiwell plate. Being indexed over a well means the blower is aligned to blow air down over only a portion of the multiwell plate, specifically over/into a well. In some embodiments, being indexed over a well means the blower is aligned to blow air down over only a portion of the multiwell plate, specifically over/into a load well. In some embodiments, being indexed over a well means the blower is aligned to blow air down over only a portion of the multiwell plate, specifically over/into a load well inlet. In some embodiments, at a first time point, the holes in the cover are at a first location over the wells, and at a second time point, the holes are at a second location over the wells, wherein the first location and second location are different. Without being bound to any particular theory, it is believed that the turbulence of the airflow is increased if the cover is moved when air is sprayed down into the wells, but it is also made more diffuse.

In some embodiments, the cover for a multiwell plate and the multiwell plate are fastened to each other in such a way that during manufacturing, the cover vibrates, the multiwell plate vibrates, or both vibrate. In some embodiments, the cover for a multiwell plate and the multiwell plate are fastened to each other in such a way that during manufacturing there is vibration of the cover over the wells, the multiwell plate or both as air is blown into the wells.

In some embodiments, the cover for a multiwell plate and the multiwell plate are rotated during manufacture as air is blown into the wells. In some embodiments, the cover for a multiwell plate, the multiwell plate or both is rotated during manufacture as air is blown into the wells. In some embodiments, air is blown into a well via a well inlet as shown in FIGS. 17A-G and FIGS. 18A-I, item 1771.

In some embodiments, the cover for a multiwell plate and the multiwell plate are not fastened to each other, and the cover can be raised and lowered during manufacturing.

Use of the Multiwell Plate Cover with Holes

In some embodiments, the cover is removed prior to the multiwell plate being analyzed in a processing instrument. In some embodiments, the cover is not removed prior to the multiwell plate being analyzed in a processing instrument. In some embodiments, the cover is not removed prior to the multiwell plate being analyzed in a processing instrument. In such embodiments, the cover does not affect the optical properties of any well bottom or any well wall.

In some embodiments, the plurality of wells comprises an assay reagent for a cell-based assay, biochemical assay, absorbance-based assay, fluorescence-based assay, homogenous assay, or heterogeneous assay. In some embodiments, the assay reagent for a cell-based assay comprises an isotonic solution. In some embodiments, the assay reagent for a cell-based assay comprises a cell culture medium. In some embodiments, the assay reagent for a cell-based assay comprises an enzyme. In some embodiments, the assay reagent for an absorbance-based assay comprises a chromogenic enzyme substrate. In some embodiments, the assay reagent for a fluorescence-based assay comprises a fluorogenic substance. In some embodiments, the assay reagent for a fluorescence-based assay comprises a fluorescently labeled binding protein. In some embodiments, the assay reagent for a homogenous assay comprises an enzyme in solution. In some embodiments, the assay reagent for a heterogeneous assay comprises a binding protein immobilized on a well surface or on the surface of a bead in a well. In some embodiments, the assay reagent for a heterogeneous assay comprises an oligonucleotide capture probe immobilized on a well surface or on the surface of a bead in a well. The methods of manufacture must be able to dry all these different kinds of reagents. This can be achieved by having the cover for a multiwell plate comprise an array of holes wherein the holes have different shapes and sizes and/or are aligned differently over the wells (and/or well inlet). Selecting a hole's shape, size, or alignment over a well is within the skill of the artisan. In some embodiments, the dried reagents in the well can be stably stored for up to 1 year. In some embodiments, the dried reagents in the well can be stably stored for up to 1 month, 6 months, 2 years or 5 years. In some embodiments, the dried reagents in the well can be stably stored at 4 degrees Celsius. In some embodiments, the dried reagents in the well can be stably stored at room temperature. In some embodiments, the dried reagents in the well can be stably stored at room temperature, 4 degrees Celsius, or any temperature in between. In some embodiments, the dried reagents in the well can be stably stored for 1 month to 1 year at room temperature, 4 degrees Celsius, or any temperature in between.

The invention can be further understood by the following numbered paragraphs:

Paragraph 1: A multiwell plate comprising a plurality of wells and a cover covering the plurality of wells, wherein the cover comprises an array of holes aligned with the plurality of wells, well inlet, or both.

Paragraph 2: A multiwell plate comprising a plurality of wells and a cover covering the plurality of wells, wherein the cover comprises an array of holes partially aligned with the plurality of wells, well inlet, or both.

Paragraph 3: A multiwell plate comprising a first plurality of wells and a second plurality of wells and a cover covering the first and second pluralities of wells, wherein the cover comprises a first array of holes and a second array of holes, wherein the first array of holes is aligned with the first plurality of wells and the second array of holes is not aligned with the second plurality of wells.

Paragraph 3a: The multiwell plate of any preceding paragraph, wherein the multiwell plate and cover are fastened together.

Paragraph 4: The multiwell plate of paragraph 3a, wherein the multiwell plate and cover are fastened together by a fastening member.

Paragraph 5: The multiwell plate of paragraph 4, the fastening member is a clamp, lap joints, brackets, or collar.

Paragraph 6: The multiwell plate of paragraphs 1 or 2, wherein at least one hole in the array of holes is cylindrical.

Paragraph 7: The multiwell plate of paragraphs 1 or 2, wherein a first portion of the holes in the array of holes has a first shape and a second portion of the holes in the array of holes comprises a second shape, wherein the first shape and the second shape are different.

Paragraph 8: The multiwell plate of paragraph 1, 2, 4-6, or 7, wherein at least one hole in the array of holes comprises a cross-section that is tapered.

Paragraph 9: The multiwell plate of paragraph 1, 2, 4-6, or 8, wherein at least one hole in the array of holes comprises a first diameter halfway through the hole, a second diameter at the top of the hole, and a third diameter at the bottom of the hole, wherein the second diameter and third diameter are the same, and the first diameter is different than the second diameter and third diameter.

Paragraph 10: The multiwell plate of paragraphs 1, 2, 4-6, 7, 8, or 9, wherein at least one hole in the array of holes is countersunk, threaded, comprises an axis that is not perpendicular to a surface of the cover, or combinations thereof.

Paragraph 11: The multiwell plate of any preceding paragraph, wherein the multiwell plate further comprises reagents for performing analyte detection or multianalyte detection.

Paragraph 12: The multiwell plate of paragraph 11, wherein the reagents comprise reagents for performing an immunoassay, a homogenous assay, a heterogeneous assay, an absorbance-based assay, a fluorescence-based assay, a single endpoint read at the end of an assay reaction, a baseline read at the beginning of the assay reaction, an assay comprising three or more reads during the time course of an assay reaction, or combinations thereof.

Paragraph 13: The multiwell plate of any preceding paragraph, wherein the multiwell plate further comprises reagents as dried reagents or in solution.

Paragraph 14: The multiwell plate of any preceding paragraph, wherein the multiwell plate has a first shape and the cover has a second shape, wherein the first shape and second shape are the same.

Paragraph 15: The multiwell plate of any preceding paragraph, wherein the multiwell plate has a first shape and the cover has a second shape, wherein the first shape and the second shape are different.

Paragraph 16: The multiwell plate of any preceding paragraph, wherein the multiwell plate has a first shape and the cover has a second shape, wherein the first shape and second shape are a circular shape, a rectangular shape, or a triangle shape.

Paragraph 17: The multiwell plate of any one of paragraphs 1-2 or 4-16, wherein each hole in the array of holes has a first diameter and each well in the plurality of wells has a second diameter, wherein the first diameter and second diameter are different.

Paragraph 18: The multiwell plate of any one of paragraphs 1-2 or 4-17, wherein each hole in the array of holes has a first diameter and each well in the plurality of wells has a second diameter, wherein the first diameter and second diameter are the same.

Paragraph 19: The multiwell plate of any preceding paragraph, wherein the cover is removed prior to the multiwell plate being analyzed in a processing instrument.

Paragraph 20: The multiwell plate of any one of paragraphs 1-18, wherein the cover is not removed prior to the multiwell plate being analyzed in a processing instrument.

Paragraph 21: The multiwell plate of paragraph 20, wherein the cover does not affect the optical properties of any well bottom or any well wall.

Paragraph 22: The multiwell plate of paragraph 3, wherein the first array of holes has a first diameter and a first shape, and the second array of holes has a second diameter and a second shape, wherein the first diameter and second diameter are different, and the first shape and second shape are different.

Paragraph 23: The multiwell plate of any preceding paragraph, wherein each well in the plurality of wells comprises a read well, load well and a channel connecting the read well and the load well.

Paragraph 24: The multiwell plate of any preceding paragraph, wherein each well in the plurality of wells comprises a lower assay chamber surface that is not flat.

Paragraph 25: The multiwell plate of any preceding paragraph, wherein each well in the plurality of wells comprises side chamber walls that are not flat.

The invention can be further understood by the following numbered paragraphs:

Paragraph 1. A multiwell plate comprising a plurality of wells with reagents in each well and a top plate, the top plate comprising an array of holes arranged over the plurality of wells.

Paragraph 2. The multiwell plate of Paragraph 1, wherein a first portion of holes in the array of holes is aligned over a first portion of wells in the plurality of wells.

Paragraph 3. The multiwell plate of Paragraph 2, wherein a second portion of holes in the array of holes is offset by 10-30% over a second portion of wells in the plurality of wells.

Paragraph 4. The multiwell plate of Paragraph 1, wherein the multiwell plate has a first shape and the top plate has a second shape wherein the first shape and second shape are the same.

Paragraph 5. The multiwell plate of Paragraph 1, wherein the multiwell plate has a first shape and the top plate has a second shape wherein the first shape and second shape are different.

Paragraph 6. The multiwell plate of Paragraph 1, wherein the plurality of wells has a first shape, and the array of holes has a second shape wherein the first shape and second shape are the same.

Paragraph 7. The multiwell plate of Paragraph 1, wherein the plurality of wells has a first shape, and the array of holes has a second shape wherein the first shape and second shape are different.

Paragraph 8. The multiwell plate of Paragraph 1, wherein the multiwell plate and top plate are detachably coupled via clamps, lap joints, brackets, or a collar.

Paragraph 9. The multiwell plate of Paragraph 1, wherein a first portion of holes in the array of holes has a first axis and the first axis of each hole in the first portion of holes is not perpendicular to the multiwell plate and a second portion of holes in the array of holes has a second axis and the second axis of each hole in the second portion of holes is perpendicular to the multiwell plate.

Paragraph 10. The multiwell plate of Paragraph 1, wherein the reagents are the reagents necessary to perform an ALT, AST or BUN test and an antioxidant.

The invention can be further understood by the following numbered paragraphs:

Paragraph 1. A method of drying reagents in a multiwell plate, the method comprising:
a. loading a multiwell plate into a dry tunnel, the multiwell plate comprising a plurality of wells with liquid reagents in each well and a cover, the cover comprising an array of holes arranged over the plurality of wells;
b. aligning the multiwell plate and cover with a plurality of blowers;
c. blowing inert dry gas directly onto the multiwell plate and cover thereby drying the reagents in the wells; and
d. ejecting the multiwell plate with dried reagents in the wells out of the dry tunnel.

Paragraph 2. The method of Paragraph 1, wherein a first portion of the plurality of blowers is aligned over a first portion of wells in the plurality of wells.

Paragraph 3. The method of Paragraph 2, wherein a second portion the plurality of blowers is offset by 10-30% over a second portion of wells in the plurality of wells.

Paragraph 4. The method of Paragraph 1, wherein blowing inert dry gas directly onto the multiwell plate and cover comprises blowing inert dry gas onto the multiwell plate and cover for a first time period, pausing, and blowing inert dry gas onto the multiwell plate and cover for a second time period.

Paragraph 5. The method of Paragraph 1, wherein blowing inert dry gas directly onto the multiwell plate and cover comprises blowing inert dry gas onto the multiwell plate and cover in a first drying zone and in a second drying zone.

Paragraph 6. The method of Paragraph 1, further comprising heating the dry tunnel.

Paragraph 7. The method of Paragraph 1, further comprising laminarly blowing inert dry gas onto the multiwell plate and cover.

Paragraph 8. The method of Paragraph 1, wherein the liquid reagents are the reagents necessary to perform an ALT, AST or BUN test and an antioxidant.

Paragraph 9. The method of Paragraph 1, wherein the cover comprising an array of holes is aligned over the plurality of wells inside the dry tunnel.

Paragraph 10. The method of Paragraph 1, further comprising vibrating the cover when an inert dry gas is blown onto the multiwell plate and cover.

Paragraph 11. The method of Paragraph 1, wherein the liquid reagents in each well are in a load well.

Multiwell Plate with Load Wells and Read Wells

Figure 17A:
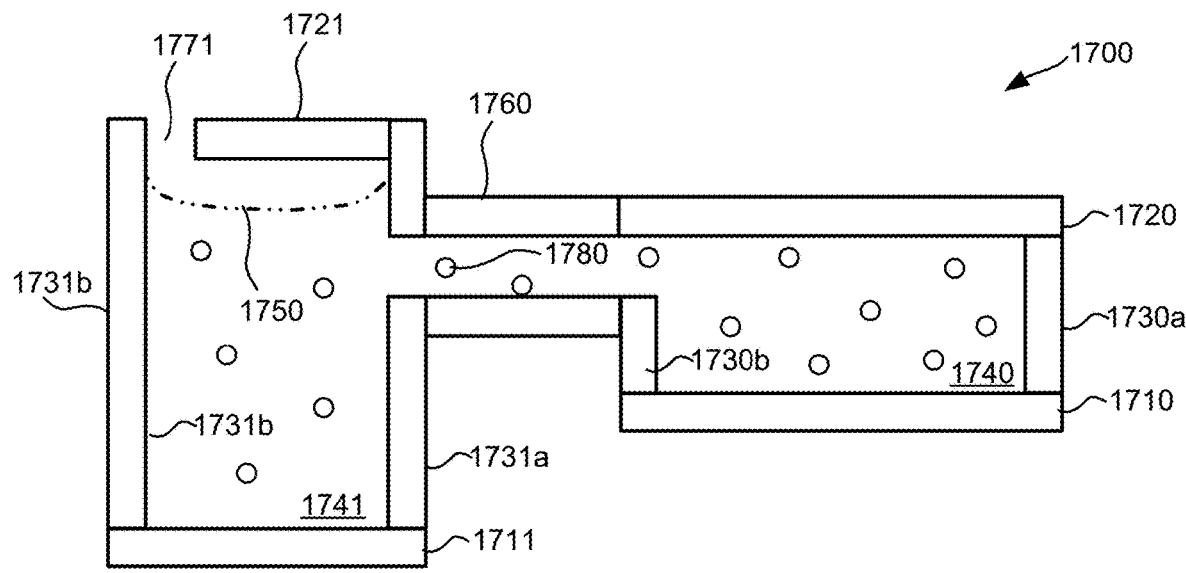
Figure 17B:
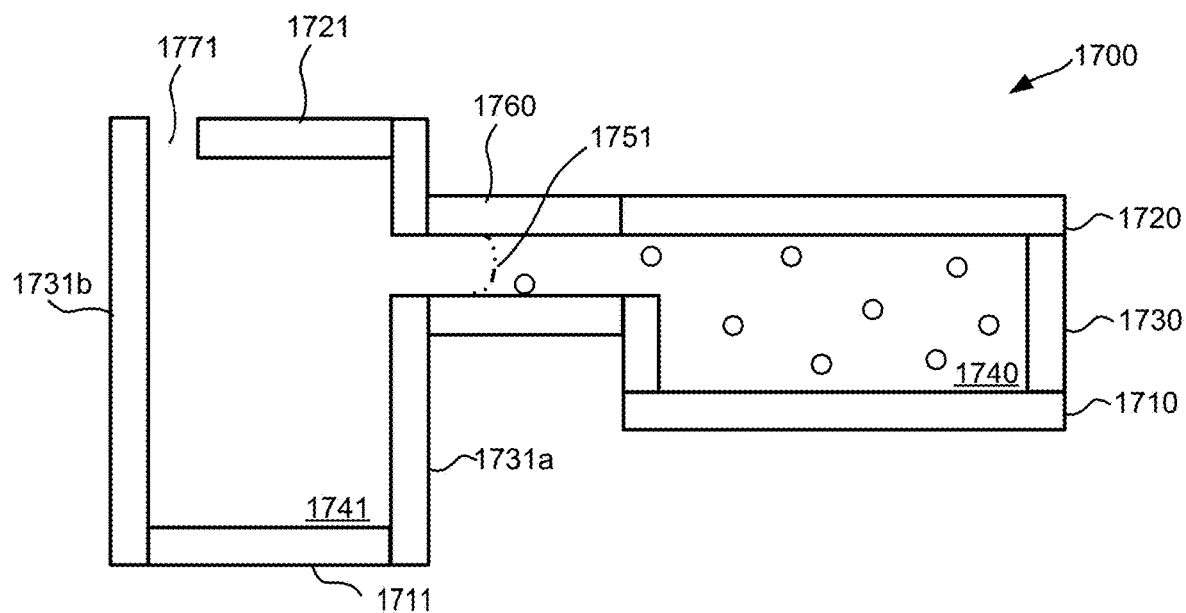

Generally, FIGS. 17A and 17B depict a device with wells (a.k.a. load wells or dry wells or fill well) attached to optically readable reservoirs (a.k.a. read wells), according to some embodiments. FIGS. 17 A and 17B are a reproduction of FIGS. 3A and 3B from U.S. Patent Publication No. US20200064254A1 by Vanderklein et al. In particular, this aspect of Vanderklein et al. is incorporated by reference in its entirety.

FIGS. 17A-17B schematically illustrate cross-sectional views of exemplary devices such as multiwell plates with wells attached to optically readable reservoirs according to various configurations provided herein. In the exemplary configuration illustrated in FIGS. 17A-17B, device 1700 includes lower reservoir surface 1710, upper reservoir surface 1720, and reservoir sidewall(s) 1730a and b defining a reservoir 1740. Device 1700 includes channel 1760 coupled to reservoir sidewall 1730b. In some configurations, the device 1700 optionally further includes a well 1741 that is fluidically coupled to the reservoir 1740 via the channel 1760. The meniscus 1750 can have any suitable location within device 1700. The capacity to hold a volume of sample or sample and reagent 1780 in load well 1741 is greater than the capacity to hold a volume of sample or sample and reagent 1780 in read well 1740. In this way, when the reagent 1780 is moved (transferred) from the load well 1741 to the read well 1740 it completely fills the read well 1740 and a meniscus 1751 forms somewhere within the channel 1760. In this way, the full volume in the read well is read to obtain absorbance readings. Stated another way, the volume of load well 1741 is greater than the volume of read well 1740, such that a volume of liquid in load well 1741 overflows read well 1740. In some embodiments, the volume of load well 1741 is greater than the volume of read well 1740, such that a volume of liquid in load well 1741 overflows read well 1740 and fills the channel 1760 (or partially fills the channel 1760) connecting the two.

The load well 1741 optionally includes an inlet 1771 for loading a sample into the load well 1741. A sample can be configured to react with dried reagents in the load chamber 1741. The reagents 1780 can be dry or wet prior to the addition of the sample via inlet 1771. As illustrated in FIGS. 17A-17B, reagent 1780 can be dispersed throughout or dissolved in the sample. Exemplary reagents include, but are not limited to, an antibody, enzyme, or particle. Exemplary samples include, but are not limited to, blood, urine, serum, plasma, cerebrospinal fluid, lymph, saliva, nasopharyngeal samples, anal and vaginal secretions, feces, tissue samples including tissues suspected of containing cancerous cells, perspiration and semen of virtually any organism, with mammalian samples being preferred and human samples being particularly preferred, environmental samples (including, but not limited to, air, agricultural, water, and soil samples, environmental swabs and other collection kits); biological warfare agent samples; food and beverage samples, research samples (i.e., in the case of nucleic acids, the sample may be the products of an amplification reaction, including both target and signal amplification as is generally described in WO/1999/037819, such as PCR amplification reaction); purified samples, such as purified genomic DNA, RNA, proteins, etc.; raw samples (bacteria, virus, genomic DNA, etc.); as will be appreciated by those in the art, virtually any experimental manipulation may have been done on the sample. Samples can be a liquid, gas, solid or combinations thereof. Preferably, samples can dissolve the reagent in the load chamber.

In some configurations, channel 1760 is configured to convey the sample from the load well to the read well responsive to the application of a force to assay chamber 1741. In some exemplary configurations, the force can include a centrifugal force or gas force. In some embodiments, device 1700 is a rotatable disc in which reservoir 1740 and 1741 are disposed, wherein rotating the disc generates the centrifugal force which moves sample from reservoir 1741 to reservoir 1740 through channel 1760. An exemplary rotatable disc is described in FIG. 1. In some embodiments, device 1700 is a multiwell plate in which reservoirs 1740 and 1741 are disposed, wherein rotating the multiwell plate generates the centrifugal force which moves sample from reservoir 1741 to reservoir 1740 through channel 1760.

In the nonlimiting configuration illustrated in FIGS. 17A-17B, assay chamber 1741 (which also can be considered a well) can include lower assay chamber surface 1711, upper assay chamber surface 1721, and assay chamber sidewall(s) 1731a and b extending between the upper and lower assay chamber surfaces 1721, 1711. Any suitable combination of lower assay chamber surface 1711, upper assay chamber surface 1721, dry well sidewall(s) 1731, channel 1760, lower reservoir surface 1710, upper reservoir surface 1720, and reservoir sidewall(s) 1730 can be formed as discrete elements that are attached to one another, or can be integrally formed with one another, and can have any suitable shape and dimensions. In a nonlimiting example, reservoir 1740 and/or dry well 1741 can each have a volume of about 1-200 or about 10-100 or about 15-50 or about 10-30 or about 5-20 μL.

In FIGS. 17A-17B, the lower assay chamber surface 1711 is depicted as flat. In some embodiments, the lower assay chamber surface is not flat. In some embodiments, this "canyon" physically blocks movement of reagents and sample into the read well. The reagents and sample can only be moved into the read well when they are pushed there via the application of a force (e.g., centrifugal force, a gas source, etc.). FIG. 17C depicts a lower assay chamber surface 1711 that steps down. FIG. 17C depicts 2 steps. In some embodiments, the lower assay chamber surface has 1 step, 2 steps, 3 steps, 4 steps, 5 steps, 6 steps, 7 steps, 8 steps, 9 steps, 10 steps, 20 steps, 30 steps, 40 steps, 50 steps, or 100 steps.

Figure 17F:
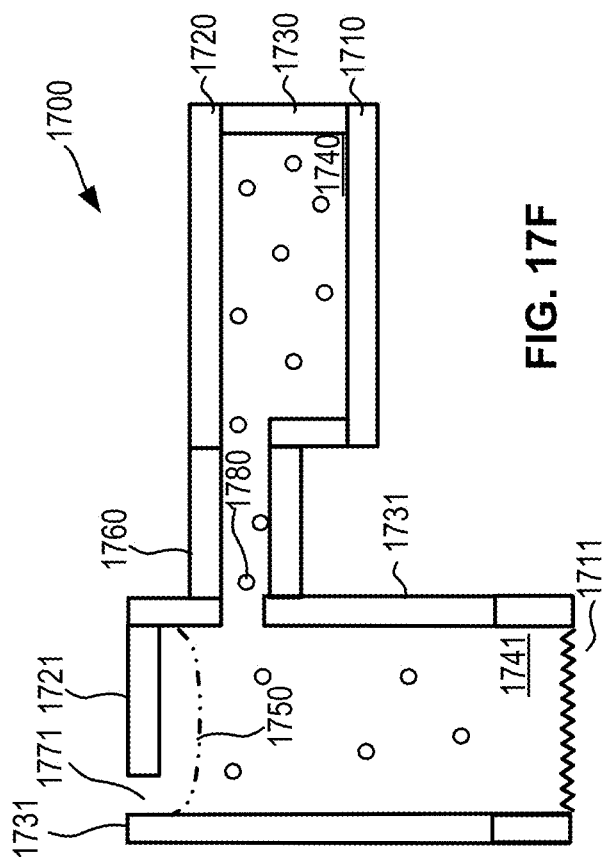
Figure 17G:
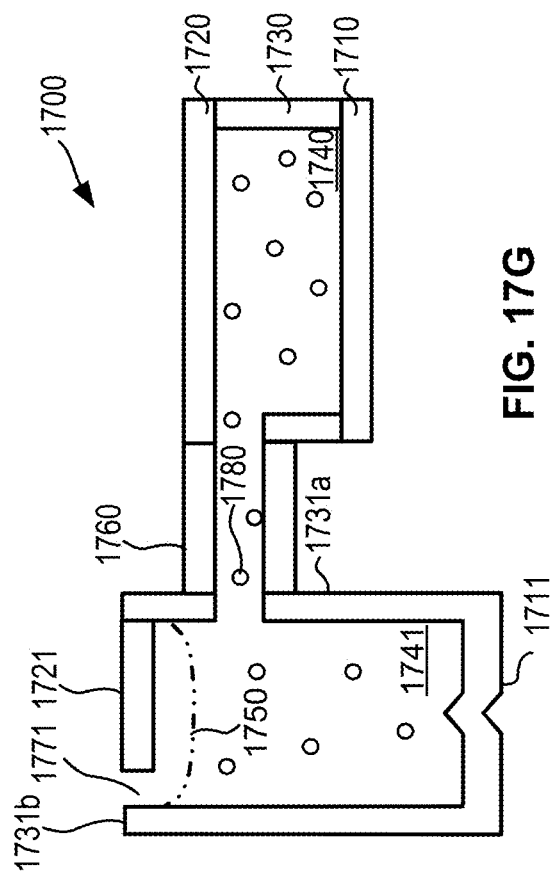

In some embodiments, the lower assay chamber surface 1711 or a portion thereof may be shaped concave down (FIG. 17D, showing the lower assay chamber surface 1711 as concave down, but it may also be concave up 17E). The lower assay chamber surface 1711 or a portion thereof may have a cross-section that is threaded (FIG. 17F). The lower assay chamber surface 1711 may have a cross-section that comprises a diameter halfway through the well that is smaller than the diameter at the top of the well and the diameter at the bottom of the well (FIG. 17G).

In some embodiments, the device comprises a plurality of load chambers 1741 each load chamber having a lower chamber surface 1711. In some embodiments, the device comprises a first plurality of load chambers, each first plurality of load chambers having a lower chamber surface with a first shape and a second plurality of load chambers, wherein each second plurality of load chambers having a lower chamber surface with a second shape. In some embodiments, the first shape for the first plurality of load chambers having a lower chamber surface is different than the second shape for the second plurality of load chambers having a lower chamber surface. In some embodiments, the first shape for the lower chamber surface is flat, cylindrical, concave up, concave down, a triangular prism, a cone, threaded, having a diameter halfway through the well that is smaller than the diameter at the top of the well and the diameter at the bottom of the well, having an axis wherein the axis is not perpendicular to the chamber sidewall(s), or countersunk. In some embodiments, the second shape for the lower chamber surface is flat, cylindrical, concave up, concave down, a triangular prism, a cone, threaded, having a diameter halfway through the well that is smaller than the diameter at the top of the well and the diameter at the bottom of the well, having an axis wherein the axis is not perpendicular to the chamber sidewall(s), or countersunk.

Figure 18A:
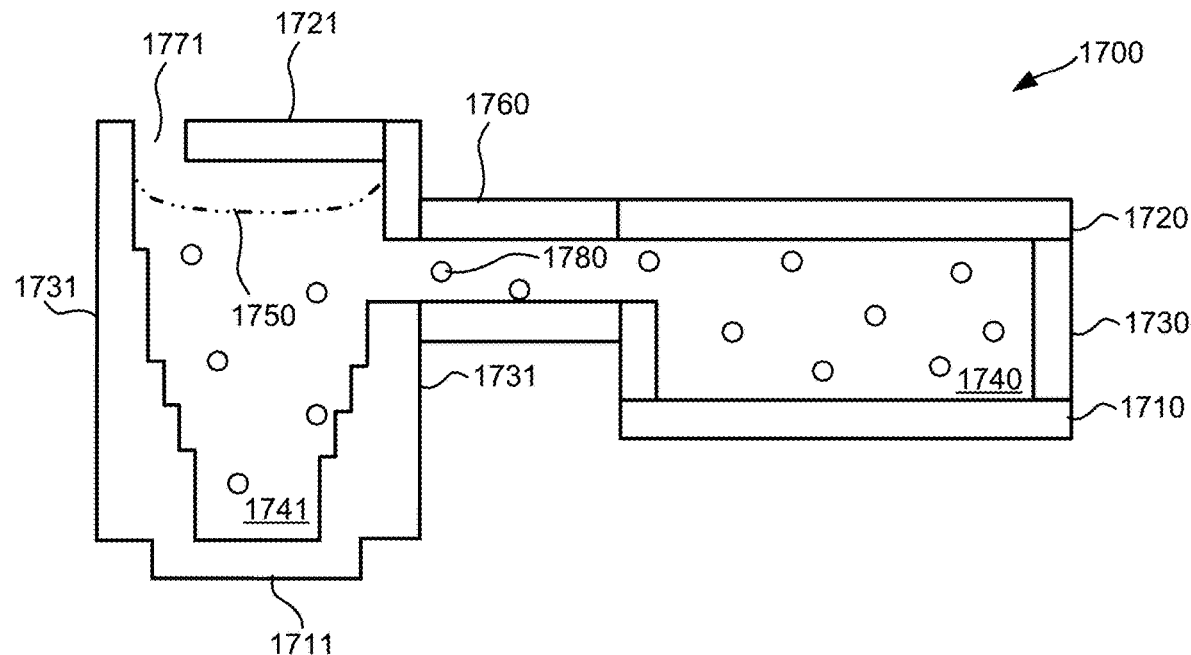

In FIGS. 17A-17B, the chamber sidewall(s) 1731 are depicted as flat. In some embodiments, the chamber sidewall(s) 1731 are not flat. In some embodiments, a portion of the chamber sidewall(s) 1731 are not flat. FIG. 18A depicts chamber sidewalls 1731 or a portion thereof that step down. FIG. 18A depicts 4 steps. In some embodiments, the chamber sidewalls 1731a and b have 1 step, 2 steps, 3 steps, 4 steps, 5 steps, 6 steps, 7 steps, 8 steps, 9 steps, 10 steps, 20 steps, 30 steps, 40 steps, 50 steps, or 100 steps. In some embodiments, the first chamber sidewall has more steps than the second chamber sidewall.

Figure 18B:
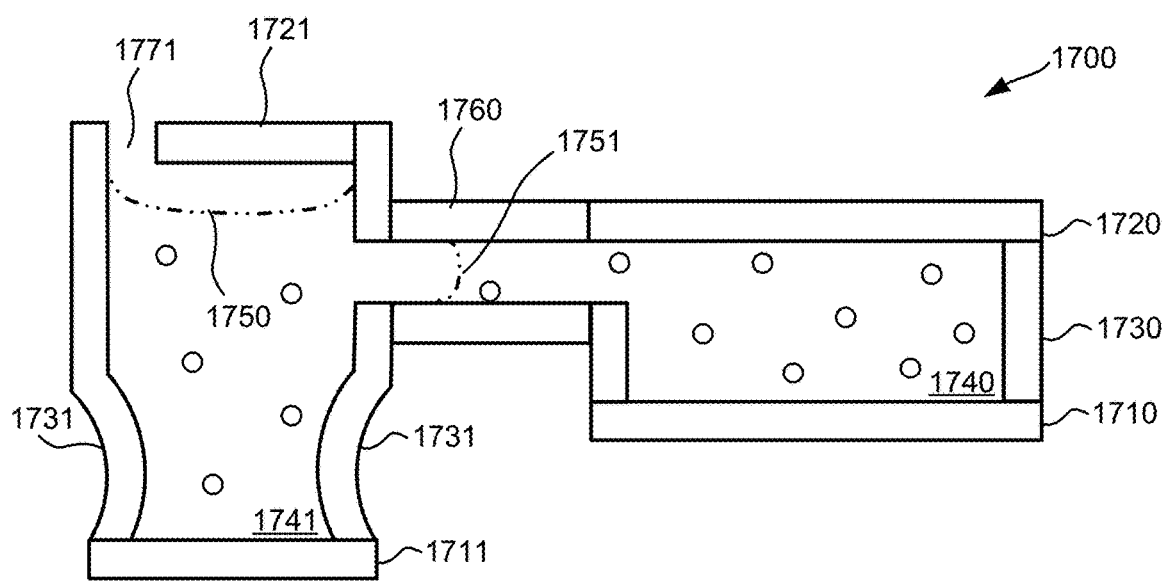

In some embodiments, the chamber sidewalls 1731 or a portion thereof may be shaped as concave in (FIG. 18B, or concave out (FIG. 18C), a triangular prism (FIG. 18D), or a cone (FIG. 18E). The chamber sidewalls may have a cross-section that is threaded (FIG. 18F). The chamber walls may have a cross-section that comprises a diameter halfway through the well that is smaller than the diameter at the top of the well and the diameter at the bottom of the well (FIG. 18G). In some embodiments, the chamber sidewall has an axis 11, wherein the axis is not perpendicular to the lower assay chamber surface 1711 (FIG. 18H). In some embodiments, the chamber sidewalls are countersunk (FIG. 18I).

In some embodiments, the device comprises a plurality of load chambers, each load chamber having a first chamber sidewall and a second chamber sidewall. In some embodiments, the device comprises a first plurality of load chambers, each first plurality of load chambers having a first chamber sidewall with a first shape and a second chamber sidewall with a second shape. In some embodiments, the first shape for the first chamber sidewall is the same as the second shape for the second chamber sidewall. In some embodiments, the first shape for the first chamber sidewall is different than the second shape for the second chamber sidewall. In some embodiments, the first shape for the first chamber sidewall is flat, cylindrical, concave out, concave in, a triangular prism, a cone, threaded, having a diameter halfway through the well that is smaller than the diameter at the top of the well and the diameter at the bottom of the well, having an axis wherein the axis is not perpendicular to the chamber sidewall(s), or countersunk. In some embodiments, the second shape for the second chamber sidewall is flat, cylindrical, concave up, concave down, a triangular prism, a cone, threaded, having a diameter halfway through the well that is smaller than the diameter at the top of the well and the diameter at the bottom of the well, having an axis wherein the axis is not perpendicular to the chamber sidewall(s), or countersunk. In some embodiments, the lower assay chamber surface 1711 and the load well sidewall(s) 1731 are not flat.

In some embodiments, the lower assay chamber surface 1711 is flat and the load chamber sidewalls are not flat. In some embodiments, the lower assay chamber surface 1711 is not flat and the load chamber sidewalls are flat. In some embodiments, both the lower assay chamber surface 1711 and the load chamber sidewalls are not flat. In some embodiments, the lower assay chamber surface 1711 has a first shape and the load chamber sidewalls have a second shape. In some embodiments, the lower assay chamber surface 1711 has a first shape and the load chamber sidewalls have a second shape, and the first and second shape are the same. In some embodiments, the lower assay chamber surface 1711 has a first shape and the load chamber sidewalls have a second shape, and the first and second shape are different. In some embodiments, the first shape is flat, cylindrical, concave out, concave in, a triangular prism, a cone, threaded, having a diameter halfway through the well that is smaller than the diameter at the top of the well and the diameter at the bottom of the well, having an axis wherein the axis is not perpendicular to the chamber sidewall(s), or countersunk. In some embodiments, the second shape is flat, cylindrical, concave up, concave down, a triangular prism, a cone, threaded, having a diameter halfway through the well that is smaller than the diameter at the top of the well and the diameter at the bottom of the well, having an axis wherein the axis is not perpendicular to the chamber sidewall(s), or countersunk.

Regardless of whether the lower assay chamber surface 1711 or the load well sidewall(s) 1731 are not flat, the goal is to prevent the sample from wicking into the read well. The structure of the lower assay chamber surface 1711 and the load well sidewall(s) 1731 also helps facilitate drying. When reagents are dispensed into the load well, the structure of the load well (lower assay chamber surface 1711 and/or the load well sidewall(s) 1731 are not flat) helps the reagents dry. This is because the reagents are not wicked into the read well. The canyon effect of the structure of the load well prevents movement through the channel 1760 into the read well 1740.

In some embodiments the walls of the channel 1760 are flat. In some embodiments the walls of the channel 1760 are not flat. In some embodiments the walls of the channel 1760 have the structural features, i.e., 1, 2, 3 or 4 walls of the channel may be concave in, or concave out, a triangular prism, or a cone. The channel walls may have a cross-section that is threaded. The channel walls may have a cross-section that comprises a diameter halfway through the channel that is smaller than the diameter at the opening of the channel and the diameter at the output of the channel. In some embodiments, the channel wall has an axis, wherein the axis is not perpendicular to one or both of the chamber sidewalls 1730 or 1731 or both. In some embodiments, the channel sidewalls are countersunk or counterbored.

Manufacturing Systems

In some embodiments, a multiwell plate manufacturing system comprises an air blower and a multiwell plate comprising wet reagents in a plurality of wells. In some embodiments, a multiwell plate manufacturing system comprises an air blower, a multiwell plate comprising a plurality of wells, and a cover covering the plurality of wells. In some embodiments, a multiwell plate manufacturing system comprises a plurality of air blowers, a multiwell plate comprising a plurality of wells, and a cover covering the plurality of wells. In some embodiments, a multiwell plate manufacturing system comprises a plurality of air blowers above a multiwell plate comprising a plurality of wells, and a cover covering the plurality of wells. In some embodiments, the first air blower is positioned above a first well. In some embodiments, the first air blower may be aligned such that air blows through the cover and into the first well. In some embodiments, the first air blower may be aligned such that air blows through the cover and into the first load well. In some embodiments, the first air blower may be aligned such that air blows through the cover, through the well inlet, and into the first well.

In some embodiments, the manufacturing system comprises a plurality of air blowers. In some embodiments, the plurality of air blowers blow air laminarly, turbulently, or both. In some embodiments, the plurality of air blowers are positioned above the first plurality of wells and are aligned such that air blows into each of the first plurality of wells through holes in a cover over the multiwell plate. In some embodiments, the plurality of air blowers is positioned above the first plurality of wells and is aligned such that air blows turbulently over each of the first plurality of wells through holes in a cover over the multiwell plate. In some embodiments, the plurality of air blowers is positioned above the first plurality of wells, a first portion of the plurality of air blowers is aligned such that air blows laminarly over each of a first portion of the first plurality of wells, and a second portion of the plurality of air blowers may be aligned such that air blows turbulently into each of a second portion of the first plurality of wells through holes in a cover over the multiwell plate. In some embodiments, the wells aligned with blowers are load wells, read wells, or both, but are preferably load wells.

In some embodiments, the plurality of air blowers may be indexed above a first plurality of wells. In some embodiments, the plurality of air blowers may be aligned with a first plurality of wells and a first plurality of well covers. In some embodiments, the plurality of air blowers may be aligned with a first plurality of wells, a first plurality of well covers and a first plurality of well inlets.

The blowers (whether indexed, grid, or shower) may be fabricated in a variety of different widths and lengths to accommodate the combination of external equipment, physical constraints, and air flow requirements that are needed to effectively dry objects. The blowers may be fabricated in a variety of different widths and lengths to align with the multiwell plate and/or the cover hole and wells in a multiwell plate. The blowers may be fabricated in a variety of different widths and lengths to align with the multiwell plate and/or the cover hole and load wells in a multiwell plate.

Number of Blowers

In some embodiments, there is one blower that blows air down over the entire surface of a single multiwell plate. In some embodiments, there is a grid of blowers that do not themselves blow air down over the entire multiwell plate but collectively blow air down over the entire multiwell plate (or over multiple multiwell plates). In some embodiments, there is a one-to-one relationship between the number of blowers and the number of wells in the multiwell plate, holes in the cover for a multiwell plate, or both. In some embodiments, there is a one-to-one relationship between the number of blowers and the number of load wells in the multiwell plate, load holes in the cover for a multiwell plate, or both.

In some embodiments, there is a one-to-one relationship between the location of the blowers and the location of the multiwell plate, i.e., when 7 multiwell plates are in the dry tunnel, there are seven blowers. In some embodiments, there is a one-to-one relationship between the location of the blowers, the location of the holes in the cover for a multiwell plate, and the location of the wells in the multiwell plate. See FIG. 3A, showing a cover 10 with representative holes 205 and 204 over a multiwell plate 1 with representative wells 105 and 104 each with a representative blower 305 and 304 above it. See also FIG. 6 showing representative blower 16 a aligned with representative hole, 12 a and representative well 2 a wherein the representative well 2 a is a load well or read well, but is preferably a load well.

In some embodiments, there is not a one-to-one relationship between the location of the blowers, the location of the cover holes, and the location of the wells in the multiwell plate, i.e., some wells/cover holes do not have a blower above it. See FIG. 6 showing representative cover hole 12b and representative well 2b without a blower above it. In some embodiments, the location of the blower is not directly aligned with the hole in the cover or the well (load well or read well but is preferably a load well). See FIG. 6 showing a representative blower 16 c over representative hole 12 c, over representative well 2 c but not aligned. This happens, for example, when the blowers are arranged in a grid.

In some embodiments, the location of the blowers does not mirror the location of the wells in the multiwell plate, such as when the blowers are arranged in a grid.

In some embodiments, the location of the blowers mirrors the location of the holes in the cover and the wells in the multiwell plate. For example, if the wells are arranged in a circular pattern, the holes in the cover are arranged in a circular pattern, and the blowers are arranged in a circular pattern. If the wells are arranged in a square grid pattern, the holes in the cover are arranged in a square grid pattern, and the blowers are arranged in a square grid pattern. If the wells are arranged in a triangular grid pattern, the holes in the cover are arranged in a triangular grid pattern, and the blowers are arranged in a triangular grid pattern. If the wells are arranged in concentric circles around the center of the multiwell plate, the holes in the cover are arranged in concentric circles around the center of the multiwell plate, and the blowers are arranged in concentric circles around the center of the multiwell plate. If the wells are arranged in a spokes-like arrangement, the holes in the cover are arranged in a spokes-like arrangement, and the blowers are arranged in a spokes-like arrangement. If the wells are arranged on two or more concentric circles on the multiwell plate, the holes in the cover are arranged on two or more concentric circles on the multiwell plate, and the blowers are arranged on two or more concentric circles on the multiwell plate. In some embodiments, the blowers for drying a multiwell plate comprise an array of blowers arranged in a circular pattern, in a square grid pattern, in a triangular grid pattern, in concentric circles around the center of the multiwell plate, or in a spokes-like arrangement.

In some embodiments, the system comprises a total of 10 air blowers. In some embodiments, the system comprises a total of 20, 30, 40, 50, 60, 70, 80, 90, 100, 120, 140, 160, 180, 200, 250, 300, 350, 400, 450, 500, 600, 700, 800, 900, or 1,000 air blowers.

In some embodiments, the system comprises a total number of air blowers between 10 and 50 air blowers, between 50 and 100 air blowers, between 100 and 160 air blowers, between 160 and 200 air blowers, between 200 and 500 air blowers, or between 500 and 1000 air blowers.

The blowers may be connected to a source of supply air or gas (such as nitrogen gas) from gas supply ducts (example supply ducts are labeled as items 1612 a-b in FIG. 16), connected to a gas supply unit 1611. The gas supply ducts may be coupled directly to the gas supply unit 1611 or they may be coupled to a main supply tube (not shown) which is directly coupled to the gas supply unit 1611.

Location of the Blowers

Applicant surprisingly discovered that airflow must be directed from above in order to get rapid, consistent drying. In the embodiments described below, the blowers are located above the multiwell plate and air is directed downwards onto the multiwell plate.

1. Array of Blowers Indexed Over Holes in the Cover and/or the Plurality of Wells in the Multiwell Plate.

In some embodiments, the manufacturing system for a multiwell plate comprises an array of blowers wherein each blower in the array of blowers is 95% aligned with the array of holes in the cover and the plurality of wells in the multiwell plate. In some embodiments, the manufacturing system for a multiwell plate comprises an array of blowers wherein each blower in the array of blowers is 95% aligned with the array of load holes in the cover and the plurality of load wells in the multiwell plate. In some embodiments, the manufacturing system for a multiwell plate comprises an array of blowers wherein each blower in the array of blowers is 95% aligned with the array of holes in the cover and the plurality of well inlets in the multiwell plate. In some embodiments, the manufacturing system for a multiwell plate comprises an array of blowers wherein each blower in the array of blowers is 90%, 85%, 80%, 75%, 70%, 65%, 60%, 55%, 50%, 45%, 40%, 35%, 30%, 25%, 20%, 15%, 10%, 5%, or 0% aligned with the array of holes in the cover and the plurality of wells in the multiwell plate. In some embodiments, the manufacturing system for a multiwell plate comprises an array of blowers wherein each blower in the array of blowers is 5%-20% aligned with the array of holes in the cover and the plurality of wells in the multiwell plate. In some embodiments, the manufacturing system for a multiwell plate comprises an array of blowers wherein each blower in the array of blowers is 20%-60% aligned with the array of holes in the cover and the plurality of wells in the multiwell plate. In some embodiments, the manufacturing system for a multiwell plate comprises an array of blowers wherein each blower in the array of blowers is 60%-95% aligned with the array of holes in the cover and the plurality of wells in the multiwell plate. In some embodiments, the manufacturing system for a multiwell plate comprises an array of blowers wherein a first portion of blowers in the array of blowers is aligned with a cover hole and a well in the multiwell plate and a second portion of blowers in the array of blowers is not aligned with a cover hole and a well in the multiwell plate. In some embodiments, the manufacturing system for a multiwell plate comprises an array of blowers wherein a first portion of blowers in the array of blowers is aligned with a cover hole and a well in the multiwell plate, and a second portion of blowers in the array of blowers is not perfectly aligned with a cover hole and a well in the multiwell plate.

In some embodiments, the manufacturing system for a multiwell plate comprises an array of blowers wherein a first portion of the blowers in the array of blowers is aligned with a cover hole (load hole or read hole) but not with a well (load well or read well) in the multiwell plate. In some embodiments, the manufacturing system for a multiwell plate comprises an array of blowers wherein a first portion of the blowers in the array of blowers is aligned with a well in the multiwell plate but not with a cover hole. In some embodiments, the manufacturing system for a multiwell plate comprises an array of blowers wherein a first portion of the blowers in the array of blowers is aligned with a well in the multiwell plate and a cover hole. In some embodiments, the manufacturing system for a multiwell plate comprises an array of blowers wherein a first portion of the blowers in the array of blowers is not aligned with a well in the multiwell plate or a cover hole.

In some embodiments, the air blowers may be arranged in concentric circles with an air blower at every 1 degree, every 2 degrees, every 3 degrees, every 4 degrees, every 5 degrees, every 6 degrees, every 9 degrees, every 10 degrees, every 12 degrees, every 15 degrees, or every 20 degrees. In some embodiments, the air blowers arranged in concentric circles comprises between 10 and 50 air blowers, between 50 and 100 air blowers, between 100 and 150 air blowers, between 150 and 200 air blowers, between 200 and 250 air blowers, between 250 and 300 air blowers, between 350 and 400 air blowers, or between 450 and 500 air blowers arranged on a circle. In some embodiments, each concentric circle comprises the same number of air blowers. In some embodiments, each concentric circle comprises a different number of air blowers.

In some embodiments, the manufacturing system for a multiwell plate comprises an array of blowers wherein each blower is indexed over the well in a multiwell plate. When a blower is indexed over a well, it means it is designed to blow air into that well but not into other wells in the multiwell plate. In this regard, a particular indexed blower is not configured to blow air down over the entire surface of a single multiwell plate but only over a portion of the multiwell plate, i.e., over a well. With the use of a plurality of blowers, each well is dried because each well has an associated blower indexed above it. The air stream from each blower does not overlap in this embodiment.

The indexed blowers can be used with multiwell plates that have a cover and multiwell plates that do not have a cover.

2. Array of Blowers Arranged in a Grid, i.e., not Indexed Over Holes

When indexing blowers with the wells in the multiwell plate, manufacturing processes must be precise, i.e., if the blowers and wells (load well or read well but preferably a load well) are not aligned, drying can be affected. As such, it is desirable to have a drying system in which the blowers and wells in the multiwell plate do not require precise alignment. It is still a goal of the system to spray air directly over the wells so that it is turbulent but the air inside the well is diffuse.

In some embodiments, a manufacturing system for drying a multiwell plate comprises an array of blowers wherein each blower in the array is not perfectly aligned with the cover hole (load hole or read hole) or well (load well or read well but preferably a load well) in the multiwell plate. In some embodiments, a manufacturing system for drying a multiwell plate comprises an array of blowers wherein each blower is arranged in rows and columns to define a grid pattern. In these arrangements, each blower in the grid blows air down over a portion of the multiwell plate, which may or may not correspond with a well, the blowers collectively blow air down over the entire surface of a single multiwell plate (or over the surface of multiple multiwell plates).

In some embodiments, a manufacturing system for drying a multiwell plate comprises an array of blowers wherein each blower in the array is arranged in a grid pattern. In some embodiments, the grid pattern is uniform, i.e., the blowers are evenly spaced in the grid and/or with the same number of blowers per line and/or row of the grid. In some embodiments, the grid pattern is not uniform, i.e., the blowers are not evenly spaced in the grid and/or there is a different number of blowers per line and/or row of the grid.

In some embodiments, a manufacturing system for drying a multiwell plate comprises an array of blowers comprising a plurality of blower clusters. Each blower cluster may have blowers horizontally and vertically arranged in a grid pattern.

In some embodiments, a manufacturing system for drying a multiwell plate comprises an array of blowers wherein each blower in the array is arranged in a grid pattern wherein the grid pattern includes a grid of 2 rows and 2 columns, i.e., a 2×2 grid of blowers. In some embodiments, the grid pattern includes a 3×3 grid of blowers. In some embodiments, the grid pattern includes a 4×4, 5×5, 6×6, 7×7, 8×8, 9×9, 10×10, 11×11, 12×12, 13×13, 14×14, 15×15, 16×16, 17×17, 18×18, 19×19, 20×20, 10×20, 10×40, 10×50, 10×60, 10×70, 10×80, 10×90, 10×100, 100×100, 20×200, 30×300, 40×400, 50×500, 60×600, 70×700, 80×800, or 90×900 grid of blowers. In some embodiments, the grid pattern includes a 3×3 grid of blowers. In some embodiments, the grid pattern includes a grid of blowers arranged in n rows and m columns, wherein n and m are each a natural number. In some embodiments, a manufacturing system for drying a multiwell plate comprises an array of blowers, wherein each blower in the array is arranged in a grid pattern wherein the grid pattern includes a grid of 1 row and 7 columns, i.e., a 1×7 grid wherein each column has a blower.

The grid pattern may include rows shifted with respect to one another. For example, the second row may be moved one blower to the left or to the right with respect to the first row. The third row may be moved two blowers over to the left or to the right with respect to the first row. For example, the second and third row may be moved one blower to the left or to the right with respect to the first row. The fourth and fifth row may be moved two blowers over to the left or to the right with respect to the first row. Other shifts may be possible. Further, in some embodiments, columns and rows may be shifted with respect to one another.

In some embodiments, each drying zone/module has a grid of blowers. In some embodiments, each drying zone/module has a grid of blowers wherein the grid of blowers in each of the drying zones/modules is the same. In some embodiments, each drying zone/module has a grid of blowers wherein the grid of blowers in each of the drying zones/modules is different. In some embodiments, each drying zone/module has a grid of blowers wherein a first grid of blowers in at least two drying zones/modules is the same and at least one grid of blowers in a third drying zone/module is different. Disclosed is a manufacturing system with at least a first grid of blowers and at least a second grid of blowers. In some embodiments, at least a first grid of blowers and at least a second grid of blowers are the same. In some embodiments, at least a first grid of blowers and at least a second grid of blowers are different. In some embodiments, the first grid of blowers has a first grid pattern, and the second grid of blowers has a second grid pattern. In some embodiments, each grid of blowers has the same grid pattern. In some embodiments, each grid of blowers has a different grid pattern.

In some embodiments, a first plurality of air blowers are arranged in a grid above the multiwell plate, a second plurality of air blowers is aligned such that air blows laminarly over the multiwell plate.

In some embodiments, the manufacturing system for a multiwell plate comprises an array of blowers wherein the array of blowers is arranged in a grid. When the array of blowers is arranged in a grid, it means the array of blowers is designed to blow air down over the entire surface of a multiwell plate(s), not into any specific well (although air could be blown into a specific well by happenstance). In some embodiments, the array of blowers arranged in a grid can blow air over multiple multiwell plates in the dry tunnel at the same time. In this regard, the array of blowers is configured to blow air down over the entire surface of a single multiwell plate (or over multiple multiwell plates), not just over a portion of the multiwell plate such as a well. With the use of a plurality of blowers in a grid, each well is dried because the grid of blowers creates enough turbulent airflow to dry each well even if there is not a one-to-one correlation between an individual blower and a well. In this instance, to hit the entire surface of a single multiwell plate with air, multiple blowers are needed—there is not a one-to-one correlation between any one blower and the multiwell plate. In some embodiments, the air stream from each blower overlaps when a grid of blowers is used, i.e., the air from one blower overlaps with the air from another blower. In some embodiments, the air stream from each blower does not overlap when a grid of blowers is used, i.e., the air from one blower does not overlap with the air from another blower. In some embodiments, the air stream from a first portion of blowers does not overlap with the air stream of the other blowers in the first portion, and the air stream from a second portion of blowers overlaps with the air stream of the other blowers in the second portion. The grid arrangement can be used with multiwell plates that have a cover and multiwell plates that do not have a cover.

Without being bound to a particular theory, it is hypothesized drying a multiwell plate using a grid of blowers wherein each blower hits only a portion of the multiwell plate but the blowers collectively hit the entire surface of a multiwell plate(s) is advantageous because (1) it limits splashing because air is not blown directly into the well; (2) it produces a turbulent but diffuse airflow in the well. Without being bound to a particular theory, it is understood that with the blower grid system, sometimes the airflow passes into the well and sometimes it does not.

3. A Shower of Air Blown on the Plurality of Wells in the Multiwell Plate.

In the above embodiments, the air flow is controlled, i.e., is directed through arranged blowers. Specific blowers are designed to blow on a specific portion of the multiwell plate. In some embodiments, specific blowers are designed to blow into a well of a multiwell plate. When controlling the air flow, it is possible to miss portions of the multiwell plate or specific wells, which can affect drying. As such, it is desirable to have a drying system in which the blowers and wells in the multiwell plate do not require precise alignment and the air flow is uncontrolled. With such as system, air is sprayed directly over the wells so that it is turbulent but the air inside the well is diffuse.

In some embodiments, a manufacturing system for drying a multiwell plate comprises a shower of air, i.e., a substantially unbroken flow of air falling from a single blower. In some embodiments, a narrowly directed flow of air is blown from the blower down onto the multiwell plate. In some embodiments, the shower of air covers the entire surface of a single multiwell plate. In some embodiments, the shower of air covers a portion of the entire surface of a single multiwell plate. In some embodiments, the shower of air covers more than the entire surface of a single multiwell plate but does not touch another multiwell plate. In some embodiments, the umbrella or shower of air is 6 inches wide to completely cover the multiwell disk in a flow of air. In some embodiments, the umbrella or shower of air is 4-6 inches wide to completely cover the multiwell disk in a flow of air. In some embodiments, the shower of air is uniform, i.e., it has the same flow of air at the center of the shower and at the sides of the shower, so that the same flow is felt at all points on the multiwell plate. In some embodiments, the shower of air is not uniform, i.e., it has a different flow of air at the center of the shower than at the sides of the shower, so that a different flow is felt at different points on the multiwell plate.

In some embodiments, the manufacturing system for a multiwell plate comprises an array of blowers wherein each blower in the array of blowers is 100% aligned with the multiwell plate such that the entire surface of the multiwell plate is hit with air from the blower.

In some embodiments, the manufacturing system for a multiwell plate comprises an array of blowers wherein each blower in the array of blowers is 95% aligned with the multiwell plate such that 95% of the multiwell plate is hit with air from the blower. In some embodiments, the manufacturing system for a multiwell plate comprises an array of blowers wherein each blower in the array of blowers is 90%, 85%, 80%, 75%, 70%, 65%, 60%, 55%, 50%, 45%, 40%, 35%, 30%, 25%, 20%, 15%, 10%, 5%, or 0% aligned with the multiwell plate. In some embodiments, the manufacturing system for a multiwell plate comprises an array of blowers wherein each blower in the array of blowers is 5%-20% aligned with the multiwell plate. In some embodiments, the manufacturing system for a multiwell plate comprises an array of blowers wherein each blower in the array of blowers is 20%-60% aligned with the multiwell plate. In some embodiments, the manufacturing system for a multiwell plate comprises an array of blowers wherein each blower in the array of blowers is 60%-95% aligned with the multiwell plate. In some embodiments, the manufacturing system for a multiwell plate comprises an array of blowers wherein a first portion of blowers in the array of blowers is aligned with a first multiwell plate and a second portion of blowers in the array of blowers is not aligned with a second multiwell plate. In some embodiments, the manufacturing system for a multiwell plate comprises an array of blowers wherein a first portion of blowers in the array of blowers is aligned with a first multiwell plate, and a second portion of blowers in the array of blowers is not perfectly aligned with a second multiwell plate.

In some embodiments, the manufacturing system for a multiwell plate comprises an array of blowers wherein each blower is indexed over a multiwell plate. When a blower is indexed over a multiwell plate, it means it is designed to blow air over the entire surface of a single multiwell plate but not over other multiwell plates in the dry tunnel. In this regard, a particular indexed blower is not configured to blow air down over all the multiwell plates in the dry tunnel but only over one or a portion of the multiwell plates in the dry tunnel.

In some embodiments, a first plurality of air blowers are arranged to shower air onto the multiwell plate, and a second plurality of air blowers is aligned such that air blows laminarly over the multiwell plate. In some embodiments, when air is blown laminarly over the multiwell plate, the laminar air flow flows in a first direction, and the multiwell plate on the conveyer flows in the same first direction. In some embodiments, when air is blown laminarly over the multiwell plate, the laminar air flow flows in a first direction, and the multiwell plate on the conveyer flows in a different second direction.

In some embodiments, the manufacturing system for a multiwell plate comprises an array of blowers wherein one blower in the array of blowers showers air down over the multiwell plate, i.e., the multiwell plate sits below the blower (with a nozzle) and the stream of air from the single blower (nozzle) covers the entire surface of a single multiwell plate. There is a one-to-one relationship between the multiwell plate and the blower (nozzle). When one blower in the array of blowers showers air down over the multiwell plate, the blower blows air down over the entire surface of a single multiwell plate, not into any specific well (although air could be blown into a specific well by happenstance). In this regard, the one blower in the array of blowers showers air down over the multiwell plate and blows air down over the entire surface of a single multiwell plate, not just over a portion of the multiwell plate such as a well. With the use of one blower in the array of blowers showering air down over the multiwell plate, each well is dried because the shower over the entire surface of the multiwell plate creates enough turbulent airflow to dry each well.

Thus, In some instances, the reagents in a well in a multiwell plate are dried because there is a one-to-one relationship between the blower and the well—but each blower only blows air down over a portion of the multiwell plate. In some instances, the reagents in a well in a multiwell plate are dried even though there is not a one-to-one relationship between the blower and the well—the entire surface of the multiwell plate is hit with air by a single blower. In this situation, there is a one-to-one relationship between the blower and the multiwell plate (as opposed to the well). In some instances, there is not a one-to-one relationship between the blower and the well or the multiwell plate—in order to hit the entire plate surface with air, multiple blowers are needed, and in many cases the bowers are aligned in a grid. In some embodiments, the air stream from each blower overlaps when a single blower showing air down over the multiwell plate is used. In some embodiments, the air stream from each blower does not overlap when a single blower showing air down over the multiwell plate is used. In each instance of drying, the functionality of the reagent being dried is preserved.

The shower arrangement can be used with multiwell plates that have a cover and multiwell plates that do not have a cover.

Without being bound to a particular theory, it is hypothesized drying a multiwell plate using a single blower that showers the entire multiwell plate surface is advantageous because (1) it limits splashing because air is not blown directly into the well; (2) it produces a turbulent but diffuse airflow in the well. Without being bound to a particular theory, it is understood that with the blower shower system, sometimes the airflow passes into the well and sometimes it does not.

Size of the Blowers for Manufacturing a Multiwell Plate

As discussed, the size and shape of the holes in the cover for a multiwell plate will vary depending on the dimensions of the well, which may vary in height, width, length, radius, diameter, content, or volume of the well. Likewise, the size and force with which the blower blows will vary depending on the dimensions of the well, as well as the dimensions of the cover, which may vary by size, shape, and location.

In some embodiments, the manufacturing system for a multiwell plate comprises an array of blowers wherein each blower has the same diameter as the multiwell plate.

In some embodiments, the manufacturing system for a multiwell plate comprises an array of blowers wherein each blower has the same diameter as the well and/or cover hole. In some embodiments, the manufacturing system for a multiwell plate comprises an array of blowers wherein each blower has the same diameter as the load well and/or load cover hole. See, for example, FIG. 4 showing the representative blowers 16 $a$-$c$ have the same diameter as the representative holes in the cover 12 $a$-$c$ and the representative wells 2 $a$-$c$ in the multiwell plate 1. In some embodiments, the manufacturing system for a multiwell plate comprises an array of blowers wherein each blower has a larger diameter than the cover hole and the well it covers. See, for example, FIG. 9 showing representative blower 16 $b$ that has a larger diameter than the hole it covers 12 $b$ and/or the well 2$b$ in the multiwell plate 1. In some embodiments, the manufacturing system for a multiwell plate comprises an array of blowers wherein each blower has a smaller diameter than the cover hole and the well it covers. See, for example, FIG. 9 showing representative blower 16 $a$ that has a smaller diameter than the hole it covers 12 $a$ and/or well 2 $a$ in the multiwell plate 1.

In some embodiments, the manufacturing system for a multiwell plate comprises an array of blowers wherein a first portion of the blowers in the array of blowers has a larger diameter than the multiwell plate and a second portion of blowers in the array of blowers has a smaller diameter than the multiwell plate. In some embodiments, the manufacturing system for a multiwell plate comprises an array of blowers wherein a first portion of the blowers in the array of blowers has a larger diameter than the multiwell plate, and a second portion of blowers in the array of blowers has a diameter that matches the diameter of the multiwell plate. In some embodiments, the manufacturing system for a multiwell plate comprises an array of blowers wherein a first portion of the blowers in the array of blowers has a smaller diameter than the multiwell plate and a second portion of blowers in the array of blowers has a diameter that matches the diameter of the multiwell plate. In some embodiments, the manufacturing system for a multiwell plate comprises an array of blowers wherein a first portion of the blowers in the array of blowers has a larger diameter than the multiwell plate, a second portion of blowers in the array of blowers has a smaller diameter than the multiwell plate; and a third portion of blowers in the array of blowers has a diameter that matches the diameter of the multiwell plate.

In some embodiments, the manufacturing system for a multiwell plate comprises an array of blowers wherein a first portion of the blowers in the array of blowers has a larger diameter than the well and/or cover hole and the well it is designed to blow into and a second portion of blowers in the array of blowers has a smaller diameter than the cover hole and the well it is designed to blow into. In some embodiments, the manufacturing system for a multiwell plate comprises an array of blowers wherein a first portion of the blowers in the array of blowers has a larger diameter than the cover hole and the well it is designed to blow into, and a second portion of blowers in the array of blowers has a diameter that matches the diameter of the cover hole and the well it is designed to blow into. In some embodiments, the manufacturing system for a multiwell plate comprises an array of blowers wherein a first portion of the blowers in the array of blowers has a smaller diameter than the cover hole and the well it is designed to blow into and a second portion of blowers in the array of blowers has a diameter that matches the diameter of the cover hole and the well it is designed to blow into. In some embodiments, the manufacturing system for a multiwell plate comprises an array of blowers wherein a first portion of the blowers in the array of blowers has a larger diameter than the cover hole and the well it is designed to blow into, a second portion of blowers in the array of blowers has a smaller diameter than the cover hole and the well it is designed to blow into; and a third portion of blowers in the array of blowers has a diameter that matches the diameter of the cover hole and the well it is designed to blow into.

In some embodiments, the manufacturing system for a multiwell plate comprises an array of blowers wherein a first portion of the blowers in the array of blowers comprises a first diameter, and each multiwell plate comprises a second diameter. In some embodiments, the first diameter and the second diameter are the same. In some embodiments, the first diameter is larger than the second diameter. In some embodiments, the first diameter is smaller than the second diameter.

In some embodiments, the manufacturing system for a multiwell plate comprises an array of blowers wherein a first portion of the blowers in the array of blowers comprises a first diameter, and each multiwell plate comprises a plurality of wells, where the plurality of wells comprises a second diameter. In some embodiments, the first diameter and the second diameter are the same. In some embodiments, the first diameter is larger than the second diameter. In some embodiments, the first diameter is smaller than the second diameter. The manufacturing system must be configured to blow air past the cover hole and into the well in a turbulent but diffuse manner, regardless of the size of the multiwell plate's well. In this way, there is rapid and consistent drying of the reagents in the wells.

In some embodiments, the manufacturing system for a multiwell plate comprises an array of blowers wherein a first portion of the blowers in the array of blowers has a larger diameter than a second portion of blowers in the array of blowers. In some embodiments, the manufacturing system for a multiwell plate comprises an array of blowers wherein a first portion of the blowers in the array of blowers has a smaller diameter than a second portion of the blowers in the array of blowers. In some embodiments, the manufacturing system for a multiwell plate comprises an array of blowers wherein a first portion of the blowers in the array of blowers has a first diameter and a second portion of the blowers in the array of blowers has a second diameter wherein the first diameter and second diameter are different.

In some embodiments, the manufacturing system for a multiwell plate comprises an array of blowers wherein each blower in the array of blowers has a diameter of between about 5.0 mm and about 7.0 mm. In some embodiments, the manufacturing system for a multiwell plate comprises an array of blowers wherein each blower in the array of blowers has a diameter of between about 2.0 mm and about 7.0 mm. In some embodiments, the manufacturing system for a multiwell plate comprises an array of blowers wherein each blower in the array of blowers has a diameter of between about 4.0 mm and about 8.0 mm or about 1.0 mm and about 8.0 mm.

In some embodiments, an air blower may be configured to blow air into a well having a depth of about 10 mm, about 9 mm, about 8 mm, about 7 mm, about 6 mm, about 5 mm, about 4 mm, about 3 mm, about 2 mm, or about 1 mm.

In some embodiments, an air blower may be configured to blow air into a well having a depth of between about 1 mm and about 20 mm, between about 2 mm and about 18 mm, between about 3 mm and about 16 mm, between about 4 mm and about 14 mm, between about 5 mm and about 12 mm, between about 6 mm and about 10 mm, or between about 8 mm and about 10 mm.

In some embodiments, an air blower may be configured to blow air into a first plurality of wells comprising a width of between 0.5 mm and 10.0 mm, and a depth of between 0.5 mm and 5.0 mm. In some embodiments, the air blower may be further configured to blow air into a second plurality of wells comprising a width of between 5.0 mm and 10.0 mm, and a depth of between 5.0 mm and 10.0 mm. In some embodiments, the air blower may be further configured to blow air into a third plurality of wells comprising a width of between 10.0 mm and 15.0 mm, and a depth of between 10.0 mm and 15.0 mm.

Shape of the Blowers

As depicted in FIG. 7A, the cover holes can have different shapes. As such, the blowers can also have different shapes to match the shapes of the cover holes or the wells in the multiwell plate. As such, the blowers can also have different shapes to match the shapes of the cover load holes or the load wells in the multiwell plate. For example, in FIG. 11 at FIG. 11A, the blower is shown as having a circular or cylindrical shape. In FIG. 11B, the blower is shown as having a half-circular shape. In some embodiments, the blower for a multiwell plate comprises an array of blowers wherein the blowers are circular, rectangular, or triangular. In some embodiments, the blower has one orifice through which air is blown. In some embodiments, the blower has more than one orifice through which air is blown. In some embodiments, each orifice in a plurality of orifices has a different diameter. In some embodiments, each orifice in a plurality of orifices has the same diameter. In some embodiments, a first plurality of orifices has the same diameter and a second plurality of orifices has a different diameter. See FIG. 11C showing a plurality of orifices 1104 in the blower 16.

Length of the Blowers

Figure 12:
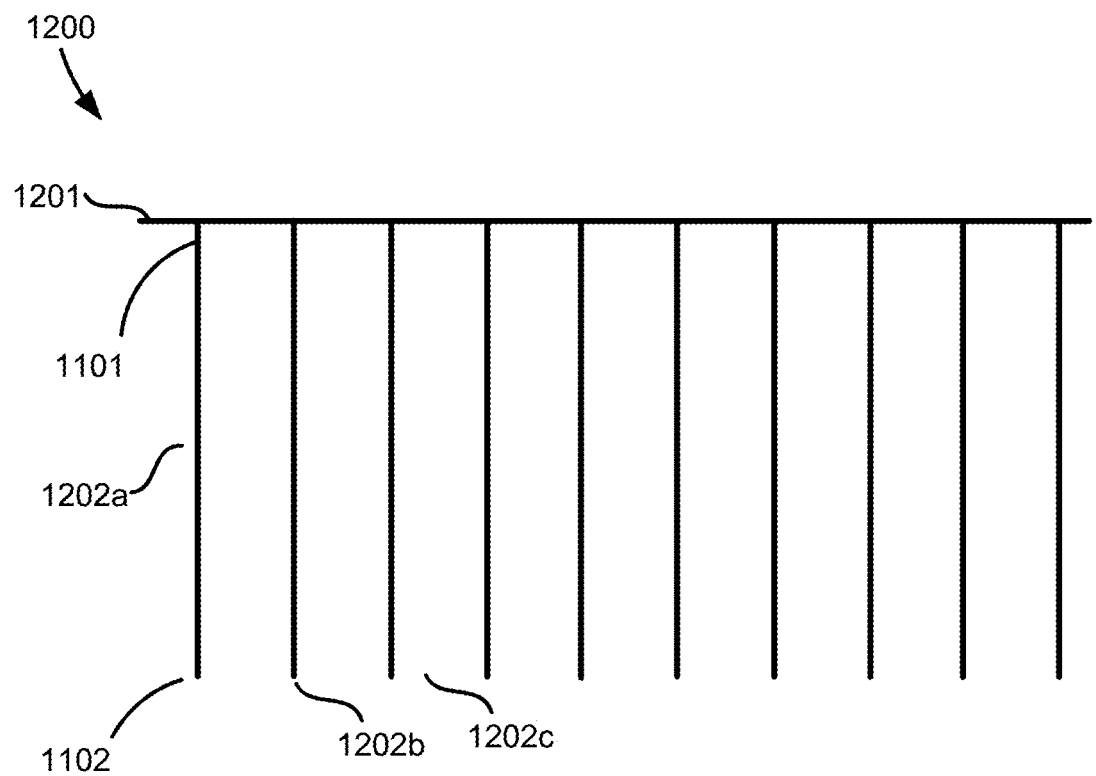
FIG. 12 illustrates an exemplary the air-drying system 1200.
Figure 12:
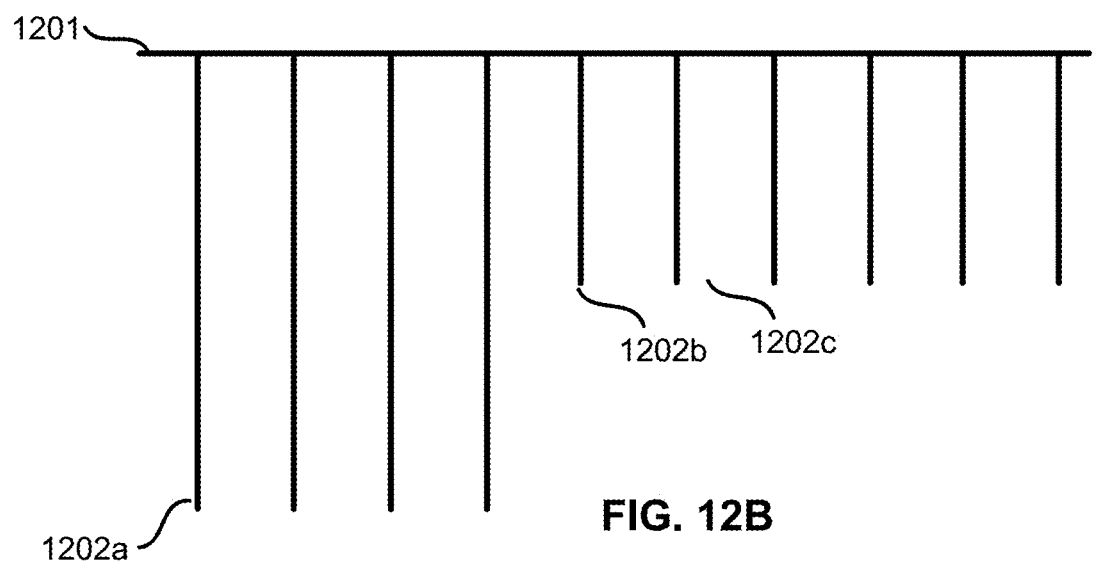

As depicted in FIG. 12 (FIGS. 12A and 12B), the blowers can have different lengths. In some cases, the air down over the first cover hole/well should be more diffuse than the air down over a second cover hole/well. By shortening the length of the blower, the air is released from the blower further away from the cover hole/well and is therefore more diffuse when it reaches the cover hole/well.

In some embodiments, the blower is shaped like a pipe, hose, or tube. In some embodiments, the blower comprises a nozzle, a cylindrical or round spout at the end of a pipe, hose, or tube used to control the jet of gas. The nozzle can be used to control the rate of flow, speed, direction, shape, and/or the pressure of the gas stream that emerges from the blower. The blower comprises a top side (FIG. 11A at 1101), and a bottom side (FIG. 11A at 1102, also referred to as a discharge orifice) and a hole formed between the top side and the bottom side (FIG. 11A at 1103) through which air flows. The bottom side 1102 can further comprise a nozzle or a venturi. In some embodiments, the nozzle is connected to a flow meter. In some embodiments, the system has 1, 2, 3, 4, 5, 6, 7, 8, 9, 10, 11, 12, 13, 14, 15, 16, 17, 18, 19, 20, 25, 30, 35, 40, 45, 50, 55, or 60 air blowers connected to nozzles. In some embodiments, the system has between 1 and 7 or between 7 and 10 or between 6 and 15 or between 10-20 or between 25 and 35 or between 30 and 40 or between 35 and 60 air blowers connected to nozzles.

The bottom side of the air supply tube 1102 may be flat (as shown in FIG. 4) or tapered (as shown in FIG. 3). In some embodiments, the blower comprises an array of blowers wherein a first portion of the blowers in the array of blowers is tapered from the top end to the bottom end and a second portion of the blowers in the array of blowers is not tapered. In some embodiments, the blower comprises an array of blowers wherein a first portion of the blowers in the array of blowers has a flat bottom and a second portion of the blowers in the array of blowers does not have a flat bottom.

In some embodiments, the air-drying system for a multiwell plate comprises an array of blowers attached at their top end 1101 to an attachment mechanism (see FIG. 12A at 1201). The attachment mechanism 1201 can be any suitable support or suspension device to allow the air-drying system to be suspended and positioned appropriately above the objects that are to be dried.

In some embodiments, the air-drying system for a multiwell plate comprises an array of blowers with different lengths. See FIGS. 12A and 12B showing the representative blowers 1202a-c mounted on a housing 1201. In FIG. 12A, the representative blowers 1202 a-c are all the same length. In FIG. 12B, the representative blowers 1202 a and 1202 b-c have different lengths, i.e., are varying heights above the multiwell plate. In some embodiments, the air-drying system for a multiwell plate comprises an array of blowers wherein a first portion of the blowers in the array of blowers has a longer length than a second portion of blowers in the array of blowers. In some embodiments, the air-drying system for a multiwell plate comprises an array of blowers wherein a first portion of the blowers in the array of blowers has a shorter length than a second portion of the blowers in the array of blowers. In some embodiments, the air-drying system for a multiwell plate comprises an array of blowers wherein a first portion of the blowers in the array of blowers has a first length and a second portion of the blowers in the array of blowers has a second length wherein the first length and second length are different.

Air knives/blowers on a production line commonly range from 0.25 to 200 inches (6.4 to 5,080.0 mm) in length. A stationary air knife configuration can require from one to a dozen air knives depending on the application criteria. Air is blasted through the blower via hole 1103 via an air generator, either an industrial blower or air compressor, to deliver the predetermined exit air volume and velocity needed. In some embodiments, the air knives/air-drying system 1200 are stationary while the product passes through the air stream. In other circumstances, the product is stationary and the air knives/air-drying system 1200 move (reciprocate or rotate) over the surface of the stationary product. Air knives/blowers increase the air velocity and cause a turbulent air flow across the multiwell plate.

Function of the Blower

In some embodiments, the housing 1201 further comprises an air heater for heating air before it is blown onto the well. The housing 1201 is attached to the air supply tube 1202. In some embodiments, the air blown from one or more air supply tube forms a curtain of air.

In some embodiments, the housing 1201 is a manifold system which includes externally attached air supply tubes secured at fixed positions along a central pipe or manifold. This design does not allow different air supply tubes to adjust the air output.

In some embodiments, the housing 1201 comprises an impeller to pull air into representative blower tube 1202 a-c. In some embodiments, the housing 1201 comprises a filter for filtering air as it enters the blower tube.

In some embodiments, the air-drying system 1200 (FIG. 12A) for a multiwell plate comprises an array of representative blowers (1202 a-c) wherein each blower has its own air inlet in order to attain the proper volume and flow rate of air to dry a surface. Pressurized air enters the apparatus through the at least one air inlet that is suitably attached to the top end (1101) of the blower. The pressurized air is directed downward within the blower through core 1103 and out the bottom opening 1102.

In some embodiments, the air-drying system 1200 (FIG. 12A) for a multiwell plate comprises an array of representative blowers (1202 a-c) wherein all of the blowers are connected to a single air inlet (not shown). Pressurized air enters the apparatus through the air inlet that is suitably attached to the top end (1101) of each blower. The pressurized air is directed downward within the blower through core 1103 and out the bottom opening 1102. In some embodiments, the air-drying system for a multiwell plate comprises an array of blowers wherein two blowers share an air inlet. In some embodiments, the air-drying system for a multiwell plate comprises an array of blowers wherein 3, 5, 10, 15, 25, 50, 75, 100, 150, 250, or 500 blowers share an air inlet.

In some embodiments, as the multiwell plate travels along a dry tunnel, the blowers are turned on at different intervals, such that as the leading edge of the multiwell plate passes under the air-drying system, a first set of blowers is turned on. As the multiwell plate passes further into the dry tunnel, all of the blowers are turned on. As the leading edge of the multiwell plate passes out from under the air-drying system, the first set of blowers are turned off. In some embodiments, the air-drying system 1200 (FIG. 12A) for a multiwell plate comprises an array of blowers wherein a first portion of the blowers in the array of blowers is on at a first time point while a second portion of the blowers in the array of blowers is off. In some embodiments, the air-drying system for a multiwell plate comprises an array of blowers wherein a first portion of the blowers in the array of blowers is configured to blow air at a first time point, and a second portion of the plurality of air blowers may be configured to blow air at a second time point.

In some embodiments, the multiwell plate is stationary within the dry tunnel. In some embodiments, the multiwell plate moves transversely through the dry tunnel. In some embodiments, the air-drying system 1200 is stationary within the dry tunnel. In some embodiments, the air-drying system 1200 moves transversely through the dry tunnel.

In some embodiments, the air-drying system 1200 (FIG. 12A) for a multiwell plate comprises an array of blowers wherein the blowers in the array of blowers, blows air in a straight downward direction. In some embodiments, the air-drying system for a multiwell plate comprises an array of blowers wherein a first portion of the blowers in the array of blowers, blows air in a straight downward direction and a second portion of blowers in the array of blowers does not blow air in a straight downward direction. In some embodiments, the air-drying system for a multiwell plate comprises an array of blowers wherein a first portion of the blowers in the array of blowers, blows air in a straight downward direction and a second portion of blowers in the array of blowers, blows air from at least one different direction. In some embodiments, the air-drying system 1200 for a multiwell plate is vibrated as air blows out of the blowers.

In some embodiments, to obtain an air stream directed other than vertically downward, the blowers are rotated by rotating a housing 1201 to achieve the desired angular air stream direction. In some embodiments, to obtain an air stream directed other than vertically downward, the blowers are rotated to achieve the desired angular air stream direction. In some embodiments, to obtain an air stream directed other than vertically downward, the blowers are attached to the housing 1201 at the desired angular air stream direction. In some embodiments, the air stream directed is vertically downward, but the blowers are rotated clockwise or counter clockwise so that they are aligned with the cover/wells at a first time point and not aligned at a second time point.

In some embodiments, the air-drying system for a multiwell plate comprises an array of blowers wherein a first portion of the blowers in the array of blowers is attached to the housing 1201 at a first angle and a second portion of blowers in the array of blowers is attached to the housing at a second angle, wherein the first angle and second angle are different. In some embodiments, the first angle is perpendicular, i.e., at a 90° angle to the housing. In some embodiments, the first angle is at a 80°, 70°, 60°, 50°, 40°, 30°, 20°, or 10° angle to the housing. In some embodiments, each blower in the plurality of blowers comprises an axis, wherein the axis of each blower is not perpendicular to the cover or the multiwell plate. In some embodiments, a first portion of the blowers in the plurality of blowers has a first axis, wherein the first axis is not perpendicular to a surface of the cover or the multiwell plate, and a second portion of the blowers in the plurality of blowers has a second axis, wherein the second axis is perpendicular to a surface of the cover or the multiwell plate.

In some embodiments, the air-drying system 1200 for a multiwell plate is positioned at a fixed distance above the multiwell plate. In some embodiments, the air-drying system 1200 for a multiwell plate moves up and down above the multiwell plate while air is blown onto the multiwell plate. In some embodiments, the air-drying system 1200 for a multiwell plate moves left and right over the multiwell plate. In some embodiments, the air-drying system for a multiwell plate moves up and down, and left and right over the multiwell plate. To effectively dry at the highest heights, more air is delivered out of the blower to reach the lower surfaces of the wells in the multiwell plate.

Force of the Blowers

In some embodiments, the air-drying system for a multiwell plate comprises an array of blowers wherein a first portion of the blowers in the array of blowers blows with a first force and a second portion of blowers in the array of blowers blows with a second force wherein the first force and second force are different. In some embodiments, the air-drying system for a multiwell plate comprises an array of blowers wherein a first portion of the blowers in the array of blowers blows with a first force, a second portion of blowers in the array of blowers blows with a second force, and a third portion of blowers in the array of blowers blows with a third force, wherein the first force, second force, and third force are different.

In some embodiments, the air flow at the beginning of the dry tunnel is less than at the end of the dry tunnel to prevent splashing of wet reagents in the wells. In some embodiments, the air flow at the end of the dry tunnel is less than in the middle of the dry tunnel to prevent flaking of dry reagents in the wells.

Geometry of the Air Blowers

In some embodiments, the geometry of the air blowers may mirror the geometry of the multiwell plate. In some embodiments, the two or more pluralities of air blowers may be arranged on the mount 1201 in rows and columns. In some embodiments, each column or row comprises one of a different plurality of air blowers. In some embodiments, the different pluralities of air blowers may be arranged in an alternating pattern such that the air blowers of two or more different pluralities of air blowers alternate. In some embodiments, the different pluralities of air blowers may be arranged in a random order. In some embodiments, the two or more different pluralities of air blowers comprise three, four, five, six, seven, eight, nine, or 10 different pluralities of air blowers.

Reagent Volume

In some embodiments, an air blower is designed to dry about 1 μL-50 μL of liquid. In some embodiments, an air blower is designed to dry between about 20 μL and about 100 μL, between about 2 μL and about 50 μL, between about 3 μL and about 16 μL, between about 4 μL and about 14 μL, between about 5 μL and about 12 μL, between about 6 μL and about 10 μL, or between about 8 μL and about 10 μL of liquid. Regardless of the volume, the functionality and performance of the reagents are preserved in the drying processes described herein.

In some embodiments, an air blower may be designed to dry a first plurality of wells comprising a volume between 1.0 μL and 5.0 μL and a second plurality of wells comprising a volume of between 5.0 μL and 50.0 μL. In some embodiments, an air blower may be further designed to dry a third plurality of wells comprising a volume of between 50.0 μL and 100.0 μL. In some embodiments, an air blower may be further designed to dry a fourth plurality of wells comprising a volume of between 1.0 μL and 100.0 μL.

Methods

Disclosed is a method for making a multiwell plate. In some embodiments, the method comprises aligning a plurality of air blowers over a multiwell plate. In some embodiments, the method comprises aligning a plurality of air blowers over a cover covering a multiwell plate. In some embodiments, the method comprises aligning a plurality of air blowers over holes (load holes or read holes, but preferably a load hole) in a cover, the cover covering a multiwell plate. In some embodiments, the method comprises aligning a plurality of air blowers over holes in a cover, the cover holes aligned with wells (read wells or load wells, but preferably a load well) in a multiwell plate.

In one aspect, disclosed is a tunnel system for drying multiwell plates, comprising: a loading module, a drying zone/module, and a conveyor. In one aspect, disclosed is a tunnel system for drying multiwell plates, comprising: a loading module, a drying zone/module comprising at least one blower which blows air down onto the multiwell plate, an end module, and a conveyor. In one aspect, disclosed is a tunnel system for drying multiwell plates, comprising: a loading zone, a drying zone comprising at least one blower which blows air down onto the multiwell plate, and a conveyor. In one aspect, disclosed is a tunnel system for drying multiwell plates, comprising: a loading zone, a drying zone comprising at least one blower which blows air down onto the multiwell plate, an end zone, and a conveyor.

Disclosed is a drying tunnel system comprising a loading zone/module, at least one drying zone/module, an end zone/module, and a conveyor. In the loading zone/module, the multiwell plate is placed on the conveyor. The multiwell plate then leaves the loading zone and/or module and passes through an access door into at least one drying zone and/or module. The drying zone and/or module comprises at least one air-drying system. In some embodiments, the air-drying system comprises at least one blower. In some embodiments, the drying zone and/or module blows air directly down onto a multiwell plate. In some embodiments, the multiwell plate has a cover. In some embodiments, the multiwell plate has a cover with holes in it that align with the wells in the multiwell plate. In some embodiments, the multiwell plate has a cover with load holes in it that align with the load wells in the multiwell plate. In some embodiments, the multiwell plate has a cover with read holes in it that align with the read wells in the multiwell plate. In some embodiments, the multiwell plate has a cover with load holes and read holes in it that align with the load wells and read wells in the multiwell plate. In some embodiments, the blowers blow air onto the multiwell plate for 0.25 seconds, 0.5 seconds, 1 second, 2 seconds, 3 seconds, 4 seconds, 5 seconds, 6 seconds, 7 seconds, 8 seconds, 9 seconds, 10 seconds, 30 seconds, 60 seconds, 2 minutes, 3 minutes, 4 minutes, or 5 minutes. In some embodiments, the blowers blow air onto the multiwell plate for a first time period, take a break, and then the same blowers blow air again onto the multiwell plate for a second time period. In some embodiments, the first time period and the second time period are the same. In some embodiments, the first time period and the second time period are different. Inside the drying zone/module, the multiwell plate may travel via the conveyor under more than one air-drying system. Inside the drying zone/module, the multiwell plate may travel via the conveyor under more than one air-drying system, wherein the first air-drying system blows air onto the multiwell plate for a first time period and the second air-drying system blows air onto the multiwell plate for a second time period. In some embodiments, the first time period and the second period point are the same. In some embodiments, the first time period and the second time period are different.

Figure 13:
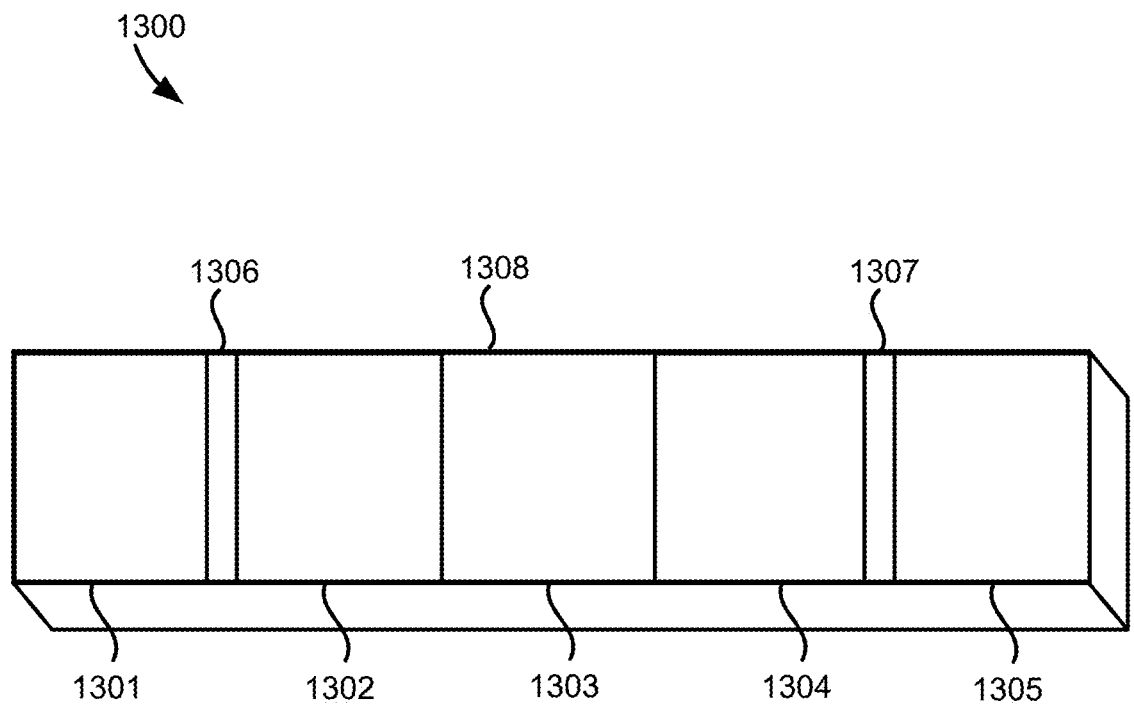
FIG. 13 shows an exemplary drying tunnel 1300 comprising modules.

FIG. 13 shows an exemplary drying tunnel 1300 comprising modules. 1301 is the loading module, 1302 is a first dry module 1303 is a heat module, 1304 is a second dry module, and 1305 is an exit module. 1306 is a module access door and 1307 is a module exit door. 1308 is a tunnel access door which provides access to the interior of the dry tunnel, including one or more modules to allow for cleaning, repair, etc.

Figure 14:
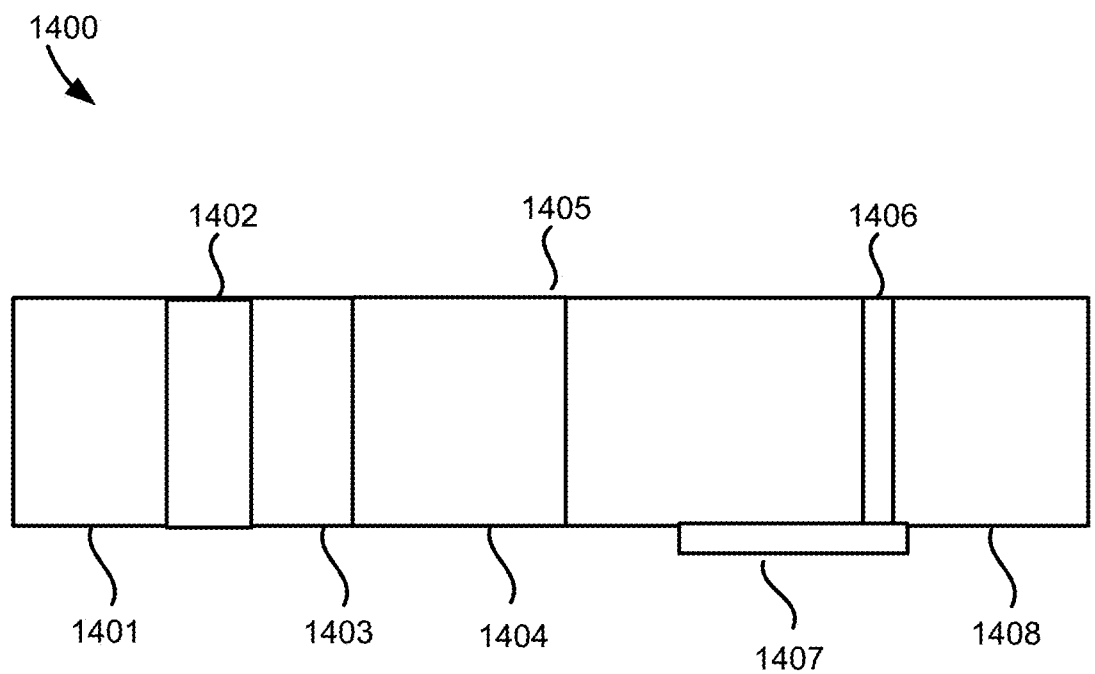
FIG. 14 shows an exemplary drying tunnel 1400 comprising zones.

FIG. 14 shows another exemplary drying tunnel 1400 comprising zones. 1401 is the loading zone, 1402 is a heat sink, 1403 is a heater pad, 1404 is a temperature monitor, 1405 is a tunnel access door, 1406 is an air knife comprising a plurality of blowers (the blowers can be indexed above holes (preferably load holes) in a cover and wells in a multiwell plate, can be indexed above wells in a multiwell plate without a cover, can be formed in a grid wherein the plurality of blowers in the grid collectively blow air down over the entire surface of the multiwell plate (covered or not), or can be a single blower which blows air down over the entire surface of the multiwell plate (covered or not)). 1407 is a control panel to control temperature, belt speed, and blower flow rate. 1408 is an exit zone. In this embodiment, after the multiwell plate comprising reagents in a plurality of wells enters the dry tunnel, it first enters a heat zone and/or module; no air is blown onto the multiwell plate. The multiwell plate then travels over a heat sink so that heat can be dissipated away from the multiwell plate. Next, the multiwell plate passes under an air knife comprising a plurality of blowers. Last, the multiwell plate exits the dry tunnel. The speed at which the multiwell plate can travel through the tunnel is controlled by a controller. The temperature in the dry tunnel is controlled by a controller.

In some embodiments, the multiwell plate may exit the first drying zone and/or module via an exit door. The multiwell plate may travel via the conveyor to a second drying zone and/or module. In the second drying zone and/or module, there is a second air-drying system wherein the first air-drying system in the first drying zone and/or module blows air onto the multiwell plate at a first flow rate and the second air-drying system blows air onto the multiwell plate (with a cover or not) at a second flow rate. In some embodiments, the first flow rate and the second flow rate are the same. In some embodiments, the first flow rate and the second flow rate are different.

The one or more air drying zones and/or modules may comprise a heating element to heat the ambient air inside the drying zone/module.

The one or more air-drying systems may comprise at least one blower that blows air directly down onto the multiwell plate and at least one blower that blows air laminarly over the multiwell plate (the multiwell plate may have a cover or not have a cover).

Figure 15A:
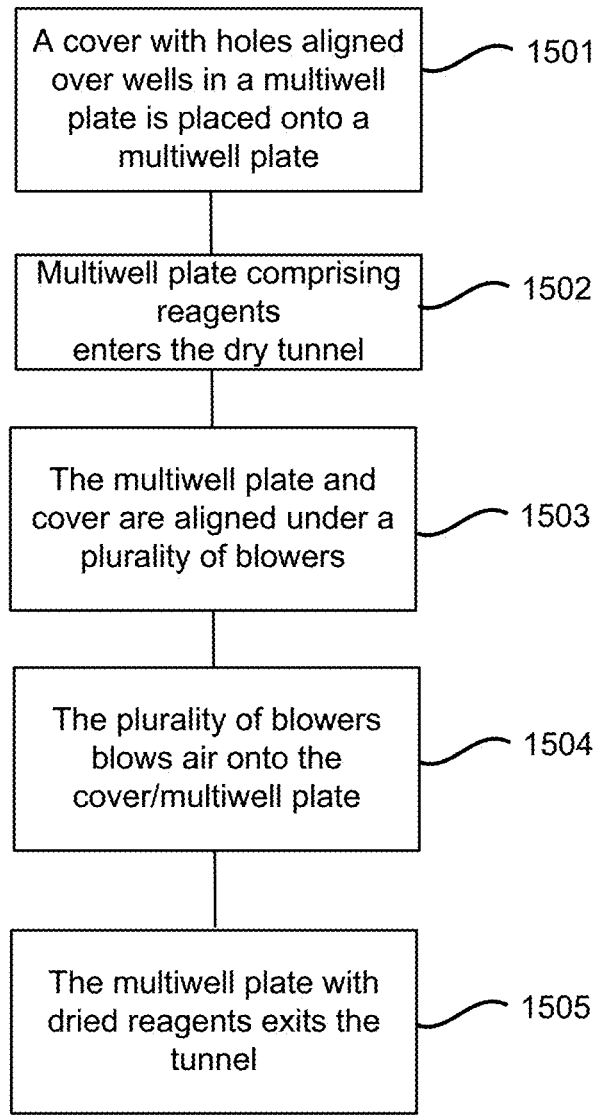
FIG. 15A is a flow chart of an example process for drying multiwell plates.

FIG. 15A is a flow chart of an example process for drying multiwell plates described herein. A cover is placed over the multiwell plate (step 1501). A covered multiwell plate comprising reagents in a plurality of wells (preferably load wells) enters the dry tunnel (step 1502). The covered multiwell plate is aligned with a plurality of blowers (step 1503). In some embodiments, step 1503 is skipped, particularly if the air is blown from a grid of blowers or showered onto the multiwell plate or a wall of air is blown onto the multiwell plate. In both situations, alignment of the blower and multiwell plate is not needed.

In some embodiments, the multiwell plates are aligned on a multiwell plate alignment plate. In some embodiments, the multiwell plate is asymmetrically shaped to facilitate only one insertion orientation into the multiwell plate alignment plate. In some embodiments, the multiwell plate alignment plate is asymmetrically shaped to facilitate only one insertion orientation of the multiwell plate. In some embodiments, the multiwell plate alignment plate can hold more than one multiwell plate. When the multiwell plate alignment plate is placed onto the conveyer, all the multiwell plate(s) in the multiwell plate alignment plate have a fixed orientation so that each plate receives the same drying conditions (heat, force of blowers, number of blowers, etc.). In some embodiments, the multiwell plate alignment plate is asymmetrically shaped to facilitate only one insertion orientation onto the conveyer belt. In some embodiments, the conveyer is asymmetrically shaped to facilitate only one insertion orientation of the belt multiwell plate alignment plate.

The plurality of blowers blows air down over the covered multiwell plate, thereby drying reagents in the well (step 1504). In some embodiments, the plurality of blowers blows air down over the covered multiwell plate, thereby drying reagents in the load well (step 1504). The blowers may be indexed over the wells (preferably load wells), in a grid pattern, or form a shower over the multiwell plate. Step 1502 may comprise an additional step (step 1501a) of aligning the holes in the cover with the wells in the multiwell plate. This alignment step 1501a may also occur at step 1503. In some embodiments, the cover is placed on the multiwell plate (step 1502) after the multiwell plate enters the dry tunnel. The multiwell plate with dried reagents exits the tunnel (step 1505). In some embodiments, after exiting the tunnel, the cover is removed from the multiwell plate.

Figure 15B:
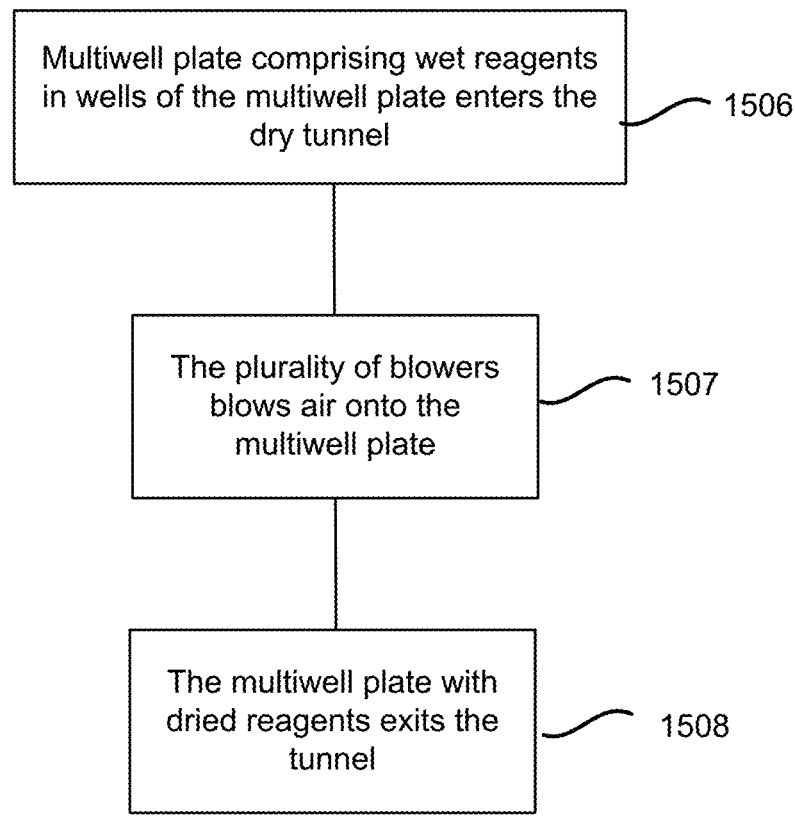
FIG. 15B is a flow chart of an example process for drying multiwell plates.

FIG. 15B is a flow chart of an example process for drying multiwell plates described herein. A multiwell plate comprising reagents in a plurality of wells (preferably load wells) enters the dry tunnel (step 1506). The plurality of blowers blows air down over the multiwell plate, thereby drying reagents in the wells (step 1507) (preferably reagents are dried in the load wells). The blowers may be indexed over the wells, in a grid pattern, or form a shower over the multiwell plate. The multiwell plate with dried reagents exits the tunnel (step 1508). In some embodiments, after exiting the tunnel, the cover is removed from the multiwell plate, if it has one.

A method of drying a multiwell plate is disclosed, comprising: loading at least one multiwell plate comprising wet reagents in wells (preferably load wells) onto a loading zone and/or module at a proximal end of a dry tunnel; using a conveyor to advance the at least one multiwell plate through at least one zone and/or module having at least one access door that can be opened to allow access to an interior of the at least one zone and/or module; and blowing air down onto the multiwell plate in the at least one zone and/or module using a an air-drying system comprising at least one blower mounted therein; discharging the multiwell plate (which may or may not have a cover) at a discharge zone and/or module at a distal end of the dry tunnel wherein the multiwell plate comprises dried reagents in the wells (preferably load wells). The system has a controller operable to control the individual environmental conditions of each of the zones and/or modules. Reagents can be loaded and dried in the load well and/or the read well.

In some embodiments, after entering the access door but before entering the drying zone and/or module, the multiwell plate enters a temperature control zone and/or module where the temperature in the temperature control zone and/or module is controlled by a control element. The controlling element can further adjust the speed of the conveyer and the force at which a plurality of blowers blow. In some embodiments, each blower is controlled independently by a controlling element. In some embodiments, the temperature in each of the tunnel zones and/or modules (drying zone/module or temperature control zone/module) is independently modulated in each of the tunnel zones/modules.

Disclosed is a method for drying multiwell plates in a tunnel, the method comprising: loading a multiwell plate comprising reagent filled wells into a dry tunnel via a loading zone and/or module, the loading zone and/or module comprising a first barrier for substantially blocking a first air flow while allowing the multiwell plate to pass into the tunnel; advancing the multiwell plate through a plurality of drying zones and/or modules by conveyor; drying the multiwell plate passing through the interior of the tunnel by applying air at adjustable temperatures and adjustable air flow, wherein the air flow is adjusted by changing the flow rate of air blowing through a plurality of blowers (the plurality of blowers may be indexed over the wells and/or holes in the cover above the wells of the multiwell plate, formed into a grid pattern where each individual blower blows air onto a portion of the multiwell plate, or formed into an arrangement where each individual blower blows air down over the entire surface of a multiwell plate in a shower); and exiting the multiwell plate through an exit zone and/or module of the tunnel. In some embodiments, the flow rate of air blowing through a plurality of blowers is controlled by a valve for controlling the flow of air therethrough, and the valve is in electronic communication with a controller. In some embodiments, the dry tunnel has a control interface in electronic communication with a controller and is operable to provide machine-readable instructions to the controller to adjust the temperature in each of the plurality of zones and/or modules individually using the control interface and/or adjust the air flow rate in each of the plurality of blowers using the control interface. In some embodiments, the reagent-filled wells are load wells. In some embodiments, the reagent-filled wells are read wells. In some embodiments, the reagent-filled wells are load wells and read wells.

In some embodiments, the dry tunnel comprises more than one drying zone/module. In some embodiments, the dry tunnel comprises 1, 2, 3, 4, 5, 6, 7, 8, 9, or 10 drying zones and/or modules. In some embodiments, each drying zone and/or module comprises at least one air-drying system comprising a plurality of blowers wherein the plurality of blowers may be indexed over the wells and/or holes in the cover above the wells of the multiwell plate, formed into a grid pattern where each individual blower blows air onto a portion of the multiwell plate, or formed into an arrangement where each individual blower blows air down over the entire surface of a single multiwell plate in a shower. In some embodiments, a first drying zone and/or module comprises an air-drying system comprising a plurality of blowers, and a second drying zone and/or module does not comprise an air-drying system but rather dries the multiwell plate via an increased air temperature or desiccant. In some embodiments, a first and second drying zone and/or module each comprise a first and second air-drying system, respectively, comprising a plurality of blowers, wherein each air-drying stem is independently controlled. In some embodiments, each blower in a plurality of blowers in an air-drying system is independently controlled by controlling the flow rate of air generated by each blower.

The invention can be further understood by the following numbered paragraphs:

Paragraph 1: A method for manufacturing a multiwell plate comprising:
  fixing a cover onto a multiwell plate wherein the cover has at least one hole aligned with at least one reagent filled well in the multiwell plate to form a covered multiwell plate;
  aligning at least one air blower over the covered multiwell plate so that the blower is aligned with the at least one hole in the cover and the at least one well in the multiwell plate; and
  blowing air down onto the at least one hole in the cover and the at least one well in the multiwell plate.

Paragraph 2: A method for manufacturing a multiwell plate comprising:
  fixing a cover onto a multiwell plate wherein the cover has at least one hole aligned with at least one reagent filled well in the multiwell plate to form a covered multiwell plate;
  aligning at least one air blower over the at least one well in the multiwell plate; and
  blowing air down onto the at least one well in the multiwell plate.

Paragraph 3: A method for manufacturing a multiwell plate comprising:
  fixing a cover onto a multiwell plate wherein the cover has at least one hole aligned with at least one reagent filled well in the multiwell plate to form a covered multiwell plate;
  aligning at least one air blower over the at least one hole in the cover; and
  blowing air down onto the at least one hole in the cover.

Paragraph 4: The method of any preceding paragraph, wherein the method further comprises a plurality of air blowers, a plurality of holes in the cover and a plurality of wells in the multiwell plate.

Paragraph 5: The method of the preceding paragraph, wherein the plurality of air blowers is positioned above the plurality of holes in the cover and is aligned such that air blows down into each of the plurality of holes.

Paragraph 6: The method of paragraphs 4-5, wherein the plurality of air blowers is positioned above the plurality of wells in the multiwell plate and is aligned such that air blows down into each of the plurality of wells in the multiwell plate.

Paragraph 7: The method of paragraphs 4-6, wherein a second plurality of air blowers is positioned to blow air laminarly over the plurality of wells.

Paragraph 8: The method of any preceding paragraph, wherein there is a one-to-one correspondence between each blower and each well in the multiwell plate.

Paragraph 9: A method for manufacturing a multiwell plate comprising:
  loading a multiwell plate into a dry tunnel;
  blowing air down onto the multiwell plate from an air blower positioned above the multiwell plate.

Paragraph 10: The method of paragraph 9, wherein the method further comprises a plurality of air blowers.

Paragraph 11: The method of paragraph 9 or 10, wherein the plurality of air blowers is arranged in a grid.

Paragraph 12: The method of paragraphs 9-11, wherein the plurality of air blowers is positioned above a plurality of wells in the multiwell plate and is aligned such that air blows down into each of the plurality of wells in the multiwell plate.

Paragraph 13: The method of paragraph 9 or 10, wherein the plurality of air blowers is configured to shower air down over the multiwell plate.

Paragraph 14: The method of paragraphs 9-14, wherein a second plurality of air blowers is positioned to blow air laminarly over the plurality of wells.

Drying Tunnel

The Disclosed is a system for drying multiwell plates in a dry tunnel. The drying tunnel has a first end and a second end. In some embodiments, the first end may be the upstream end with regard to the movement of a conveyor, with the second end being the downstream end. In some embodiments, the drying tunnel is one large undivided unit where each drying function takes place, such as heating, blowing air, etc. In some embodiments, the drying tunnel is broken up into modules. In some modules, distinct drying functions take place, such as heating or blowing air. In some modules, multiple drying functions take place, such as heating and blowing air.

In some embodiments, the drying tunnel is at air pressure or is a partial vacuum.

In some implementations, the drying portion of the tunnel comprises at least one blower without a heater. In some implementations, the drying portion of the tunnel comprises a heating element and at least one blower.

Each of the descriptions below with respect to a specific tunnel zone could be employed in a tunnel module or in a dry tunnel that is one large undivided unit.

Tunnel Zones and/or Module

Each tunnel zone and/or module may comprise a first end and a second end. In some embodiments, the first end may be the upstream end with regard to the movement of the conveyor, and the second end may be the downstream end. The first end and the second end may each comprise a coupling for attaching it to an adjacent module. The couplings may include latches (e.g., toggle latches or clamps) that connect the modules end-to-end at their lateral sidewalls and/or at connection points on the topside and/or underside of the modules.

Drying Zone/Module

Each drying zone and/or module of the tunnel may comprise at least one access door for providing access to the interior of the drying zone/module. Each drying zone and/or module in the system may be set at a different temperature, allowing for a more nuanced drying process. The system may be set up such that the initial drying zone and/or module runs at a high temperature in order to accelerate the drying process, and subsequent drying zones and/or modules may each run at a lower temperature than the last. In some embodiments, the access door may comprise a temperature probe operable to detect the temperature in the interior of the drying zone and/or module and relay the temperature information to a control interface. In some embodiments, each blower in the drying zone and or module comprises an air flow probe operable to detect the air flow of each blower in the interior of the drying zone and/or module and relay the air flow information to a control interface.

The at least one drying zone and/or module may comprise a heating element.

The at least one drying zone and/or module comprises at least one air-drying system comprising at least one blower. The at least one drying zone and/or module comprises at least one air-drying system comprising at least one blower connected to an air/gas supply chamber.

In some embodiments, the blower blows heated air, cooled air, room temperature air, or combinations thereof onto the multiwell plate.

In some embodiments, the air-drying system blows nitrogen gas, oxygen gas, ambient air or combinations thereof onto the multiwell plate. In some embodiments, the air-drying system blows compressed nitrogen gas, compressed oxygen gas, or compressed ambient air or combinations thereof onto the multiwell plate. In some embodiments, the air-drying system comprises a first plurality of blowers and a second plurality of blowers, wherein the first plurality of blowers blows a first gas and the second plurality of blowers blows a second gas, and the first and second gases are different.

In some embodiments, the blower blows nitrogen gas at about 35 Cubic Feet per Minute (CFM). In some embodiments, the blower blows nitrogen gas at 19-40 CFM. In some embodiments, the blower blows oxygen gas at about 35 CFM. In some embodiments, the blower blows oxygen gas at 19-40 CFM. In some embodiments, the blower blows ambient air at about 35 CFM. In some embodiments, the blower blows ambient air at 19-40 CFM.

In some embodiments, the drying zone and/or module is at air pressure or is a partial vacuum.

In some implementations, the drying zone and/or module comprises a plurality of air-drying systems connected in series via a plurality of couplings.

1. Fan

In some embodiments, the drying zone and/or module may comprise an electric fan powered by a power source (e.g., a 120V, 220V, or 240V wall outlet, or a generator), the fan being disposed to blow heated or cooled air from a heat transfer chamber into the interior of the drying zone/module. In some embodiments, the blower may comprise a commercially available electric fan. In some embodiments, the fan may be mounted within a passage between the heat transfer chamber and the interior of the tunnel module. In other embodiments, the fan may be mounted within the heat transfer chamber and may blow air into an air flow conduit, the air flow conduit leading out of the heat transfer chamber and into the interior of the tunnel module. In some embodiments, the air flow conduit may be operable to be aimed in a plurality of directions within the interior of the tunnel module. In some embodiments, the heat transfer chamber may house a plurality of air flow conduits, each disposed to blow heated or cooled air from the heat transfer chamber into the interior of the tunnel module.

2. Blowers

The cover with holes acts as an impedance device for air being blown onto the multiwell plate by an air knife and/or blowers. In some embodiments, the drying zone and/or module may comprise a plurality of blowers powered by a power source (e.g., a 120V, 220V, or 240V wall outlet, or a generator), the blowers being disposed to blow heated, cooled, or room temperature nitrogen gas from a gas supply chamber down onto the multiwell plate.

In some embodiments, the blowers are mounted within a passage between the gas supply chamber and the interior of the tunnel module. In some embodiments, a gas supply chamber blows air into an air flow conduit, the air flow conduit is connected to the plurality of blowers so that the blowers can blow air directly onto the multiwell plate (the multiwell plate may be a covered multiwell plate or not).

The blowers are, in some embodiments, aimed in a plurality of directions within the interior of the tunnel and/or tunnel module.

In some embodiments, the plurality of blowers are disposed to blow heated, cooled, or air temperature air or gas.

In some embodiments, the plurality of blowers take in air via an inlet valve. The blower takes in air or gas and is driven by a motor.

The blower can be a positive displacement blower, a rotary lobe blower, a helical screw blower, a centrifugal blower or combinations thereof. If a positive blower is used, air or gas enters through a section on one side of the blower that increases in size and exits through the other side that decreases in size. Due to the difference in proportion between the entry and exit points, positive displacement of the air occurs as it is released through the contracting side, increasing air pressure. A particular feature of this kind of blower is that, regardless of pressure changes, the speed of airflow remains consistent. A rotary lobe blower operates by way of dual rotors which rotate in opposing directions. The blower draws in air, and the lobes spin the air around before impelling it outward. Due to the rotary lobe function, these blowers produce a high volume of air, and thus are useful for larger vacuum systems. Helical screw blowers are able to produce air at higher pressures than rotary lobe blowers. Helical screw blowers utilize two rotors, which are each equipped with lobes (usually two or three). The main rotor fits into the flute of a second rotor. A helical rotor is designed to give higher and more precise pressure due to the unique helical shape of the lobes on the rotor; the helical geometry works in such a way that it squeezes the air between the rotors. These rotors are also carefully aligned to avoid any contact between the lopes. Centrifugal blowers provide high pressure and variable flow. These blowers have rotating impellers, which increase the speed of the air (or gas) as it passes through. Additionally, as the air enters the blower's fan wheel, it rotates 90 degrees and exits the blower at a faster rate than it entered. As gas passes through, kinetic energy is increased, and thus, as the gas is discharged from the blower, gas enters to level out the pressure.

In some embodiments, the blower is a high-velocity air blowing system that delivers a turbulent flow of air across the surface of the multiwell plate to dry reagents in the wells of the multiwell plate. In some embodiments, the blower delivers air in a turbulent state, i.e, flowing with a velocity higher than the Reynolds number across the surface of the multiwell plate. In some embodiments, the drying system provides nitrogen gas into an air plenum and an air knife, which converts the large volume of high pressure air into high velocity jets or streams of air having a high velocity, e.g., 50-1000 fpm. In some embodiments, the drying system comprises at least one air knife. In some embodiments, the drying system comprises a series of air knives. The cover of the covered multiwell plate serves as an impedance device for the multiwell plate and converts the turbulent air flow into diffuse air flow.

In some embodiments, the drying may be caused by infrared radiation and drying air jets.

Temperature Control Zone and/or Module

In some embodiments, the tunnel has a temperature control zone or module. In some embodiments, the temperature control zone or module comprises a heat sink, heater pads, or combinations thereof. In some embodiments, the temperature control zone and/or module comprises one or more heat sinks. In some embodiments, the temperature control zone and/or module comprises one or more heater pads. In some embodiments, the temperature control zone and/or module comprises one or more heatsinks and one or more heat pads. In some embodiments, the temperature in each of the tunnel zones and/or modules (drying zone and/or module or temperature control module) is independently monitored.

The temperature control zone or module may house at least one radiating element and at least one blower.

In some implementations, the temperature control zone and/or module comprises a heater. In some implementations, the temperature control zone and/or module comprises a heater and a plurality of blowers.

In some embodiments, the temperature control zone or module may further comprise a desiccant.

In some embodiments, there is more than one temperature control zone/module. The temperature control zones and/or modules can be located before the drying zone/module, after the drying zone and/or module, or between the drying zones and/or modules.

Control Interface

1. Visual Display

The control interface may comprise a visual display operable to display to a user the temperature in the interior of the drying zone and/or module, the temperature control zone and/or module, or other zones and/or modules in the dry tunnel. The control interface may comprise a visual display operable to display to a user the air flow rate of each of the blowers of the drying zone/module. The control interface may comprise a visual display operable to display to a user the temperature and the air flow rate of each of the blowers of the drying zone/module. The control interface may further comprise a central processing unit, the central processing unit being operable to automatically adjust at least one of the temperatures of a heating element and the air flow rate of a blower, based on the information from the temperature probe, in order to raise or lower the temperature in the interior of the drying zone and/or module or raise or lower the air flow rate in any one of the plurality of blowers.

2. Air Flow Rate

In one embodiment, in the initial drying zone and/or module, the air flow rate of the blowers is set at a high level, while the heating element of the initial drying zone and/or module is set at a relatively low temperature. Subsequent drying zones and/or modules may run at reduced blower speeds and increased heating element temperatures in order to remove residual moisture from wells in a multiwell plate. In one embodiment, the blowers in the initial drying zone and/or module have a first temperature and a first air flow rate, and the blowers in a subsequent drying zone and/or module have a second temperature and a second air flow rate, wherein the first temperature is lower than the second temperature and the first air flow rate is higher than the second air flow rate.

In one embodiment, in the initial drying zone and/or module, the air flow rate of the blowers is set at a low level, while the heating element of the initial drying zone and/or module is set at a relatively high temperature. Subsequent drying zones and/or modules may run at increased blower speeds and decreased heating element temperatures. In one embodiment, the blowers in the initial drying zone and/or module have a first temperature and a first air flow rate, and the blowers in a subsequent drying zone and/or module have a second temperature and a second air flow rate, wherein the first temperature is higher than the second temperature and the first air flow rate is lower than the second air flow rate.

3. Electronic Controller

In one embodiment, the system comprises an electronic controller, the controller being operable to adjust the temperature in a zone and/or module or air flow in any one of the plurality of blowers. The controller may include a central processing unit and a digital control interface. The control interface may be operable to control a plurality of tunnel zones and/or modules. The control interface may be operable to apply independent control parameters to each of the tunnel zones and/or modules. The control interface may be programmable to establish independent parameters for each tunnel zone and/or module (e.g., speed of the conveyor, temperature, flow rates of air, etc.), allowing predetermined zones in the tunnel system to apply an optimized sequence of conditions for a particular multiwell plate. The control interface may include multiple independent zone controller interfaces, which may be presented as separate control widgets (e.g., graphical boxes that include various parameter level adjustment functions for controlling temperature, blower force, and conveyor speed within a module) within one or more graphical user interfaces.

The control interface may be operable to control a plurality of blowers. The control interface may be operable to apply independent control parameters to each of the blowers in a tunnel zone and/or module. The control interface may be programmable to establish independent parameters for each blower in a tunnel zone and/or module (e.g., air flow rates).

4. Programmable Memory

The control interface may also include a programmable memory, and the user interface may be used to create multiple sets of control parameters for the zones and/or modules and store each set of control parameters as a pre-programmed set of computer-executable instructions that the control interface may implement when selected by a human operator. Programming of the controller can alternatively be done by connecting it to a personal computer through a USB port, or remotely through a data connection to the internet. The multiple sets of control parameters may each be tailored to a particular kind of multiwell plate or diagnostic assay (e.g., immunofluorescence, chemistry, etc.).

5. Control Valve

The control interface may be in electronic communication with control valve structures in each zone and/or module that control the movement of air into the blowers or a heating element within each module. The control valve structures may be electrically activated flow control valves that can be used to provide a specific and independent flow rate of air or control the temperature of a zone and/or module (heated or cooled) through the radiating elements of each module. The control parameters may include different temperature conditions in two or more zones and/or modules, or groups of zones and/or modules, and the controller may execute such temperature control parameters through incremental control of the flow control valves.

In some embodiments, the control interface may comprise one or more rotatable dials or other mechanical switches to control the temperature level (e.g., hotter or cooler) through each of the tunnel zones and/or modules. In some embodiments, the blower rate may be controlled by a valve, the valve being operable to increase or decrease the rate of air flow in the blowers in each of the tunnel zones and/or modules.

In some embodiments, the controller may be operable to control the blower operation in each zone and/or module, particularly the rate of air flow coming from the blower. In some embodiments, the controller may be operable to control the direction of the blower. The control interface may allow a user to manipulate the blower air flow settings of each zone and/or module within the control widget for the particular tunnel module. In other embodiments, the control interface has a dial or other mechanical switch.

In some implementations, the system further comprises a control interface, wherein the control interface is operable to adjust the level of heat of the heating element. In some implementations, the system further comprises a control interface, wherein the heating element and the plurality of blowers are controlled independently.

Conveyer

The multiwell plate moves through the dry tunnel on a conveyer, which may be a belt, chain, rollers, wheel conveyors, or other conveying mechanism powered by one or more motors operable to vary the speed of the belt, increasing or decreasing the time in which the multiwell plate passes through each tunnel zone/module. For example, a first zone and/or module has a relatively slow conveying speed (e.g., in a range of about 2 to about 10 feet/minute) in combination with a relatively low heating temperature (e.g., about 80° F. to about 100° F., or any value or range of values therein) and a high blower speed (e.g., about 600 to about 1000 feet/minute, or any value or range of values therein).

The conveyor has a motor. The conveyor motor is any motor appropriate for driving a drive shaft to cycle the conveyor. In some embodiments, the motor may comprise an electric motor. In some embodiments, the electric motor may be powered by a power source (e.g., a 120V, 220V, or 240V wall outlet, or a generator). In some embodiments, the electric motor may comprise an induction motor with a 220V power supply and an output in the range of approximately 3 kW to approximately 15 kW. The motor may comprise a commercially available electric motor (e.g., an Emean Electric Machinery Co. YC series 3 kW electric motor). In other embodiments, the motor may comprise an internal combustion motor. The motor may be mechanically connected to the drive shaft. In some embodiments, the motor may be connected to the drive shaft via an axle. In other embodiments, the motor may be connected to the drive shaft via a pulley and a belt or chain.

In another aspect, an embodiment is a conveyer with air flow regions to allow air to be exhausted below the conveyer. In some embodiments, the conveyer is above an exhaust flow control device. The exhaust flow control device has a plurality of air flow channels and is configured to draw air below the conveyer. Generally, the exhaust flow control device has a higher air flow channel density around the perimeter exhaust flow control device, i.e., away from the exhaust duct 1606. In some embodiments, there are no air flow channels in the exhaust flow control device immediately above the exhaust duct 1606.

Figure 16:
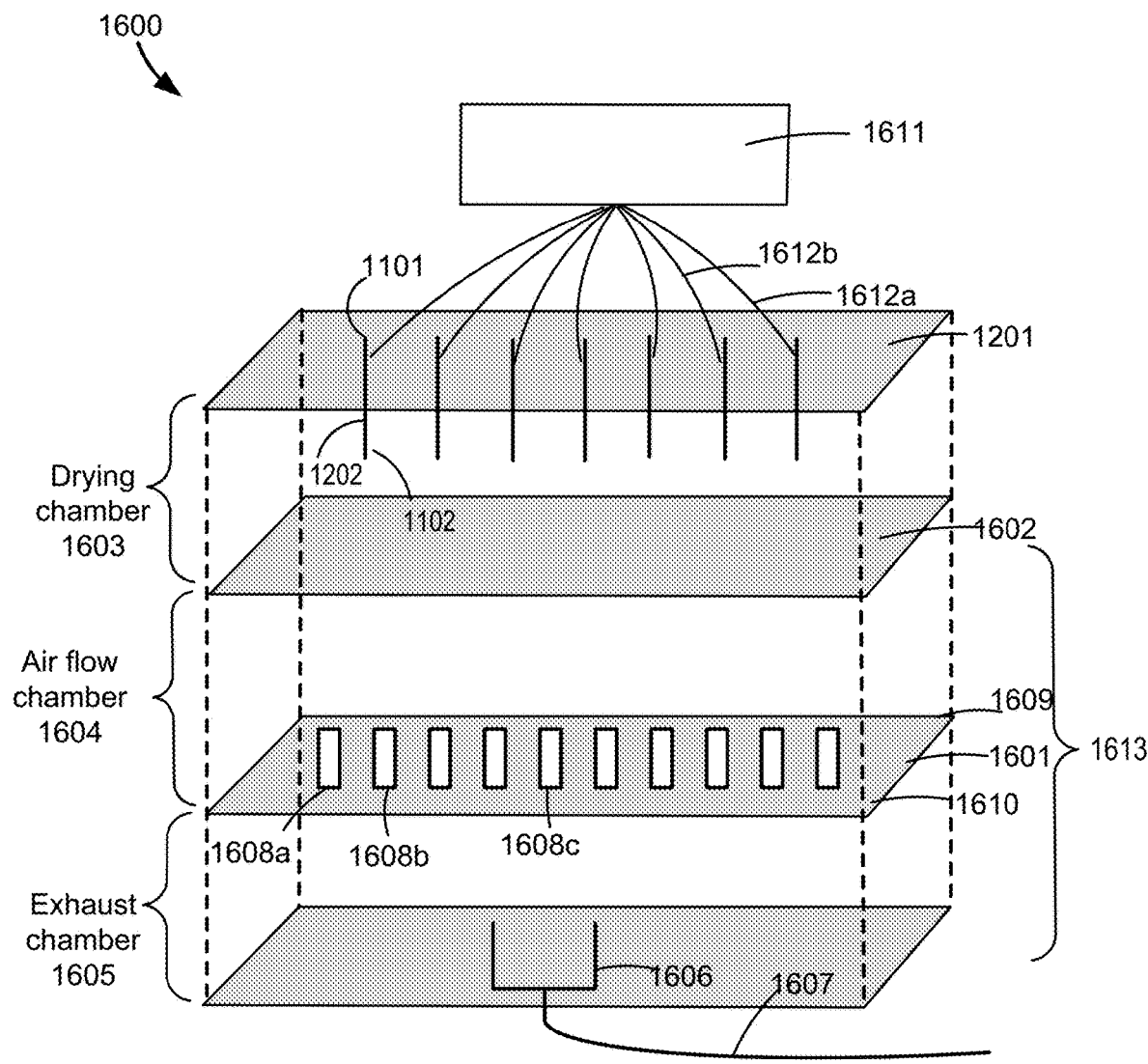
FIG. 16 is an exemplary air-drying system 1600 showing an exemplary drying tunnel comprising an exhaust flow control device 1601 with exemplary windows 1608*a-c*. The exhaust flow control device 1601 is positioned under the conveyer 1602 and above exhaust duct 1606.

Disclosed is a conveyor comprising a plurality of openings adapted to allow air and/or nitrogen gas to pass through the conveyor. Air is blown onto the multiwell plate by a blower, the conveyor can support the multiwell plate while allowing air/N2 gas to pass by. In some embodiments, the air flow regions are in the conveyer belt, i.e., holes in the belt large enough to allow air to pass through but small enough that the multiwell plate does not fall through. In some embodiments, the air flow regions are between the conveyer and the wall of the dry zone (an air flow gap). In some embodiments, there is an air flow gap on either side of the conveyer between the conveyer and the wall of the conveyer chamber (FIG. 16 item 1602). In some embodiments, there is an air flow gap on one side of the conveyer and not the other side. In some embodiments, the gap is between 0.1 and 5 inches. The air flow gap allows air to pass over the multiwell plate on the conveyer and into the air flow chamber below. (FIG. 16 item 1604).

In some embodiments, bottom opening of the blower 1102 or blower nozzle is 7-14 inches above the conveyer belt.

Loading Module

The system may also include a loading zone/module and an exit zone/module. The loading zone/module may be at the proximal end of the system into which a multiwell plate is loaded into the system. If the multiwell plate has a cover, the cover on the multiwell plate may be applied before the multiwell plate enters the loading module, while it is in a landing zone/module, or after the loading zone/module. The exit zone and/or module receives the dried multiwell plate.

Applying the Cover to the Multiwell Plate

In some embodiments, the cover is placed on the multiwell plate by a human such that the holes in the cover are aligned with the wells in the multiwell plate.

In some embodiments, attaching the cover to the multiwell plate such that the holes in the cover are aligned with the wells in the multiwell plate is achieved by the use of an alignment apparatus. The alignment apparatus is an applicator to apply the cover to the multiwell plate such that the holes in the cover are aligned with the wells in the multiwell plate. The alignment apparatus can be inside the dry tunnel or outside. The alignment apparatus releasably connects the cover to a multiwell plate. The alignment apparatus maintains a selected orientation and/or position of a cover relative to the multiwell plate. The alignment apparatus holds the cover and drops it onto the multiwell plate. The alignment apparatus disengages from the cover upon contact of the cover with the multiwell plate. The alignment apparatus disengages from the cover without significantly changing the position or orientation of the cover relative to the multiwell plate.

In one embodiment, the alignment apparatus is connected to the cover at 1, 2, 3, 4, 5, 6, 7, 8, 9 or 10 touchpoints. In one embodiment, the alignment apparatus is connected to the cover completely around the periphery of the cover. In one embodiment, the alignment apparatus is connected to the cover via a holdfast region on the cover, which allows the alignment apparatus to grip the cover. In one embodiment, the alignment apparatus is connected to the cover via a plurality of alignment guides in the cover, which allows the alignment apparatus to grip the cover.

The alignment apparatus may include a guide, such as a ring, a conical alignment guide, a tactile alignment guide, or a visual alignment guide, which enables or facilitates placement of the cover on the multiwell plate such that the holes in the cover are aligned with the wells in the multiwell plate.

Detachably coupling the cover to the multiwell plate comprises the alignment of the two substrates. The alignment apparatus holds the cover as described above. The alignment apparatus is able to move the cover in three directions, along x, y, and z coordinates, in order to align the cover holes with the wells in the multiwell plate. Once the cover is aligned with the well in the multiwell plate the alignment apparatus releases the cover onto the multiwell plate. In some embodiments, after the cover is released onto the multiwell plate, the alignment apparatus adjusts the cover by pushing or pulling it into position such that the holes in the cover are aligned with the wells in the multiwell plate.

Zone and/or Module Access Door

Each of the tunnel zones and/or modules (loading module, exit module, drying zone/module, temperature control module) may further include a barrier which is passable by the multiwell plate on the conveyor but which substantially blocks air flow into or out of the tunnel, allowing for improved control of temperature, air flow within the tunnel, and sterility. For example, the barrier may comprise rubber, plastic, or fabric flaps, a door which opens upward or downward, or a wall with a small gap opening to allow the multiwell plate to pass underneath. Each of the tunnel zones and/or modules (loading module, exit module, drying zone/module, temperature control module) may further include a barrier which is configured to open to allow the multiwell plate to pass on the conveyor but which substantially blocks air flow into or out of the tunnel, allowing for improved control of temperature, air flow within the tunnel, and sterility.

In some embodiments, each zone and/or module may comprise a plurality of access doors. Each zone and/or module may comprise a first access door on a first side of the drying zone and/or module and a second access door on the second side of the tunnel module.

Tunnel Access Door

The tunnel may have a tunnel access door. The tunnel access door may be a gullwing style door which swings upward, providing a broad opening to the interior of the tunnel/module. A user may thus access the tunnel zone and/or module interior, the conveyor, and any multiwell plate that may be in the tunnel zone and/or module by simply lifting the tunnel access door, providing easy access for sampling, maintenance, and cleaning. In some embodiments, the tunnel access door is the attachment mechanism 1201 or may not be the attachment mechanism 1201.

The invention can be further understood by the following numbered paragraphs:

Paragraph 1: A multiwell plate manufacturing system comprising:
    an air-drying system, the air-drying system comprising at least one blower;
    a multi-well plate comprising at least one well and a cover with at least one hole over the at least one well, wherein the at least one blower is positioned above the at least one well and is aligned such that air blows onto the cover hole and into the at least one well.

Paragraph 2: The multiwell plate manufacturing system of paragraph 1, wherein the at least one hole is aligned with the at least one well.

Paragraph 3: The multiwell plate manufacturing system of paragraph 1, wherein the at least one hole is offset from the at least one well by 10-30%.

Paragraph 4: The multiwell plate manufacturing system of any preceding paragraph, wherein the at least one blower is aligned with the at least one hole and the at least one well.

Paragraph 5: The multiwell plate manufacturing system of any of paragraphs 1-3, wherein the at least one blower is offset from the at least one hole and the at least one well by 10-30%.

Paragraph 6: The multiwell plate manufacturing system of any preceding paragraph, wherein the at least one blower is arranged such that some air blows into the at least one well.

Paragraph 7: The multiwell plate manufacturing system of any preceding paragraph, wherein the at least one blower is arranged to blow air directly down onto the at least one hole and the at least one well.

Paragraph 7: The multiwell plate manufacturing system of any preceding paragraph, wherein the at least one blower is arranged to blow air laminarly over the at least one hole and the at least one well.

Paragraph 8: The multiwell plate manufacturing system of any preceding paragraph, wherein the at least one blower is arranged to blow air laminarly over and directly down onto the at least one hole and the at least one well.

Paragraph 9: The multiwell plate manufacturing system of any preceding paragraph, wherein the multiwell plate further comprises reagents for performing multianalyte detection.

Paragraph 10: The multiwell plate manufacturing system of paragraph 9, wherein the reagents are present as dried reagents or in solution.

Paragraph 11: The multiwell plate manufacturing system of any preceding paragraph, wherein the at least one blower comprises a nozzle or a venturi.

Paragraph 12: The multiwell plate manufacturing system of any preceding paragraph, wherein the system further comprises a temperature control zone and a drying zone.

Paragraph 13: The multiwell plate manufacturing system of paragraph 11, wherein the at least one blower blows air onto the cover and multiwell plate in the drying zone.

Paragraph 14: The multiwell plate manufacturing system of any preceding paragraph, wherein the system further comprises a conveyer, and the multiwell plate with the cover moves through the system on the conveyer.

Paragraph 15: A multiwell plate manufacturing system comprising a drying zone.

Paragraph 16: The multiwell plate manufacturing system of paragraph 15, wherein the drying zone comprises an air-drying system, the air-drying system comprises a plurality of blowers.

Paragraph 17: The multiwell plate manufacturing system of paragraph 15 or 16, wherein each of the plurality of blowers is indexed above a well in a multiwell well plate and above a hole in a cover, wherein the hole in the cover is aligned with the well in the multiwell well plate.

Paragraph 18: The multiwell plate manufacturing system of paragraph 15 or 16, wherein each of the plurality of blowers is arranged in a grid.

Paragraph 19: The multiwell plate manufacturing system of paragraph 15 or 16, wherein the plurality of blowers blows air down over the entire surface of the multiwell plate.

Paragraph 20: The multiwell plate manufacturing system of paragraph 15 or 16, wherein the plurality of blowers blows air down over a portion of the multiwell plate.

Paragraph 21: The multiwell plate manufacturing system of paragraph 15 or 16, wherein each of the plurality of blowers is arranged to shower air down over the entire surface of the multiwell plate.

Paragraph 22: The multiwell plate manufacturing system of any preceding paragraph further comprising: a loading module, and a conveyor.

Evacuating Air from the Tunnel

Generally, central exhaust systems used for the purpose of removing or exhausting air from confined areas such as dry tunnels lead to air flow pattern variations in areas further from or closer to the central exhaust system. The variation in air flow patterns could result in temperature and humidity changes in areas further or closer to the central exhaust system. For example, the N2 flow pattern, humidity, or temperature may vary further away from the central exhaust system. This occurs whether the central exhaust system operates intermittently or continuously.

Further, the above described embodiments describe controlling air flow based on the number, size, shape, and location of blowers. Here, what is described is controlling air flow based on the exhaust of the air, i.e., pulling air out of the dry tunnel as opposed to blowing it in.

Drying is controlled by the combination of flow rate (number of blowers, flow rate, alignment of blowers, etc.) and exhaust rate (number of exhaust ducts, force by which air is exhausted, dampening exhaust, directing the flow of exhaust, etc.). The exhaust rate can be further controlled by how the air is exhausted from the system using an exhaust flow control device, which forces air to be exhausted more evenly from the dry tunnel. With such a system, the exhaust is distributed along the tunnel, and pockets of high air flow or high nitrogen are not formed.

Disclosed is an exhaust flow control device and system that mechanically controls the exhaust of air from low exhaust regions and high exhaust regions uniformly. Disclosed is an exhaust flow control device and system that mechanically controls the exhaust of air from low air flow regions and high air flow regions uniformly. The exhaust flow control device requires no direct electric or pneumatic power source. The region immediately above an exhaust fan/duct is considered a high exhaust region. Regions not immediately above an exhaust fan/duct are considered low exhaust regions.

Disclosed is a system and method for providing a substantially constant exhaust or ventilation of air/nitrogen gas from the dry tunnel. Disclosed is a system and method for providing a substantially constant exhaust or ventilation of air/nitrogen gas from the dry tunnel is provided when the dry tunnel has a central fan or blower system to exhaust air/nitrogen gas from the dry tunnel. The system and method permits zone-by-zone or module-by-module exhaust control in low and high exhaust regions.

Referring now to FIG. 16, which shows a dry tunnel system 1600. The system 1600 comprises a drying chamber 1603 above an air flow chamber 1604 which is above an exhaust chamber 1605. The drying chamber 1603 comprises the conveyer 1602 and blowers 1202. The air flow chamber 1604 comprises an exhaust flow control device 1601. The exhaust flow control device 1601 comprises a plurality of exhaust windows 1608a-c. Only representative exhaust windows 1608 a-c are labeled in FIG. 16. The air flow chamber 1604 or the drying chamber 1603 may further comprise a heater. The heater may be used to dry the multiwell plate. In some embodiments, the heater is not used to dry the multiwell plate but is instead used to maintain a constant temperature in the dry tunnel. In these situations, drying is not accomplished with heat; rather heat is used to maintain a constant environment. The exhaust chamber 1605 comprises an exhaust duct 1606, fan, or ventilator. The exhaust duct 1606 is shown in the floor of the exhaust chamber but can also be located in a wall of the exhaust chamber. The system may further comprise at least one air contaminant sensor for collecting air contaminant levels such as nitrogen gas from the inside of at least one zone/module. The exhaust tube 1607 can recirculate the nitrogen gas back to a gas supply unit 1611 or out into the environment. In some embodiments, the exhaust duct 1606 pumps air/nitrogen gas out of the dry tunnel. In some embodiments, the exhaust duct 1606 allows air/nitrogen to pass passively out of the dry tunnel.

Although the embodiment illustrated in FIG. 16 shows a single zone/module exhaust system, it should be understood that if the dry tunnel comprises more than one zone/module there may be more than one exhaust system. Stated another way, each zone/module in a dry tunnel may be associated with its own air exhaust system 1613. Alternatively, each zone/module in a dry tunnel may share a single air exhaust system 1613.

Although not shown, zones/modules can comprise more than one air exhaust system 1613. The air exhaust system 1613 collectively refers to the air flow chamber 1604 and exhaust chamber 1605 and all of the parts included therein such as the exhaust flow control device 1601 and exhaust duct 1606. The location and distribution of the air flow windows 1608 *a-c* in the exhaust flow control device 1601 will depend on the location and number of air exhaust ducts 1606. For example, if the zones/module comprises two exhaust fans (one on each end of the zones/modules—as opposed to in the center as shown in FIG. 16), the air flow windows will be more open in the center (where the air exhaust is not) compared to over the air exhaust ducts. For example, if the zones/module comprises one exhaust fan in the center of the module (as shown in FIG. 16), the air flow windows will be closed in the center (where the air exhaust is) compared to the periphery of the air flow chamber 1604 (where the air exhaust is not).

While the illustration shown in FIG. 16 shows the air flow windows 1608 *a-c* in the exhaust flow control device 1601 not connected to the air exhaust duct, they may be coupled directly to the air exhaust via tubing, ducts, etc. The tubing/ducts may be coupled directly to the air exhaust or they may be coupled to a main ventilation tube which is then directly coupled to the air exhaust.

With use of this system 1600, there is uneven exhaust in the exhaust chamber 1605 but even exhaust in the drying chamber 1603. Stated another way, use of the exhaust flow control device 1601 creates an even draw of air out of the drying chamber 1603 but the air is drawn out of the exhaust chamber 1605 unevenly, i.e., there is greater exhaust in the area surrounding the exhaust duct 1606.

The dry tunnel system 1600 may define an exhaust command signal designed to regulate (increase, decrease, remain constant) based on the amount of air being blown into the dry tunnel. The exhaust rate may be based on the sensed air flow rate entering the dry tunnel or based on dry tunnel contaminant parameter information such as the level of nitrogen gas in the tunnel. The exhaust command signal refers to any pneumatic, electronic, analog or digital signal, or a software or firmware variable that operates in a firmware or software program running on a microprocessor or computer that is used by the zone control exhaust system to control the rate of exhaust.

Exhaust Flow Control Device

1. Air Flow Windows

Number of Air Flow Windows

The dry tunnel system 1600 comprises an exhaust flow control device 1601. Exhaust flow control device 1601 is a dampener. The exhaust flow control device 1601 allows the dry tunnel to have a uniform flow of air from the drying chamber, to the air flow chamber, to the exhaust chamber, and out of the dry tunnel. The exhaust flow control device 1601 is positioned under the conveyer 1602 which is under the array of blowers attached at their top end 1101 to an attachment mechanism 1201. In some embodiments, the blower comprises a nozzle.

The exhaust flow control device 1601 is shown in FIG. 16 with representative air flow windows 1608*a-c*. The air flow windows can also be referred to as air flow channels. The air flow window covers are not shown. In some embodiments, the air flow channels/windows do not have a cover. The air flow window covers may slide horizontally over the air flow window to open or close the air flow window. The air flow window covers may slide horizontally on a rail on the exhaust flow control device to open or close the air flow window. The air flow window covers may slide horizontally in a sliding groove in the exhaust flow control device to open or close the air flow window. The air flow window covers may open vertically on a hinge or pivot support to open or close the air flow window. The air flow window cover may be detachably coupled to the exhaust flow control device 1601 on one side, two sides, three sides, or four sides. The air flow window cover may sit on top of the exhaust flow control device 1601 or be flush with the exhaust flow control device 1601.

In some embodiments, the exhaust flow control device 1601 comprises a plurality of air flow windows, each window having a cover. The air flow window cover may partially cover the air flow window, completely cover the air flow window, or not cover the air flow window at all. In some embodiments, the cover may automatically open or close during the drying process. If greater exhaust is needed, the cover will open. If less exhaust is needed, the cover will close. In this way, the control of air flow is controlled by the extent to which the air flow window is covered or not.

In some embodiments, the air flow windows and window covers are spaced apart, and the space between the air flow windows is blocked from the exhaust duct below.

Number of Air Flow Windows and Air Flow Window Covers

In some embodiments, the exhaust flow control device used to form the exhaust flow control device comprises a total of 20 air flow channels/windows. In some embodiments, the exhaust flow control device used to form the exhaust flow control device comprises a total of 1, 2, 3, 4, 5, 6, 7, 8, 9, 10, 11, 12, 13, 14, 15, 16, 17, 18, 19, or 20 air flow windows and window covers. In some embodiments, the exhaust flow control device comprises a total number of air flow windows and air flow window covers of between 1 and 10, between 5 and 10, between 7 and 10, between 10 and 20, between 10 and 15, or between 15 and 20.

In some embodiments, the exhaust flow control device and/or plate used to form the exhaust flow control device comprises more smaller air flow channels, such as a total of 10, 20, 30, 40, 50, 60, 70, 80, 90, 100, 120, 140, 160, 180, 200, 250, 300, 350, 400, 450, 500, 600, 700, 800, 900, or 1,000 air flow channels. In some embodiments, the exhaust flow control device and/or plate used to form the exhaust flow control device comprises a total number of air flow channels between 10 and 50, between 50 and 100, between 100 and 160, between 160 and 200, between 200 and 500, or between 500 and 1000.

In some embodiments, the system comprises a first exhaust flow control device wherein the air flow windows and window covers are evenly dispersed on the first exhaust flow control device.

Air flow can also be controlled by the density of air flow channels/windows. In some embodiments, the system comprises a first exhaust flow control device having a first region with a first density of air flow windows and air flow window covers and at least a second region with a different density of air flow windows and air flow window covers. The first density of air flow windows and air flow window covers is lower than the second density of air flow windows and air flow window covers. The high density windows and window covers may be used in regions of the exhaust flow control device that require more ventilation, more exhaust, and/or more airflow. This is typically further away from the exhaust duct.

In some embodiments, the system comprises a first exhaust flow control device having a first region with a first set of air flow windows and air flow window covers and a second set of air flow windows and air flow window covers. The first set of air flow windows and air flow window covers is open, closed, or partially open, and the second set of air flow windows and air flow window covers is open, closed, or partially open. The system can have a third set of air flow windows and air flow window covers, wherein the third set is open, closed, or partially open. The open windows may be used in regions of the exhaust flow control device that require more ventilation, more exhaust, and/or more airflow. This is typically further away from the exhaust duct.

In some embodiments, the system comprises an exhaust flow control device having a first plurality of air flow windows and air flow window covers, wherein the air flow windows in the first plurality of air flow windows and air flow window covers are open. In some embodiments, the system comprises an exhaust flow control device having a first plurality of air flow windows and air flow window covers, wherein the air flow windows in the first plurality of air flow windows and air flow window covers are closed. In some embodiments, the system comprises an exhaust flow control device having a first plurality of air flow windows and air flow window covers, wherein the air flow windows in the first plurality of air flow windows and air flow window covers are partially open. In some embodiments, the system comprises an exhaust flow control device having a second plurality of air flow windows and air flow window covers, wherein the air flow windows in the second plurality of air flow windows and air flow window covers are open. In some embodiments, the system comprises an exhaust flow control device having a second plurality of air flow windows and air flow window covers, wherein the air flow windows in the second plurality of air flow windows and air flow window covers are closed. In some embodiments, the system comprises an exhaust flow control device having a second plurality of air flow windows and air flow window covers, wherein the air flow windows in the second plurality of air flow windows and air flow window covers are partially open. In some embodiments, the system comprises an exhaust flow control device having a third plurality of air flow windows and air flow window covers, wherein the air flow windows in the third plurality of air flow windows and air flow window covers are open. In some embodiments, the system comprises an exhaust flow control device having a third plurality of air flow windows and air flow window covers, wherein the air flow windows in the third plurality of air flow windows and air flow window covers are closed. In some embodiments, the system comprises an exhaust flow control device having a third plurality of air flow windows and air flow window covers, wherein the air flow windows in the third plurality of air flow windows and air flow window covers are partially open.

In some embodiments, the partially open windows are open 5%, 10%, 20%, 30%, 40%, 50%, 60%, 70%, 80%, 90% or 95%. In some embodiments, the partially open windows are open between 5%-10%, or between 5% and 30% or between 50%-80% or between 5% and 95%.

In some embodiments, the system comprises a first exhaust flow control device having a first section with a first density of air flow windows and air flow window covers and at least a second section with a different density of air flow windows and air flow window covers. The first density of air flow windows and air flow window covers is lower than the second density of air flow windows and air flow window covers. The high density windows and window covers may be used in regions further from the exhaust duct. The first density of windows may be open, closed, or partially open. The second density of windows may be open, closed, or partially open.

In some embodiments, the system comprises a first exhaust flow control device comprising windows and window covers. The exhaust flow control device has a first density of air flow windows and air flow window covers at the proximal side of the exhaust flow control device. The exhaust flow control device has a second density of air flow windows and air flow window covers at the medial side of the exhaust flow control device. The exhaust flow control device has a third density of air flow windows and air flow window covers at the distal side of the exhaust flow control device. The first density of windows may be open, closed, or partially open. The second density of windows may be open, closed, or partially open.

Location of Air Flow Windows and Air Flow Window Covers

In some embodiments, there is a one-to-one relationship between the number of blowers and the number of air flow windows and air flow window covers on the exhaust flow control device. In some embodiments, there is not a one-to-one relationship between the location of the blowers and the location of the air flow windows and window covers in the exhaust flow control device.

In some embodiments, the air flow windows and window covers are positioned (aligned) under the blowers. In some embodiments, the air flow windows and window covers are positioned (aligned) under the blowers, wherein an air stream extends generally from a first air blower to a first exit window. In some embodiments, the first air blower blows a first air stream to a first exit window and a second air blower blows a second air stream to a second exit window.

In some embodiments, the air flow windows and window covers are not positioned (aligned) under the blowers. In some embodiments, the air flow windows and window covers are offset from the blowers. In some embodiments, the air flow windows and window covers are offset from the conveyer.

In some embodiments, the air flow windows and window covers are arranged in a line. In some embodiments, a manufacturing system for drying a multiwell plate comprises an exhaust flow control device comprising an array of air flow windows and air flow window covers, wherein each window in the array is arranged in a line parallel to the prior window.

In some embodiments, the air flow windows and window covers are arranged in a grid. In some embodiments, a manufacturing system for drying a multiwell plate comprises an exhaust flow control device comprising an array of air flow windows and air flow window covers, wherein each window in the array is arranged in a grid pattern. In some embodiments, the grid pattern is uniform, i.e., the air flow windows and window covers are evenly spaced in the grid and/or with the same number of air flow windows and air flow window covers per line and/or row of the grid. In some embodiments, the grid pattern is not uniform, i.e., the air flow windows and window covers are not evenly spaced in the grid and/or there are a different number of air flow windows and window covers per line and/or row of the grid. In some embodiments, all of the air flow windows have a window cover. In some embodiments, a first portion of the air flow windows have a window cover and a second portion of the air flow windows do not have a window cover.

In some embodiments, a manufacturing system for drying a multiwell plate comprises an array of air flow windows and air flow window covers comprising a plurality of air flow windows and air flow window cover clusters. Each window cluster may be arranged in a grid pattern.

In some embodiments, a manufacturing system for drying a multiwell plate comprises an array of air flow windows and air flow window covers, wherein each window and window cover in the array is arranged in a grid pattern wherein the grid pattern includes a grid of 1 row and 1 column, i.e., a 1×1 grid of air flow windows and air flow window covers. In some embodiments, the grid pattern includes a 2×2 grid of air flow windows and air flow window covers. In some embodiments, the grid pattern includes a 3×3, 4×4, 5×5, 6×6, 7×7, 8×8, 9×9, 10×10, 11×11, 12×12, 13×13, 14×14, 15×15, 16×16, 17×17, 18×18, 19×19, 20×20, 10×20, grid of air flow windows and air flow window covers. In some embodiments, the grid pattern includes a grid of air flow windows and air flow window covers arranged in n rows and m columns wherein n and m are each a natural number. In some embodiments, a manufacturing system for drying a multiwell plate comprises an array of air flow windows and air flow window covers, wherein each window and window cover in the array is arranged in a grid pattern wherein the grid pattern includes a grid of 1 row and 7 columns, i.e., a 1×7 grid wherein each column has an air flow window and air flow window cover.

The grid pattern may include rows shifted with respect to one another. For example, the second row may be moved one window to the left or to the right with respect to the first row. The third row may be moved two windows over to the left or to the right with respect to the first row. For example, the second and third row may be moved one window to the left or to the right with respect to the first row. The fourth and fifth row may be moved two windows over to the left or to the right with respect to the first row. Other shifts may be possible. Further, in some embodiments, columns and rows may be shifted with respect to one another.

In some embodiments, each drying zone/module has an exhaust flow control device comprising a grid of air flow windows and air flow window covers. In some embodiments, each drying zone/module has an exhaust flow control device with a grid of air flow windows and air flow window covers, wherein the grid of air flow windows and air flow window covers in each of the drying zones/modules is the same. In some embodiments, each drying zone/module has a grid of air flow windows and air flow window covers, wherein the grid of air flow windows and air flow window covers in each of the drying zones/modules is different. In some embodiments, each drying zone/module has a grid of air flow windows and air flow window covers, wherein a first grid of air flow windows and air flow window covers in at least two drying zones/modules is the same, and at least one grid of air flow windows and air flow window covers in a third drying zone/module is different. Disclosed is a manufacturing system with at least a first grid of air flow windows and air flow window covers and at least a second grid of air flow windows and air flow window covers. In some embodiments, at least a first grid of air flow windows and air flow window covers and at least a second grid of air flow windows and air flow window covers are the same. In some embodiments, at least a first grid of air flow windows and air flow window covers and at least a second grid of air flow windows and air flow window covers are different. In some embodiments, the first grid of air flow windows and air flow window covers has a first grid pattern, and the second grid of air flow windows and air flow window covers has a second grid pattern. In some embodiments, each grid of air flow windows and air flow window covers has the same grid pattern. In some embodiments, each grid of air flow windows and air flow window covers has a different grid pattern.

Size of Air Flow Windows and Air Flow Window Covers

The size and shape of the air flow windows and window covers in the exhaust flow control device will vary depending on the number of multiwell plates in the dry tunnel, the air flow into the dry tunnel, the conditions of the dry tunnel, such as humidity and temperature. Likewise, the force with which the exhaust fan pulls air out of the dry tunnel will vary depending on the number of multiwell plates in the dry tunnel, the air flow into the dry tunnel, the conditions of the dry tunnel, such as humidity and temperature.

In some embodiments, the exhaust flow control device comprises an array of air flow windows and air flow window covers, wherein each window and window cover has the same diameter. In some embodiments, the exhaust flow control device comprises an array of air flow windows and air flow window covers, wherein each window and window cover has a different diameter. In some embodiments, the exhaust flow control device comprises an array of air flow windows and air flow window covers, wherein each window and window cover has a diameter smaller than the multiwell plate. In some embodiments, the exhaust flow control device comprises an array of air flow windows and air flow window covers, wherein each window and window cover has a diameter larger than the multiwell plate.

In some embodiments, the exhaust flow control device comprises an array of air flow windows and air flow window covers, wherein a first portion of the air flow windows and window covers in the array of air flow windows and air flow window covers has a larger diameter than a second portion of the air flow windows and window covers in the array of air flow windows and air flow window covers.

In some embodiments, the exhaust flow control device comprises an array of air flow windows and air flow window covers, wherein a first portion of the air flow windows and window covers in the array of air flow windows and air flow window covers comprises a first diameter, and a second portion of the air flow windows and window covers in the array of air flow windows and air flow window covers comprises a second diameter. In some embodiments, the first diameter and the second diameter are the same. In some embodiments, the first diameter is larger than the second diameter. In some embodiments, the first diameter is smaller than the second diameter.

In some embodiments, the exhaust flow control device comprises an array of air flow windows and air flow window covers, wherein each air flow channel in the array of air flow windows and air flow window covers has a diameter of between about 1 inch and about 8 inches. In some embodiments, the exhaust flow control device comprises an array of air flow windows and air flow window covers, wherein each window and window cover in the array of air flow windows and air flow window covers has a diameter of between about 4 inches and about 6 inches. In some embodiments, the exhaust flow control device comprises an array of air flow windows and air flow window covers, wherein each window and window cover in the array of air flow windows and air flow window covers has a diameter of between about 2 inches and about 7 inches, or about 5 inches and about 6 inches.

In some embodiments, the air flow windows and window covers comprise an array of holes with different diameters.

Shape of Air Flow Windows and Air Flow Window Covers

The air flow windows and window covers can have different shapes. For example, the air flow windows and window covers can be circular holes, rectangular holes, or triangular holes. In some embodiments, the exhaust flow control device comprises an array of air flow windows and air flow window covers, wherein the air flow windows and window covers are circular, rectangular, or triangular.

In some embodiments, the exhaust flow control device 1601 comprises a top side, a bottom side, and at least one hole formed between the top side and the bottom side (the air flow windows) and at least one window cover associated with each window. See FIG. 16 showing an exhaust flow control device 1601 comprising a top side 1609, a bottom side 1610 and a hole (representative holes 1608 *a-c* are shown) formed between the top side 1609 and the bottom side 1610. The hole has a first side and a second side. The hole 1608 may have the shape of a cylindrical (the hole's middle portion may be concave or convex), a rectangle, a triangle prism, or a cone. The hole 1608 may have a cross-section that is tapered, threaded, or have a cross-section that comprises a diameter halfway through the hole that is smaller than the diameter at the top of the hole and the diameter at the bottom of the hole. In some embodiments, the exhaust flow control device comprises an array of air flow windows and air flow window covers, wherein each window in the array of windows comprises an axis, wherein the axis of each window is not perpendicular to the surface of the exhaust flow control device. In some embodiments, a first portion of the air flow windows in the array of windows has a first axis, wherein the first axis is not perpendicular to the surface of the multiwell plate, and a second portion of the air flow windows in the array of windows has a second axis, wherein the second axis is perpendicular to the surface of the multiwell plate. In some embodiments, the exhaust flow control device comprises a top surface and a bottom surface and an array of air flow windows and air flow window covers, wherein each air flow channel in the array of air flow windows and air flow window covers comprises an axis, wherein the axis of each air flow channel is not perpendicular to the surface of the top surface. In some embodiments, a first portion of the air flow windows and window covers in the array of air flow windows and air flow window covers has a first axis wherein the first axis is not perpendicular to the top surface of the exhaust flow control device, and a second portion of air flow windows and air flow window covers in the array of air flow windows and air flow window covers has a second axis wherein the second axis is perpendicular to the top surface of the exhaust flow control device.

In some embodiments, the exhaust flow control device comprises an array of windows wherein at least one window in the array of windows is counterbored. In some embodiments, the exhaust flow control device comprises an array of windows wherein a first portion of the air flow windows in the array of windows is counterbored and a second portion of the air flow windows in the array of windows is not counterbored. In some embodiments, the exhaust flow control device comprises an array of air flow windows and air flow window covers, wherein at least one window in the array of windows is countersunk. In some embodiments, the exhaust flow control device comprises an array of air flow windows and air flow window covers, wherein a first portion of the air flow windows in the array of windows is countersunk and a second portion of the air flow windows in the array of windows is not countersunk.

In some embodiments, the exhaust flow control device comprises an array of air flow windows and air flow window covers, wherein a first portion of the air flow windows and window covers in the array of air flow windows and air flow window covers has a first shape, and a second portion of the air flow windows and window covers in the array of air flow windows and air flow window covers has a second shape, wherein the first shape and the second shape are different.

In some embodiments, the exhaust flow control device comprises an array of air flow windows and air flow window covers, wherein the shape of the air flow window cover matches the shape of the air flow window, i.e., both circular, rectangular, or triangular. In some embodiments, the exhaust flow control device comprises an array of air flow windows and air flow window covers, wherein the shape of the air flow window cover does not match the shape of the air flow window, i.e., when the shape of the air flow window is a rectangle, the shape of the cover is a circle, or when the shape of the air flow window is a triangle, the shape of the cover is a rectangle.

In some embodiments, the exhaust flow control device comprises an array of air flow windows and air flow window covers, wherein a first portion of air flow windows and air flow window covers in the array of air flow windows and air flow window covers comprises a first diameter and a first shape, and a second portion of air flow windows and air flow window covers in the array of air flow windows and air flow window covers comprises a second diameter and a second shape. In some embodiments, the first diameter and the second diameter are different. In some embodiments, the first shape and the second shape are different.

The number and shape of air flow windows and air flow window covers in the exhaust flow control device is adapted to the air flow control needs. A exhaust flow control device having different performance and/or air control characteristics may be engineered by varying, for example, the angle of the air flow channel, the shape of the air flow channel, the location of the air flow channel, and the size of the air flow channel and/or other parameters.

Plates with Air Flow Channels

In some embodiments, the exhaust flow control device 1601 comprises a plurality of plates. The plates can each have a different configuration and/or number of air flow channels. This makes it easy to configure or reconfigure the exhaust flow rate for the manufacture of a particular multiwell plate because a first plate with a first configuration and/or number of air flow channels can be swapped out for a second plate with a first configuration and/or number of air flow channels wherein the first configuration and/or number of air flow channels is different than the second configuration and/or number of air flow channels. In some embodiments, the plates form a single unit, i.e., have no space between them. In some embodiments, the plates are spaced apart, and air flow can move between the plates as well as through the air flow channels. Different plates may form the exhaust flow control device. Each of the plates may be comprised of different materials having different mechanical or other properties which are used in different parts of the exhaust flow control device to provide specific characteristics to specific regions of the exhaust flow control device.

In some embodiments, the system comprises a first exhaust flow control device having a first plate with a first density of air flow channels and at least a second plate with a different density of air flow channels. The first density of air flow channels is lower than the second density of air flow channels. The high density air flow channels may be used in regions of the exhaust flow control device that require more ventilation, more exhaust, and/or more airflow. This is typically further away from the exhaust duct.

In some embodiments, system comprises a first exhaust flow control device comprising a first plate comprising air flow channels. The first plate has a first density of air flow channels at the proximal side of the plate. The plate has a second density of air flow channels at the medial side of the plate. The plate has a third density of air flow channels at the distal side of the plate.

The invention can be further understood by the following numbered paragraphs:

Paragraph 1: A multiwell plate manufacturing system comprising a drying zone, a conveyer, an exhaust flow control device and an exhaust duct.

Paragraph 2: The multiwell plate manufacturing system of paragraph 1, wherein the exhaust flow control device comprises windows and window covers.

Paragraph 3: The multiwell plate manufacturing system of paragraph 2, wherein the if the exhaust duct is in the center of the drying zone, the air flow windows on the periphery of the exhaust flow control device are open.

Paragraph 4: The multiwell plate manufacturing system of paragraph 2, wherein the if the exhaust duct is on a right hand side of the drying zone, the air flow windows in the center of the exhaust flow control device are partially open and the air flow windows on the right side of the exhaust flow control device are completely open.

Paragraph 5: The multiwell plate manufacturing system of paragraph 4, wherein there are more windows and window covers on the left side of the exhaust flow control device than in the center of the exhaust flow control device and the right side of the exhaust flow control device.

Paragraph 6: The multiwell plate manufacturing system of paragraph 2, wherein the if the exhaust duct is on a first section of the drying zone, the air flow windows in a second section of the exhaust flow control device are more open than the air flow windows in the first section the exhaust flow control device.

Paragraph 7: The multiwell plate manufacturing system of paragraph 6, wherein the air flow windows in a third section of the exhaust flow control device are more open than the air flow windows in the first section of the exhaust flow control device and the second section of the exhaust flow control device.

Paragraph 8: The multiwell plate manufacturing system of any preceding paragraph, wherein the conveyer comprises holes to allow air to move to the exhaust flow control device and exhaust duct.

Paragraph 9: A multiwell plate manufacturing system comprising a first drying zone, a second drying zone, a conveyer, a first exhaust flow control device, a second exhaust flow control device and an exhaust duct wherein the first and second exhaust flow control devices comprise windows and window covers.

Paragraph 10: The multiwell plate manufacturing system of paragraph 9, wherein there are fewer windows and window covers in the first exhaust flow control device compared to the second exhaust flow control device.

Paragraph 11: The multiwell plate manufacturing system of paragraph 9 or 10, wherein the exhaust duct is below the first exhaust flow control device.

Paragraph 12: The multiwell plate manufacturing system of paragraph 11, comprising a second exhaust duct below the second exhaust flow control device.

Paragraph 13: The multiwell plate manufacturing system of paragraph 11, wherein the air flow windows and window covers in the first exhaust flow control device have a first pattern and the air flow windows and window covers in the second exhaust flow control device have a second pattern wherein the first pattern and second pattern are different.

Paragraph 14: A multiwell plate manufacturing system comprising a drying zone, a conveyer, an exhaust flow control device, an exhaust duct, at least one air blower positioned to blow air down into the conveyer.

Paragraph 15: The multiwell plate manufacturing system of paragraph 14, wherein the at least one air blower comprises a plurality of air blowers wherein the plurality of air blowers are positioned to blow air into the wells of a multiwell plate when the multiwell plate is placed on the conveyer in the drying zone.

Paragraph 16: The multiwell plate manufacturing system of paragraph 14, wherein the at least one air blower comprises a plurality of air blowers wherein the plurality of air blowers are arranged in a 1×1 grid.

Paragraph 15: The multiwell plate manufacturing system of paragraph 13, wherein the at least one air blower comprises a plurality of air blowers wherein the plurality of air blowers are arranged to shower air down onto the a multiwell plate when the multiwell plate is placed on the conveyer in the drying zone.

The invention can be further understood by the following numbered paragraphs:

Paragraph 1: A multiwell plate manufacturing system comprising a drying zone, a conveyer, an exhaust flow control device and an exhaust duct.

Paragraph 2: The multiwell plate manufacturing system of paragraph 1, wherein the exhaust flow control device comprises air flow channels.

Paragraph 3: The multiwell plate manufacturing system of paragraph 2, wherein the if the exhaust duct is in the center of the drying zone, there are more air flow channels on the periphery of the exhaust flow control device than the center.

Paragraph 4: The multiwell plate manufacturing system of paragraph 2, wherein the if the exhaust duct is on a right hand side of the drying zone, there are more air flow channels in the center of the exhaust flow control device than the right side of the exhaust flow control device.

Paragraph 5: The multiwell plate manufacturing system of paragraph 4, wherein there are more air flow channels on the left side of the exhaust flow control device than in the center of the exhaust flow control device and the right side of the exhaust flow control device.

Paragraph 6: The multiwell plate manufacturing system of paragraph 2, wherein the if the exhaust duct is on a first section of the drying zone, there are more air flow channels in a second section of the exhaust flow control device than the first section the exhaust flow control device.

Paragraph 7: The multiwell plate manufacturing system of paragraph 6, wherein there are more air flow channels on a third section of the exhaust flow control device than in the first section of the exhaust flow control device and the second section of the exhaust flow control device.

Paragraph 8: The multiwell plate manufacturing system of any preceding paragraph, wherein the conveyer comprises holes to allow air to move to the exhaust flow control device and exhaust duct.

Paragraph 9: A multiwell plate manufacturing system comprising a first drying zone, a second drying zone, a conveyer, a first exhaust flow control device, a second exhaust flow control device and an exhaust duct wherein the first and second exhaust flow control devices comprises air flow channels.

Paragraph 10: The multiwell plate manufacturing system of paragraph 9, wherein there are fewer air flow channels in the first exhaust flow control device compared to the second exhaust flow control device.

Paragraph 11: The multiwell plate manufacturing system of paragraph 9 or 10, wherein the exhaust duct is below the first exhaust flow control device.

Paragraph 12: The multiwell plate manufacturing system of paragraph 11, comprising a second exhaust duct below the second exhaust flow control device.

Paragraph 13: The multiwell plate manufacturing system of paragraph 11, wherein the air flow channels in the first exhaust flow control device have a first pattern and the air flow channels in the second exhaust flow control device have a second pattern wherein the first pattern and second pattern are different.

Paragraph 14: A multiwell plate manufacturing system comprising a drying zone, a conveyer, an exhaust flow control device, an exhaust duct, at least one air blower positioned to blow air down into the conveyer.

Paragraph 15: The multiwell plate manufacturing system of paragraph 14, wherein the at least one air blower comprises a plurality of air blowers wherein the plurality of air blowers are aligned with wells in a multiwell plate when the multiwell plate is placed on the conveyer in the drying zone.

Paragraph 16: The multiwell plate manufacturing system of paragraph 14, wherein the at least one air blower comprises a plurality of air blowers wherein the plurality of air blowers are arranged in a grid.

Paragraph 15: The multiwell plate manufacturing system of paragraph 13, wherein the at least one air blower comprises a plurality of air blowers wherein the plurality of air blowers are arranged to shower air down onto the a multiwell plate when the multiwell plate is placed on the conveyer in the drying zone.

Excipients

An excipient is a substance formulated alongside the active ingredient, and is included for the purpose of long-term stabilization, bulking up solid formulations that contain potent active ingredients in small amounts (thus often referred to as "bulking agents", "fillers", or "diluents"), or to confer an enhancement on the active ingredient, such as reducing viscosity or enhancing solubility. Excipients are useful in the manufacturing process, to aid in the handling of the active substance, such as by facilitating powder flowability or non-stick properties, in addition to aiding in vitro stability, such as prevention of denaturation or aggregation over the expected shelf life. The selection of appropriate excipients is within the skill of the art and depends upon the active ingredient and other factors.

In the context of multiwell plates for analyte detection, excipients are used to prevent microbial growth during the manufacturing process, support stability through disc drydown, and help reagents quickly rehydrate and homogenize (enhance availability) when contacted with a sample.

Some biological molecules are sufficiently stable that they can be isolated, purified, and then stored in solution at room temperature. However, this is not possible for many materials, and techniques involving storage at low temperatures, addition of stabilizers, freeze-drying, vacuum formation, and air-drying have been tried to ensure shelf preservation, Despite the availability of these techniques, some biological materials still show unsatisfactory levels of stability during storage, and some techniques lead to added cost and inconvenience. For example, refrigerated transportation and storage is expensive.

In particular, the stresses of freeze-drying or lyophilization can be very damaging to some biological materials. Freeze drying of reagents in a diagnostic test involves freezing solutions or suspensions of thermosensitive biomaterials, followed by primary and secondary drying. The technique is based on the sublimation of water at a subzero temperature under vacuum without the solution melting. The rate of water vapor diffusion from the frozen biomaterial is very low, and therefore the process is time-consuming. Additionally, both the freezing and drying stages introduce stresses that are capable of unfolding or denaturing proteins needed for analyte detection.

Provided herein are compositions, devices, and methods for the stable storage of reagents for carrying out diagnostic tests. Specifically, compositions for the stable storage of reagents for carrying out ALT, AST, and BUN tests are provided. The reagents for carrying out ALT, AST, and BUN tests are dried into wells of multiwell plates in the presence of an antioxidant. During the manufacture of reaction vessels, the reagents for carrying out ALT, AST, and BUN tests are dried down in the presence of an antioxidant. Disclosed are diagnostic assays for performing ALT, AST, and BUN tests on a biological sample as well as related compositions and kits useful in practicing the methods of the invention. In the embodiments described above, the reagents are stably stored at room temperature, 37 degrees Fahrenheit (4 degrees Celsius) or temperatures there between.

Alanine Aminotransferase—ALT

The alanine aminotransferase (ALT) test is a blood test that checks for liver damage.

Alanine aminotransferase from the patient sample catalyzes the transamination from L-alanine to α-ketoglutarate, forming L-glutamate and pyruvate. The pyruvate formed is reduced to lactate by lactate dehydrogenase (LDH) with the simultaneous oxidation of NADH. The rate of change in absorbance at 340 nm is directly proportional to ALT activity since other reactants are present in non-rate-limiting quantities.

The reagents needed to carry out an ALT test comprise L-alanine, α-ketoglutarate, LDH, and NADH. In some embodiments, the excipients needed to support the drying of the ALT reagents comprise of 20% HPBCD and 1 mM N-Acetyl-cysteine (NAC). In other embodiments, the excipients needed to support the drying of the ALT reagents comprise 5% HPBCD, 0.25% Carboxymethyl cellulose (CMC), 0.25% Ficoll and 1 mM Glycine. In these embodiments, NAC and Glycine function as antioxidants. In these embodiments, NAC is in a range from 0.1-5 mM. In some embodiments, the excipients needed to support the drying of the ALT reagents comprise HPBCD and N-Acetyl-cysteine (NAC). In some embodiments, the excipients needed to support the drying of the ALT reagents comprise HPBCD and/or N-Acetyl-cysteine (NAC). In other embodiments, the excipients needed to support the drying of the ALT reagents comprise HPBCD, Carboxymethyl cellulose (CMC), Ficoll and Glycine. In other embodiments, the excipients needed to support the drying of the ALT reagents comprise HPBCD, Carboxymethyl cellulose (CMC), Ficoll and/or Glycine. In some embodiments, the excipients needed to support the drying of the ALT reagents comprise antioxidants.

Aspartate Aminotransferase—AST

The aspartate aminotransferase (AST) test is a blood test that checks for liver damage.

The glutamic oxalacetic transaminase method is an adaptation of the methodology recommended by the International Federation of Clinical Chemistry (IFCC). Key features include the addition of the coenzyme pyridoxal-5-phosphate ($P_5P$) to activate AST, the inclusion of oxamic acid to eliminate endogenous pyruvate interference, and the substitution of HEPES buffer to eliminate competition between $P_5P$ and phosphate for binding to the enzyme.

AST catalyzes the transamination from L-aspartate to α-ketoglutarate (α-KG), forming L-glutamate and oxaloacetate. Oxalacetate formed is reduced to malate by malate dehydrogenase (MDH) with simultaneous oxidation of reduced NADH. The rate of change in absorbance at 340 nm due to the disappearance of NADH over a 270 second measurement period is directly proportional to the AST activity since other reactants are present in non-rate-limiting quantities.

The reagents needed to carry out an AST test comprise L-aspartate, α-ketoglutarate, MDI-H, and NADH. In some embodiments, the excipients needed to support the drying of the AST reagent comprise of 10% Sucrose+10% HPBCD+5 mM NAC. In other embodiments, the excipient needed to support the drying of of the AST reagent comprise of 7.5% HPBCD, 4% Sucrose, 0.157% CMC, and 0.1 mM NAC. In these embodiments, NAC is in a range from 0.1-5 mM and functions as an antioxidant. In some embodiments, the excipients needed to support the drying of the AST reagent comprise of Sucrose, HPBCD, and NAC. In some embodiments, the excipients needed to support the drying of the AST reagent comprise of Sucrose, HPBCD, and/or NAC. In other embodiments, the excipient needed to support the drying of the AST reagent comprise of HPBCD, Sucrose, CMC, and NAC. In other embodiments, the excipient needed to support the drying of the AST reagent comprise of HPBCD, Sucrose, CMC, and/or NAC. In these embodiments, NAC is in a range from 0.1-5 mM. In these embodiments, NAC functions as an antioxidant.

Blood Urea Nitrogen—BUN

A blood urea nitrogen (BUN) test measures the amount of urea nitrogen in the blood. Levels of urea nitrogen are one marker of how well your kidneys are working.

This method uses an urease/glutamate dehydrogenase coupled enzymatic technique.

First described by Talke and Schubert, it is the most common approach for quantitation of urea due to its high degree of specificity, precision, and adaptability. Urease specifically hydrolyzes urea to form ammonia and carbon dioxide. Ammonia is utilized by glutamate dehydrogenase (GLDH) to reductively aminate α-ketoglutarate with simultaneous oxidation of reduced NADH. The rate of change in absorbance at 340 nm due to the formation of NAD+ from NADH over a 270 second measurement period is directly proportional to the urea nitrogen concentration in the sample.

The reagents needed to carry out the BUN test comprise of Urease, α-KG, NADH, and GLDH. In some embodiments, the excipients needed to support the drying of the BUN reagent comprise of 0.1% Sodium Citrate. In other embodiments, the excipients needed to support the drying of the BUN reagent comprise of 1% HPBCD, 3% Raffinose, 1 mM Glycine, and 0.1% Sodium Citrate. In these embodiments, Sodium Citrate and Glycine function as antioxidants. In some embodiments, the excipients needed to support the drying of the BUN reagent comprise Sodium Citrate. In other embodiments, the excipients needed to support the drying of the BUN reagent comprise HPBCD, Raffinose, Glycine, and Sodium Citrate. In other embodiments, the excipients needed to support the drying of the BUN reagent comprise HPBCD, Raffinose, Glycine, and/or Sodium Citrate. In these embodiments, Sodium Citrate and Glycine function as antioxidants.

Thus, in operation, ALT, AST, and BUN reactions involve the oxidation of NADH to NAD+, i.e., they produce the oxidation of NADH as a byproduct. Oxidation is desired. Adding a reducing agent (antioxidant) should prevent oxidation. One would expect that the presence of an antioxidant in the reaction vessel would inhibit the ALT, AST, and BUN tests. It was surprising that adding an antioxidant during dry down, which in theory blocks oxidation (preserves NADH), can preserve the reagents necessary to run an ALT, AST or BUN test but does not impede the diagnostic test once a sample is contacted with the reagents. The addition of an antioxidant during manufacture to the ALT, AST or BUN reaction mix does not affect the enzymatic cascade.

Among the antioxidants that can serve as an excipient and be combined with the reagents necessary to run an ALT, AST or BUN test include Trolox (6-hydroxy-2,5,7,8-tetramethylchroman-2-carboxylic acid), a water-soluble analog of vitamin E sold by Hoffman-LaRoche, vitamin E, sodium citrate (SCT), citric acid, glutathione, N-Acetyl-cysteine, and/or Glycine. Antioxidants that cannot serve as an excipient and be combined with the reagents necessary to run an ALT, AST or BUN test include Beta-Mercaptoethanol or Dithiothreitol (DTT).

Disclosed herein is a storage-stable ready-to-use Alanine Amino Transferase (ALT), Aspartate Aminotransferase (AST) and/or Blood Urea Nitrogen (BUN) test provided by use of certain antioxidants. These formulations retain their long-term stability. They can be prepared without a lyophilization or freeze-drying step. They circumvent the need to reconstitute a solution from a freeze-dried powder prior to use.

The invention can be further understood by the following numbered paragraphs:

Paragraph 1: Disclosed is a composition for diagnosing a condition in a patient sample comprising a reagent portion; and an excipient portion, the excipient portion comprising an antioxidant.

Paragraph 2: The composition of paragraph 1, wherein the reagent portion comprises the reagents necessary for carrying out an ALT, AST, or BUN test.

Paragraph 3: The composition of paragraph 1, wherein the reagent portion and excipient portion are selected from the group comprising (1) N-Acetyl-cysteine (NAC), L-alanine, α-ketoglutarate, LDH, and NADH, (2) N-Acetyl-cysteine (NAC), α-ketoglutarate, LDH, and NADH, (3) N-Acetyl-cysteine (NAC), L-alanine, LDH, and NADH, (4) N-Acetyl-cysteine (NAC), LDH, and NADH, (5) ALT R1+ALT R2+HPBCD+NAC, (6) N-Acetyl-cysteine (NAC), L-alanine, α-ketoglutarate, MDH, and NADH, (7) N-Acetyl-cysteine (NAC), α-ketoglutarate, MDH, and NADH, (8)

N-Acetyl-cysteine (NAC), L-alanine, MDH, and NADH, (9) N-Acetyl-cysteine (NAC), MDH, and NADH, (10) AST R1+AST R2+Sucrose+HPBCD+N-Acetyl-cysteine, (11) urease, α-KG, NADH, GLDH, and SCT, (12) urease, NADH, GLDH, and SCT, (13) urease, α-KG, GLDH, and SCT, (14) urease, GLDH, and SCT, (15) a BUN Reagent+ SCT, (16) Glycine, L-alanine, α-ketoglutarate, LDH, and NADH, (17) Glycine, α-ketoglutarate, LDH, and NADH, (18) Glycine, L-alanine, LDH, and NADH, (19) Glycine, LDH, and NADH, (20) HPBCD, Carboxymethyl cellulose (CMC), Ficoll, Glycine, L-alanine, α-ketoglutarate, LDH, and NADH, (21) HPBCD, Carboxymethyl cellulose (CMC), Ficoll, Glycine, α-ketoglutarate, LDH, and NADH, (22) HPBCD, Carboxymethyl cellulose (CMC), Ficoll, Glycine, L-alanine, LDH, and NADH, (23) HPBCD, Carboxymethyl cellulose (CMC), Ficoll, Glycine, LDH, and NAD, (24) L-aspartate, α-ketoglutarate, MDH, NADH, Sucrose, HPBCD, and NAC, (25) L-aspartate, α-ketoglutarate, MDH, NADH, HPBCD, Sucrose, CMC, and NAC, (26) Urease, α-KG, NADH, GLDH, Sodium Citrate, or (27) Urease, α-KG, NADH, GLDH, HPBCD, Raffinose, Glycine, and Sodium Citrate.

Paragraph 4: The composition of paragraph 1, wherein the reagent portion is selected from the group comprising (1) L-alanine, α-ketoglutarate, LDH, and NADH, (2) α-ketoglutarate, LDH, and NADH, (3) L-alanine, LDH, and NADH, LDH, and NADH, (4) ALT R1+ALT R2+HPBCD, (5) L-alanine, α-ketoglutarate, MDH, and NADH, (6) α-ketoglutarate, MDH, and NADH, (7) L-alanine, MDH, and NADH, (8) MDH, and NADH, (9) AST R1+AST R2+Sucrose+10% HPBCD+N-Acetyl-cysteine, (11) urease, α-KG, NADH, and GLDH, (12) urease, NADH, and GLDH, (13) urease, α-KG, and GLDH, (14) urease, and GLDH, or (15) a BUN Reagent+0.1% SCT.

Paragraph 5: The composition of paragraph 1 or 2, wherein the excipient portion is selected from the group comprising Trolox (6-hydroxy-2,5,7,8-tetramethylchroman-2-carboxylic acid), a water-soluble analog of vitamin E, vitamin E, sodium citrate (SCT), citric acid, glutathione, N-Acetyl-cysteine, and/or Glycine.

Paragraph 6: The composition of paragraph 1, wherein the reagent portion is a powder.

Paragraph 7. A ready-to-use, storage-stable composition containing the reagents necessary to perform an ALT, AST or BUN test and an antioxidant.

Paragraph 8. The ready-to-use, storage-stable composition of paragraph 7 wherein the antioxidant is selected from the group comprising vitamin E, sodium citrate, citric acid, glutathione, N-Acetyl-cysteine, and/or Glycine.

Also provided herein are methods of preparing a multiwell plate comprising a) adding reagents to a well sufficient to carry out an ALT, AST or BUN test and b) adding an antioxidant to the well. In some embodiments, the antioxidant acts as an excipient. In some embodiments, the antioxidant is vitamin E, sodium citrate, citric acid, glutathione, N-Acetyl-cysteine, and/or Glycine. In some embodiments, the antioxidant is about 1% w/w of the well fill weight. In some embodiments, the weight ratio of the reagent to the antioxidant is about 1:1.5 to about 1:9. In some embodiments, the weight ratio of the reagent to the antioxidant is about 1:1.5. In some embodiments, the weight ratio of the reagent to the antioxidant is about 1:9.

Also provided herein are articles of manufacture or kits comprising the reagents sufficient to carry out an ALT, AST or BUN test, and an antioxidant. The antioxidant is selected from the group comprising vitamin E, sodium citrate, citric acid, glutathione, N-Acetyl-cysteine, and/or Glycine.

In one embodiment, the method comprises: (a) providing a reaction vessel with the reagents necessary to carry out an ALT, AST, or BUN test and an antioxidant; (b) contacting the reaction vessel with a biological sample; (c) incubating the mixture; and (d) detecting the formation of NAD+ from NADH. The antioxidant is selected from the group comprising vitamin E, sodium citrate, citric acid, glutathione, N-Acetyl-cysteine, and/or Glycine.

What is claimed is:

1. A system for drying reagents in a multiwell plate, the system comprising: a dry tunnel comprising at least one drying zone, the drying zone comprising at least one blower, an exhaust flow controller, the exhaust flow controller in an air flow chamber, the air flow chamber below the drying zone and above an exhaust chamber, the exhaust chamber comprising an exhauster; wherein the exhaust flow controller comprises a plurality of windows and a plurality of window covers configured to unevenly draw air out of the exhaust chamber and evenly out of the air flow chamber.

2. The system of claim 1, wherein the exhaust flow controller comprises an array of air flow windows and air flow window covers.

3. The system of claim 2, wherein the air flow window covers from a first plurality of air flow windows positioned directly above the exhauster are closed.

4. The system of claim 3, wherein the air flow window covers for a second plurality of air flow windows not positioned directly above the exhauster are open.

5. The system of claim 4, wherein the air flow window covers for a third plurality of air flow windows not positioned directly above the exhauster are partially open.

6. The system of claim 2, wherein the at least one blower is positioned above a well of a multiwell plate to blow air down into the well of the multiwell plate.

7. The system of claim 2, wherein the at least one blower is positioned to shower air down over the entire surface of the multi well plate.

8. The system of claim 2, wherein the at least one blower is a plurality of blowers arranged in a grid to blow air down over the entire surface of the multiwell plate.

9. A system for drying reagents in a multiwell plate, the system comprising: the system of claim 1 having a multiwell plate positioned therein, the multiwell plate comprising a top plate with a first hole in the top plate that is not directly aligned over a first well in the multiwell plate, the dry tunnel comprising a first blower, the first blower not directly aligned over the first hole in the top plate.

10. The system of claim 9, the multiwell plate further comprising a second well and no blower arranged over the second well.

11. The system of claim 9, the first blower further comprising a first diameter and the first hole having a second diameter wherein the first diameter and second diameter are different.

12. The system of claim 9, the multiwell plate in a multiwell plate alignment plate.

13. The system of claim 12, the multiwell plate alignment plate or multiwell plate is positioned on a conveyer belt, the conveyer belt being asymmetrically shaped to facilitate only one insertion orientation of the multiwell plate alignment plate or the multiwell plate on the conveyer belt.

14. The system of claim 10, the first hole in the top plate further comprising an axis, the axis not perpendicular to a surface of the multiwell plate.

15. A system for drying reagents in a multiwell plate, the system comprising:

a dry tunnel with a multiwell plate positioned therein, the dry tunnel comprising at least one drying zone having a plurality of blowers, an exhaust flow controller, and an exhauster.

16. The system of claim 15, the multiwell plate further comprising a load well attached to a read well and each blower in the plurality of blowers is indexed over a load well and not a read well.

17. The system of claim 16, wherein the reagents are dried in the load well and not the read well.

18. The system of claim 16, wherein the load well comprises a load well floor that is not flat.

19. The system of claim 15, wherein the load well comprises a first chamber sidewall with a first shape and a second chamber sidewall with a second shape wherein the first shape and second shape are different.

* * * * *